US011400365B2

(12) United States Patent
Tsuchiya et al.

(10) Patent No.: US 11,400,365 B2
(45) Date of Patent: Aug. 2, 2022

(54) GAME CONTROLLER

(71) Applicant: NINTENDO CO., LTD., Kyoto (JP)

(72) Inventors: Hitoshi Tsuchiya, Kyoto (JP); Fumiyoshi Suetake, Kyoto (JP); Takanori Okamura, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 0 days.

(21) Appl. No.: 17/006,843

(22) Filed: Aug. 30, 2020

(65) Prior Publication Data

US 2020/0398154 A1  Dec. 24, 2020

Related U.S. Application Data

(63) Continuation of application No. 15/426,284, filed on Feb. 7, 2017, now Pat. No. 10,835,811, which is a continuation of application No. PCT/JP2016/080996, filed on Oct. 19, 2016.

(30) Foreign Application Priority Data

Jun. 10, 2016 (JP) ................................ 2016-116696

(51) Int. Cl.
*A63F 13/24* (2014.01)
*A63F 13/285* (2014.01)

(52) U.S. Cl.
CPC ............ *A63F 13/24* (2014.09); *A63F 13/285* (2014.09); *A63F 2300/1043* (2013.01)

(58) Field of Classification Search
CPC . A63F 13/24; A63F 13/285; A63F 2300/1043
See application file for complete search history.

(56) References Cited

U.S. PATENT DOCUMENTS

| | | | |
|---|---|---|---|
| 3,641,576 A | 2/1972 | Farbanish |
| 3,956,751 A | 5/1976 | Herman |
| 4,612,668 A | 9/1986 | Sarac |
| 4,636,802 A | 1/1987 | Middleton, Jr. |

(Continued)

FOREIGN PATENT DOCUMENTS

| | | |
|---|---|---|
| CN | 101067764 | 11/2007 |
| CN | 103372317 | 10/2013 |

(Continued)

OTHER PUBLICATIONS

Notice of Reasons for Refusal dated Nov. 11, 2020 in counterpart Japanese Patent Application No. 2016-116698 and English-language machine translation.

(Continued)

*Primary Examiner* — Kevin Y Kim
(74) *Attorney, Agent, or Firm* — Nixon & Vanderhye, P.C.

(57) ABSTRACT

An example game controller includes a housing main body formed by connecting a housing member on a front surface side and a housing member on a back surface side. On the left and right of the housing main body, holding portions are provided. To the left and right holding portions, a pair of grip portions covering the entirety of the holding portions are connected. A boundary portion between two housing members is covered with a grip portion. Thus, when a user grips the grip portion, the grip portion is likely to fit the hand well. Thus, it is possible to improve the operability.

12 Claims, 21 Drawing Sheets

(56) References Cited

U.S. PATENT DOCUMENTS

| | | | |
|---|---|---|---|
| 4,647,937 A | 3/1987 | Hidaka et al. |
| 4,748,295 A | 5/1988 | Rogers |
| 4,775,573 A | 10/1988 | Turek |
| 4,854,040 A | 8/1989 | Turek |
| 5,046,739 A | 9/1991 | Reichow |
| 5,111,199 A | 5/1992 | Tomoda et al. |
| 5,134,505 A | 7/1992 | Tanaka et al. |
| 5,206,657 A | 4/1993 | Downey |
| 5,207,426 A | 5/1993 | Inoue |
| 5,451,973 A | 9/1995 | Walter et al. |
| 5,551,693 A | 9/1996 | Goto |
| 5,644,113 A | 7/1997 | Date et al. |
| 5,764,196 A | 6/1998 | Fujimoto et al. |
| 5,940,682 A | 8/1999 | Tabara |
| 5,973,644 A | 10/1999 | Haneishi et al. |
| 6,001,014 A | 12/1999 | Ogata |
| 6,046,674 A | 4/2000 | Irwin et al. |
| 6,069,564 A | 5/2000 | Hatano et al. |
| 6,104,354 A | 8/2000 | Hill et al. |
| 6,120,025 A | 9/2000 | Hughes, IV |
| 6,144,346 A | 11/2000 | Boy |
| 6,150,600 A | 11/2000 | Buchla |
| 6,161,761 A | 12/2000 | Ghaem et al. |
| 6,171,191 B1 * | 1/2001 | Ogata ................ A63F 13/06 463/38 |
| 6,186,896 B1 | 2/2001 | Takeda et al. |
| 6,222,740 B1 | 4/2001 | Bovensiepen |
| 6,241,247 B1 | 6/2001 | Sternberg |
| 6,252,561 B1 | 6/2001 | Wu et al. |
| 6,342,009 B1 | 1/2002 | Soma |
| 6,350,365 B1 | 2/2002 | Koyama |
| 6,356,243 B1 | 3/2002 | Schneider et al. |
| 6,394,906 B1 | 5/2002 | Ogata |
| 6,435,969 B1 | 8/2002 | Tanaka et al. |
| 6,480,110 B2 | 11/2002 | Lee et al. |
| 6,582,887 B2 | 6/2003 | Luch |
| 6,641,479 B1 | 11/2003 | Ogata |
| 6,710,766 B1 | 3/2004 | Ogata |
| 6,724,345 B2 | 4/2004 | Tran |
| 6,989,818 B2 | 1/2006 | Biheller |
| 7,512,413 B2 | 3/2009 | Hui et al. |
| 7,582,839 B2 | 9/2009 | Kyowski et al. |
| D709,882 S | 7/2014 | Morris et al. |
| 8,803,739 B2 | 8/2014 | Rajgopal |
| 9,789,395 B2 | 10/2017 | Igarashi et al. |
| 10,286,306 B2 | 5/2019 | Okamura et al. |
| 10,335,675 B2 | 7/2019 | Suetake et al. |
| 10,441,878 B2 | 10/2019 | Kaneko et al. |
| 10,456,669 B2 | 10/2019 | Okamura et al. |
| 10,835,811 B2 | 11/2020 | Tsuchiya et al. |
| 10,864,436 B2 | 12/2020 | Okamura |
| 2001/0003708 A1 * | 6/2001 | Aizu ................ A63F 13/537 463/7 |
| 2001/0008849 A1 | 7/2001 | Komata |
| 2002/0041258 A1 | 4/2002 | Schneider et al. |
| 2002/0080112 A1 | 6/2002 | Braun et al. |
| 2002/0128064 A1 | 9/2002 | Sobota |
| 2002/0135519 A1 | 9/2002 | Luch |
| 2002/0155868 A1 | 10/2002 | Koshima et al. |
| 2003/0030533 A1 | 2/2003 | Waffenschmidt |
| 2003/0042122 A1 | 3/2003 | Sato |
| 2003/0216180 A1 | 11/2003 | Shinohara et al. |
| 2004/0023719 A1 | 2/2004 | Hussaini |
| 2004/0023720 A1 | 2/2004 | Sakoh |
| 2004/0077313 A1 | 4/2004 | Oba et al. |
| 2004/0129542 A1 | 7/2004 | Kawaguchi et al. |
| 2004/0224768 A1 | 11/2004 | Hussaini |
| 2005/0024268 A1 | 2/2005 | McKinzie, III et al. |
| 2005/0025117 A1 | 2/2005 | Inagaki et al. |
| 2005/0041624 A1 | 2/2005 | Hui et al. |
| 2005/0064814 A1 | 3/2005 | Matsuo et al. |
| 2005/0153777 A1 | 7/2005 | Koshima |
| 2005/0269769 A1 | 12/2005 | Naghi et al. |
| 2006/0022951 A1 | 2/2006 | Hull |
| 2006/0109182 A1 | 5/2006 | Rosenberg et al. |
| 2006/0116204 A1 | 6/2006 | Chen et al. |
| 2006/0260921 A1 | 11/2006 | Lee et al. |
| 2007/0085425 A1 | 4/2007 | Hirashima |
| 2007/0097832 A1 | 5/2007 | Koivisto et al. |
| 2007/0164868 A1 | 7/2007 | Deavours et al. |
| 2007/0281787 A1 | 12/2007 | Numata et al. |
| 2008/0143560 A1 | 6/2008 | Shipman |
| 2008/0261695 A1 | 10/2008 | Coe |
| 2009/0011831 A1 | 1/2009 | Yamada |
| 2009/0017911 A1 | 1/2009 | Miyazaki |
| 2009/0054146 A1 | 2/2009 | Epstein |
| 2009/0073724 A1 | 3/2009 | Hayama et al. |
| 2009/0289774 A1 | 11/2009 | Choi |
| 2010/0069154 A1 | 3/2010 | Claussen |
| 2010/0081375 A1 | 4/2010 | Rosenblatt |
| 2010/0181176 A1 | 7/2010 | Igarashi et al. |
| 2010/0302169 A1 | 12/2010 | Pance et al. |
| 2011/0021271 A1 | 1/2011 | Ikeda |
| 2011/0048908 A1 | 3/2011 | Nishino |
| 2011/0127149 A1 | 6/2011 | Sun |
| 2011/0242361 A1 | 10/2011 | Kuwahara et al. |
| 2011/0267244 A1 | 11/2011 | Rajgopal et al. |
| 2012/0108340 A1 | 5/2012 | Ashida et al. |
| 2012/0113013 A1 | 5/2012 | Lee et al. |
| 2012/0142418 A1 | 6/2012 | Muramatsu |
| 2012/0153748 A1 | 6/2012 | Wauke |
| 2012/0268360 A1 | 10/2012 | Mikhailov |
| 2012/0322555 A1 | 12/2012 | Burgess |
| 2013/0130793 A1 | 5/2013 | Ikeda et al. |
| 2013/0178293 A1 | 7/2013 | Nakayama et al. |
| 2013/0213146 A1 | 8/2013 | Amos |
| 2013/0281212 A1 | 10/2013 | Tsuchiya et al. |
| 2013/0281213 A1 | 10/2013 | Yasuda et al. |
| 2014/0018173 A1 | 1/2014 | Urhman |
| 2014/0094309 A1 | 4/2014 | Osawa et al. |
| 2014/0248958 A1 | 9/2014 | Yamagishi |
| 2014/0315640 A1 | 10/2014 | Goh |
| 2015/0193017 A1 | 7/2015 | Igarashi et al. |
| 2015/0253848 A1 | 9/2015 | Heubel et al. |
| 2015/0371794 A1 | 12/2015 | Duenninger et al. |
| 2016/0012687 A1 | 1/2016 | Obana et al. |
| 2016/0059122 A1 | 3/2016 | Ehara et al. |
| 2016/0093452 A1 | 3/2016 | Zercoe et al. |
| 2016/0151706 A1 | 6/2016 | Antonio |
| 2017/0110920 A1 | 4/2017 | Mao et al. |
| 2017/0136354 A1 | 5/2017 | Yamano et al. |
| 2017/0151494 A1 | 6/2017 | Ironmonger et al. |
| 2017/0354870 A1 | 12/2017 | Okamura et al. |
| 2017/0361222 A1 | 12/2017 | Tsuchiya et al. |
| 2018/0011242 A1 | 1/2018 | Morita et al. |

FOREIGN PATENT DOCUMENTS

| | | |
|---|---|---|
| CN | 205081655 U | 3/2016 |
| EM | 002999193-0001 | 2/2016 |
| EM | 003764570-0001 | 2/2017 |
| EP | 1 057 504 | 12/2000 |
| EP | 1 078 660 | 2/2001 |
| EP | 1 852 162 | 11/2007 |
| EP | 2 172 252 | 4/2010 |
| EP | 2 208 518 | 7/2010 |
| EP | 1 681 658 | 2/2014 |
| EP | 2 698 185 | 2/2014 |
| EP | 2 700 435 | 2/2014 |
| EP | 2 843 498 | 3/2015 |
| EP | 2 870 985 | 5/2015 |
| EP | 2 888 017 | 7/2015 |
| EP | 2 908 223 | 8/2015 |
| EP | 2 908 224 | 8/2015 |
| EP | 2 963 522 | 1/2016 |
| JP | H04-042029 U | 4/1992 |
| JP | 7-068052 | 3/1995 |
| JP | H11-004966 | 1/1999 |
| JP | H11-53994 | 2/1999 |
| JP | 11-090042 | 4/1999 |
| JP | 2001-143556 | 5/2001 |
| JP | 2002-102537 | 4/2002 |
| JP | 2003-086060 | 3/2003 |
| JP | 2004-057619 | 2/2004 |

(56) References Cited

FOREIGN PATENT DOCUMENTS

| | | |
|---|---|---|
| JP | 2007-299706 | 11/2007 |
| JP | 2008-546534 | 12/2008 |
| JP | 2009-037582 | 2/2009 |
| JP | 2009-118185 | 5/2009 |
| JP | 2009-206795 | 9/2009 |
| JP | 2010-055981 | 3/2010 |
| JP | 2011-024774 | 2/2011 |
| JP | 2012-011220 | 1/2012 |
| JP | 2012-249923 | 12/2012 |
| JP | 2013-236910 | 11/2013 |
| JP | 2014-044898 | 3/2014 |
| JP | 2014-211342 | 11/2014 |
| JP | 2015-164032 | 9/2015 |
| JP | 2015-231098 | 12/2015 |
| JP | 2016-016372 | 2/2016 |
| JP | 5869142 | 2/2016 |
| JP | 2016-96677 | 5/2016 |
| JP | 6576432 | 9/2019 |
| WO | 1999/036136 | 7/1999 |
| WO | 2007/002775 | 1/2007 |
| WO | 2012/125924 | 9/2012 |
| WO | 2013/157052 | 10/2013 |
| WO | 2014/184120 | 11/2014 |
| WO | 2015/118082 | 8/2015 |
| WO | 2016/031028 | 3/2016 |

OTHER PUBLICATIONS

English-language machine translation of JP2009-206795.
Notice of Reasons of Refusal dated Apr. 2, 2021 in JP Application No. 2016-205167 and English-language translation.
Notice of Allowance dated Sep. 21, 2020 in U.S. Appl. No. 15/422,775.
Notice of Reasons for Refusal dated Sep. 23, 2020 in Japanese Patent Application No. 2016-205167.
English-language machine translation of JP2014-211342.
Office Action dated Jul. 21, 2021 in Chinese Application No. 201710108430.9.
MegaObzor [online], May 4, 2016, Internet<URL:https://megaobzor.com/review-Mad-Catz-L-Y-N-X-3.html>.
CES 2015: Mad Catz L.Y.N.X. 9 Mobile Hybrid Controller Announced, Royalflush [online], Jan. 14, 2015, Internet<URL:https://royalflushmagazine.com/revealed/ces-2015-mad-catz-lynx9-announced/>.
Nintendo's successive hardware, Famikon, Sūfami, N64 controllerdisassembled into pieces, G I G A Z I N E [online] , Nov. 20, 2015, Internet<URL:https://gigazine.net/news/20151120-nintend-controller-evolution-teardown/>.
Notice of Reasons for Refusal dated Sep. 2, 2021 in Japanese Patent Application No. 2016-116695 and English-language machine translation.
Office Action dated Jul. 22, 2021 in Chinese Application No. 201710108430.9.
Nintendo's successive hardware, Famikon, Sūfami, N64 controller disassembled into pieces, G I G A Z I N E [online], Nov. 20, 2015, Internet<URL:https://gigazine.net/news/20151120-nintendo-controller-evolution-teardown/>.
Office Action dated Apr. 8, 2021 in U.S. Appl. No. 15/647,315.
Application for Declaration of Invalidity of Registered Community Design No. 003764570-0001, Statement of Grounds, dated Aug. 30, 2021, 20 pages.
Application for Declaration of Invalidity of Registered Community Design No. 003764570-0001, Statement of Grounds, dated Sep. 20, 2021, 21 pages.
Nintendo Switch Pro Controller Amazon Screenshot, dated Aug. 28, 2021, and listed as Enclosure 2 in the Application for Declaration of Invalidity, 7 pages.
RCD File Information for Registered Community Design No. 000033220-0001, published Oct. 14, 2003, and listed as Enclosure 3 in the Application for Declaration of Invalidity, 3 pages.
RCD File Information for Registered Community Design No. 000069844-0001, published Jan. 27, 2004, and listed as Enclosure 4 in the Application for Declaration of Invalidity, 3 pages.
RCD File Information for Registered Community Design No. 000153614-0001, published Aug. 24, 2004, and listed as Enclosure 5 in the Application for Declaration of Invalidity, 3 pages.
RCD File Information for Registered Community Design No. 000179544-0001, published Aug. 24, 2004, and listed as Enclosure 6 in the Application for Declaration of Invalidity, 3 pages.
RCD File Information for Registered Community Design No. 000179544-0002, published Aug. 24, 2004, and listed as Enclosure 7 in the Application for Declaration of Invalidity, 3 pages.
RCD File Information for Registered Community Design No. 000270590-0007, published Mar. 8, 2005, and listed as Enclosure 8 in the Application for Declaration of Invalidity, 3 pages.
RCD File Information for Registered Community Design No. 000561394-0001, published Jul. 16, 2006, and listed as Enclosure 9 in the Application for Declaration of Invalidity, 3 pages.
RCD File Information for Registered Community Design No. 000693734-0001, registered Mar. 22, 2007, and listed as Enclosure 10 in the Application for Declaration of Invalidity, 3 pages.
RCD File Information for Registered Community Design No. 000960505-0001, registered Jun. 30, 2008, and listed as Enclosure 11 in the Application for Declaration of Invalidity, 3 pages.
RCD File Information for Registered Community Design No. 000966288-0001, published Oct. 2, 2008, and listed as Enclosure 12 in the Application for Declaration of Invalidity, 3 pages.
RCD File Information for Registered Community Design No. 001703596-0001, registered May 3, 2010, and listed as Enclosure 13 in the Application for Declaration of Invalidity, 3 pages.
RCD File Information for Registered Community Design No. 1829516-0001, registered Mar. 2, 2011, and listed as Enclosure 14 in the Application for Declaration of Invalidity, 3 pages.
RCD File Information for Registered Community Design No. 1829516-0002, registered Mar. 2, 2011, and listed as Enclosure 15 in the Application for Declaration of Invalidity, 3 pages.
RCD File Information for Registered Community Design No. 001963315-0001, published Dec. 21, 2011, and isted as Enclosure 16 in the Application for Declaration of Invalidity, 3 pages.
RCD File Information for Registered Community Design No. 002105718-0001, published Jan. 9, 2013, and listed as Enclosure 17 in the Application for Declaration of Invalidity, 3 pages.
RCD File Information for Registered Community Design No. 002105718-0002, published Jan. 9, 2013, and listed as Enclosure 18 in the Application for Declaration of Invalidity, 3 pages.
RCD File Information for Registered Community Design No. 002206540-0001, published Mar. 25, 2013, and listed as Enclosure 19 in the Application for Declaration of Invalidity, 3 pages.
RCD File Information for Registered Community Design No. 002206540-0002, published Mar. 25, 2013, and listed as Enclosure 20 in the Application for Declaration of Invalidity, 3 pages.
RCD File Information for Registered Community Design No. 002206540-0003, published Mar. 25, 2013, and listed as Enclosure 21 in the Application for Declaration of Invalidity, 3 pages.
RCD File Information for Registered Community Design No. 002322669-0001, published Oct. 21, 2013, and listed as Enclosure 22 in the Application for Declaration of Invalidity, 3 pages.
Information Relating to Design M9304921-0001, published Jan. 10, 1994, and listed as Enclosure 23 in the Application for Declaration of Invalidity, 3 pages.
Information Relating to Design 49806791-0001, published Mar. 25, 1999, and listed as Enclosure 24 in the Application for Declaration of Invalidity, 3 pages.
"List of Game Controllers" from Wikipedia, last updated Jul. 22, 2021, listed as Enclosure 25 in the Application for Declaration of Invalidity, 11 pages.
"Xbox Wireless Controller," from Wikipedia, last edited Aug. 10, 2021, listed as Enclosure 27 in the Application for Declaration of Invalidity, 12 pages.
"Xbox Wireless Controller," from Amazon UK, downloaded Sep. 20, 2021, listed as Enclosure 27A in the Application for Declaration of Invalidity, 12 pages.

(56) References Cited

OTHER PUBLICATIONS

List of Xbox Wireless Controller Variants, Xbox Wiki, from https://xbox.fandom.com, downloaded Aug. 11, 2021, listed as Enclosure 28 in the Application for Declaration of Invalidity, 88 pages.
European Trademark File Information for European Trademark No. 004379392, registered Aug. 31, 2006, listed as Enclosure 29 in the Application for Declaration of Invalidity 4 pages.
Notice of Termination of Reconsideration by Examiners before Appeal Proceedings dated Feb. 16, 2021 in JP Application No. 2016-116695 and English-language translation.
Suetake et al., U.S. Appl. No. 15/370,189, filed Dec. 6, 2016, now U.S. Pat. No. 10,335,675.
Okamura et al., U.S. Appl. No. 15/422,854, filed Feb. 2, 2017, now U.S. Pat. No. 10,456,669.
Kaneko et al., U.S. Appl. No. 15/422,915, filed Feb. 2, 2017, now U.S. Pat. No. 10,441,878.
Okamura, U.S. Appl. No. 15/422,775, filed Feb. 2, 2017, pending.
Okamura, U.S. Appl. No. 15/422,785, filed Feb. 2, 2017, now U.S. Pat. No. 10,286,306.
Extended European Search Report dated Jul. 14, 2017 issued in corresponding European Application No. 16204388.9.
Office Action dated Aug. 25, 2017 issued in U.S. Appl. No. 15/370,189 to Suetake, filed Dec. 6, 2016.
Office Action dated Aug. 28, 2017 issued in U.S. Appl. No. 15/647,315 to Suetake, filed Jul. 12, 2017.
Anonymous, "Nintendo Wii U Teardown", Nov. 19, 2012, XP055397223, Retrieved from the internet: URL:https://www.ifixit.com/Teardown/Nintendo+Wii+U+Teardown/11796 (17 pages).
European Search Report dated Aug. 18, 2017, issued in EP Application No. 17153683.2.
European Search Report dated Aug. 17, 2017, issued in EP Application No. 17153682.4.
European Search Report dated Aug. 24, 2017, issued in EP Application No. 17153692.3.
Extended European Search Report dated Sep. 27, 2017 issued in European Application No. 17153687.3.
Final Office Action dated Mar. 5, 2018, issued in U.S. Appl. No. 15/370,189 to Suetake et al., filed Dec. 6, 2016.
European Search Report dated Feb. 27, 2018 issued in EP 16831611.
Office Action dated May 17, 2018 issued in U.S. Appl. No. 15/647,315.
Office Action dated Oct. 4, 2018 issued in U.S. Appl. No. 15/422,775.
Office Action dated Oct. 22, 2018 issued in European Application No. 17 153 687.3.
Awgs: "I tried to disassemble and clean PS controller (Dualshock emerald) for maintenance [awgs Foundry]", Awgs Foundry, Nov. 19, 2015 (Jan. 19, 2015), XP055515953, Retrieved from the Internet: URL:https://web.archive.org/web/20160606100733/http://awgsfoundry.com/blog-entry-264.html [retrieved on Oct. 16, 2018] (27 pgs.).
https://www.youtube.com/watch?v=NkSb_U6m05Q published on May 6, 2017.
Office Action dated Oct. 4, 2018 issued in U.S. Appl. No. 15/422,785.
Office Action dated Oct. 5, 2018 issued in U.S. Appl. No. 15/422,854.
PharaohsVizier, White Knockoff Gamecube Controller Review, https://www.youtube.com/watch?v=h719aQqYYn4, p. 1 (Published on Sep. 14, 2010).
GametistaTV, Wii U Pro Controller Xbox 360 Stick Mod, https://www.youtube.com/watch?v=jsMcz4XPNWM, p. 1 (Published on Dec. 1, 2012).
Rai FX, How to take apart your Wii U Pro Controller, https://www.youtube.com/watch?v=Kgg45YISVQU, p. 1 (Published on Apr. 8, 2015).
Office Action dated Nov. 29, 2018, issued in Suetake, et al., U.S. Appl. No. 15/647,315, filed Jul. 12, 2017.
Office Action dated Jan. 10, 2019, issued in Kaneko, et al., U.S. Appl. No. 15/422,915, filed Feb. 2, 2017.
Office Action dated Jan. 10, 2019, issued in Okamura, et al., U.S. Appl. No. 15/422,854, filed Feb. 2, 2017.
Notice of Allowance dated Jan. 22, 2019 issued in U.S. Appl. No. 15/422,785.
Office Action dated Mar. 21, 2019 in U.S. Appl. No. 15/422,854.
Extended Search Report dated Mar. 22, 2019 in counterpart European Patent Application No. 18208899.7.
Final Office Action dated Jul. 12, 2019 in U.S. Appl. No. 15/422,775 and PTO-892 form.
Final Office Action dated Aug. 7, 2019 in U.S. Appl. No. 15/647,315 and PTO-892 form.
"Microsoft Xbox Elite Wireless Controller Review," 4gamer.net [online], Feb. 20, 2016, https://www.4gamer.net/games/999/G999902/20160218096/ and English-language machine translation (43 pages).
Notice of Reasons for Refusal dated Apr. 3, 2020 in Japanese Patent Application No. 2016-116695 and English-language machine translation.
Notice of Reasons for Refusal dated May 8, 2020 in Japanese Patent Application No. 2016-116697 and English-language machine translation.
Kotonova, "Method of photographing a screen shot with PS Vita," <online>. May 12, 2015, Internet <URL: https://kotonova.com/2117> and English-language machine translation (11 pages).
Onnodo, "[Feature] Nintendo 'Wii U Basic Set' hardware report," PC Watch [online], Dec. 9, 2012, Internet <URL: https://pc.watch.impress.co.jp/docs/topic/feature/577915.html> and English-language machine translation (18 pages).
Tsuchiya et al., U.S. Appl. No. 15/426,284, filed Feb. 7, 2017.
Notice of Reasons for Refusal dated Dec. 25, 2019 in JP Application No. 2016-116700 and English-language translation.
Notice of Reasons for Refusal dated Feb. 1, 2022 in JP Application No. 2020-203568 and English-language translation.

\* cited by examiner

F I G. 1
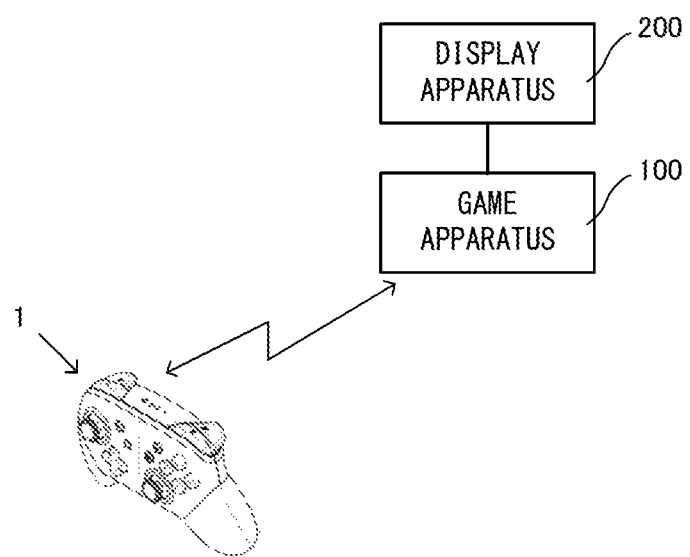

GAME CONTROLLER

CROSS REFERENCE TO RELATED APPLICATIONS

This application is a continuation of U.S. patent application Ser. No. 15/426,284, filed on Feb. 2, 2017, now U.S. Pat. No. 10,835,811, which is a continuation of International Application No. PCT/JP2016/80996, filed on Oct. 19, 2016, which designated the U.S. and claims priority to Japanese Patent Application No. 2016-116696, filed on Jun. 10, 2016. The entire contents of each of these applications are hereby incorporated by reference in this application.

FIELD

The technology disclosed here relates to a game controller.

BACKGROUND AND SUMMARY

Conventionally, there is a two-handed game controller for performing a game operation. For example, there is a game controller formed by connecting a housing on a front surface side and a housing on a back surface side.

However, there is room for improvement in the operability of a conventional game controller.

Therefore, it is an object of an exemplary embodiment to improve the operability of a game controller.

To achieve the above object, the exemplary embodiment employs the following configurations.

An example of the exemplary embodiment is a game controller for performing a game operation by holding the game controller with both hands. The game controller includes a main body housing, a first grip member, and a second grip member. The main body housing includes a controller main body portion in which an operation section for a game operation is placed, a first protruding portion, and a second protruding portion. The main body housing is formed by connecting a first housing member and a second housing member. The first grip member is held by one hand of a user, connected to the first protruding portion of the main body housing, and covers at least a part of a boundary portion between the first housing member and the second housing member. The second grip member is separate from the first grip member, held by the other hand of the user, connected to the second protruding portion of the main body housing, and covers at least a part of a boundary portion between the first housing member and the second housing member.

Based on the above, it is possible to cover a boundary portion between a first housing member and a second housing member with a grip member. When a user holds a protruding portion (a grip portion) of a game controller, it is possible to make the protruding portion likely to fit the hand well, and improve the operability.

Further, in another configuration, the first grip member and the second grip member may have shapes symmetrical with each other.

According to the above configuration, for example, it is possible to provide a game controller including symmetrical grip members.

Further, in another configuration, the first grip member and the second grip member may be hollow members and may be so shaped as to protrude in a predetermined direction.

According to the above configuration, it is possible to shape the grip portion so as to protrude in a predetermined direction. It is possible to shape the grip portion so that it is easy for the user to grip the grip portion. It is possible to improve the operability.

Further, in another configuration, the first protruding portion and the second protruding portion may be so shaped as to protrude in a predetermined direction. If the first protruding portion and the second protruding portion are cut along a plane perpendicular to the predetermined direction, the first grip member and the second grip member may cover entirety of outer peripheries of cross sections of the first protruding portion and the second protruding portion.

According to the above configuration, the entirety of the outer periphery of a first protruding portion is covered with a first grip member, and the entirety of the outer periphery of a second protruding portion is covered with a second grip member. Thus, when the user holds a grip portion of the game controller, it is possible to make the grip portion likely to fit the hand well, and improve the operability.

Further, in another configuration, if the user views the game controller from front while holding the first grip member and the second grip member, the first protruding portion and the second protruding portion may protrude downward from the controller main body portion.

According to the above configuration, the user can hold the grip portion protruding downward from a controller main body portion. If the user holds the grip portion, the user can view the controller main body portion from front. This improves the operability of the controller.

Further, in another configuration, if the user views the game controller from front while holding the first grip member and the second grip member, the first protruding portion and the second protruding portion may be curved in a direction of a back surface of the game controller.

According to the above configuration, the grip member is curved in the direction of a back surface. This makes it easy for the user to grip the grip portion. Thus, it is possible to improve the operability.

Further, in another configuration, if the user views the game controller from front while holding the first grip member and the second grip member, the first protruding portion may be located to the left of a center of the controller main body portion, and the second protruding portion is located to the right of the center of the controller main body portion.

According to the above configuration, the user can hold the game controller with their left and right hands so as to sandwich the game controller.

Further, in another configuration, the game controller may further include a first fixing structure configured to fix the first grip member to the first protruding portion, and a second fixing structure configured to fix the second grip member to the second protruding portion.

According to the above configuration, it is possible to firmly fix first and second grip members to first and second protruding portions.

Further, in another configuration, the first grip member may include a first guide portion configured to guide the first grip member to a predetermined position when the first grip member is connected to the first protruding portion. The first protruding portion may include a second guide portion corresponding to the first guide portion. Further, the second grip member may include a third guide portion configured to guide the second grip member to a predetermined position when the second grip member is connected to the second protruding portion. The second protruding portion may include the fourth guide portion corresponding to the third guide portion.

According to the above configuration, it is possible to easily connect first and second grip members to first and second protruding portions.

Further, in another configuration, each of the first guide portion, the second guide portion, the third guide portion, and the fourth guide portion may include a guide portion on a front surface side of the game controller and a guide portion on a back surface side of the game controller.

According to the above configuration, it is possible to guide the first and second grip members by two guide portions. It is possible to easily connect the first and second grip members to the first and second protruding portions.

Further, in another configuration, the first grip member and the second grip member may be connected to the first protruding portion and the second protruding portion, respectively, from one side to the other side of each grip member. The first guide portion of the first grip member may be formed so as to extend from the one side to the other side of the first grip member. The third guide portion of the second grip member may be formed so as to extend from the one side to the other side of the second grip member. A width of the first guide portion of the first grip member may be greater on the other side than on the one side. A width of the third guide portion of the second grip member may be greater on the other side than on the one side.

According to the above configuration, it is possible to easily connect the first and second grip members to the first and second protruding portions.

Further, in another configuration, the first guide portion of the first grip member and the third guide portion of the second grip member may be protruding guide portions, and the second guide portion of the first protruding portion and the fourth guide portion of the second protruding portion may be recessed guide portions.

According to the above configuration, when a grip member is connected to a protruding portion by a protruding guide portion of the grip member and a recessed guide portion of the protruding portion, it is possible to guide the grip member.

Further, in another configuration, the first grip member may include in an extremity portion thereof a hole into which a screw for connecting to the first protruding portion is inserted, and the second grip member may include in an extremity portion thereof a hole into which a screw for connecting to the second protruding portion is inserted.

According to the above configuration, a hole is provided in an extremity portion of a grip member. Thus, it is possible to fix the grip portion to the protruding portion, and it is also possible to make the hand of the user less likely to touch the hole when the user operates the game controller. Thus, it is possible to eliminate discomfort when the user grips the grip portion. This can improve the operability of the controller.

Further, in another configuration, if the user views the game controller from front while holding the first grip member and the second grip member, the first protruding portion may be located to the left of a center of the controller main body portion, and the second protruding portion may be located to the right of a center of the controller main body portion. The first grip member and the second grip member may be formed such that if the game controller is viewed from front, a length in an up-down direction of each grip member on left and right end portion sides is longer than a length in an up-down direction of the grip member on a center side of the game controller.

According to the above configuration, left and right end portions of a grip member are longer. Thus, for example, it is possible to widen a left side surface of the grip member on the left side and widen a right side surface of the grip member on the right side. It is possible to widen a portion that an approximate center portion of the palm of the user hits. Thus, it is possible to make it easy for the user to grip the grip member, and improve the operability.

Further, in another configuration, a height of a surface, on a first grip member side, of a boundary portion between the first grip member and the controller main body portion when the first grip member is connected to the first protruding portion may be substantially the same as a height of a surface, on a controller main body portion side, of the boundary portion. A height of a surface, on a second grip member side, of a boundary portion between the second grip member and the controller main body portion when the second grip member is connected to the second protruding portion may be substantially the same as a height of a surface, on the controller main body portion side, of the boundary portion.

According to the above configuration, there is no difference in level in a boundary portion between a grip member and a controller main body portion. Thus, it is possible to smooth the boundary portion. Thus, it is possible to improve the feel when the user holds the game controller, and improve the operability.

Further, in another configuration, the first housing member may be a housing member on a front surface side of the game controller, and the second housing member may be a housing member on a back surface side of the game controller.

According to the above configuration, it is possible to form a main body housing with a housing member on a front surface side and a housing member on a back surface side.

Further, in another configuration, vibrators may be provided inside the first grip member and the second grip member. The vibrators may come into direct contact with the first grip member and the second grip member, and the vibrators may come into contact with the first protruding portion and the second protruding portion through buffer members.

According to the above configuration, it is possible to make a vibration likely to be transmitted to the hand of the user.

Further, another example of the exemplary embodiment may be a pair of grip members attached to a main body housing of a game controller formed by connecting a first housing member and a second housing member. The pair of grip members includes: a first grip member configured to be held by one hand of a user; and a second grip member configured to be held by the other hand of the user. The first grip member is connected to a first protruding portion of the main body housing and covers at least a part of a boundary portion between the first housing member and the second housing member. The second grip member is separate from the first grip member, is connected to a second protruding portion of the main body housing, and covers at least a part of a boundary portion between the first housing member and the second housing member.

According to the above configuration, it is possible to cover two protruding portions of a main body housing with a pair of grip members. When a user holds a grip portion attached to a game controller, it is possible to make the grip portion likely to fit the hand well. It is possible to improve the operability of the controller.

Further, another example of the exemplary embodiment may be a pair of grip members attached to a main body housing of a game controller formed by connecting a front-surface-side housing member and a back-surface-side housing member. The pair of grip members includes: a first grip member configured to be held by one hand of a user; and a second grip member configured to be held by the other hand of the user. The first grip member may be connected to a first protruding portion of the main body housing and cover at least a part of a boundary portion between the front-surface-side housing member and the back-surface-side housing member. The second grip member may be separate from the first grip member, connected to a second protruding portion of the main body housing, and cover at least a part of a boundary portion between the front-surface-side housing member and the back-surface-side housing member. The first grip member and the second grip member may be hollow members. The first grip member may include in an extremity portion thereof a hole into which a screw for connecting to the first protruding portion is inserted. The second grip member may include in an extremity portion thereof a hole into which a screw for connecting to the second protruding portion is inserted.

According to the above configuration, it is possible to cover two protruding portions of a main body housing with a pair of grip members. When a user holds a grip portion attached to a game controller, it is possible to make the grip portion likely to fit the hand well. It is possible to improve the operability of the controller.

Further, another example of the exemplary embodiment may be a game controller for performing a game operation by holding the game controller with both hands. The game controller includes: a main body housing; a first grip member connected to the main body housing and configured to be held by one hand of a user; a second grip member separate from the first grip member, connected to the main body housing, and configured to be held by the other hand of the user; a first vibrator provided inside the first grip member; and a second vibrator provided inside the second grip member. The first vibrator comes into direct contact with the first grip member and comes into contact with the main body housing through a first buffer member. The second vibrator comes into direct contact with the second grip member and comes into contact with the main body housing through a second buffer member.

According to the exemplary embodiment, it is possible to improve the operability of a game controller.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 1 is a diagram showing a non-limiting example of a game system including a game controller 1 according to the exemplary embodiment;

FIG. 17A is a non-limiting example of a cross-sectional view along a line A-A in

FIG. 16;

FIG. 17B is a non-limiting example of a cross-sectional view along a line B-B in

FIG. 16;

FIG. 21 is a non-limiting example of a cross-sectional view along a line X-X in

FIG. 20;

FIG. 22 is a non-limiting example of a cross-sectional view along a line Y-Y in

FIG. 20;

DETAILED DESCRIPTION OF NON-LIMITING EXAMPLE EMBODIMENTS

With reference to the drawings, a game controller 1 according to an exemplary embodiment is described below. FIG. 1 is a diagram showing an example of a game system including the game controller 1 according to the exemplary embodiment.

As shown in FIG. 1, the game system includes the game controller 1, a game apparatus 100, and a display apparatus 200. The game apparatus 100 includes a CPU, a RAM, and a storage device (a non-volatile memory, an optical disc, a magnetic disk, or the like) (not shown). The CPU of the game apparatus 100 can execute game processing based on a predetermined game program, and outputs the result of the game processing to the display apparatus 200. As the display apparatus 200, for example, a liquid crystal display apparatus or an organic EL display apparatus may be used. It should be noted that the game apparatus 100 may be a stationary game apparatus, or may be a mobile game apparatus integrated with the display apparatus 200. Further, the game apparatus 100 is not limited to an apparatus designed for games, and may be an information processing apparatus capable of executing any program for a personal computer, a smartphone, or the like other than a game program.

The game apparatus 100 and the game controller 1 are connected together in a wired or wireless manner, and operation data corresponding to an operation performed on the game controller 1 is output to the game apparatus 100. For example, the game controller 1 and the game apparatus 100 may be connected together using Bluetooth (registered trademark).

Figure 2:
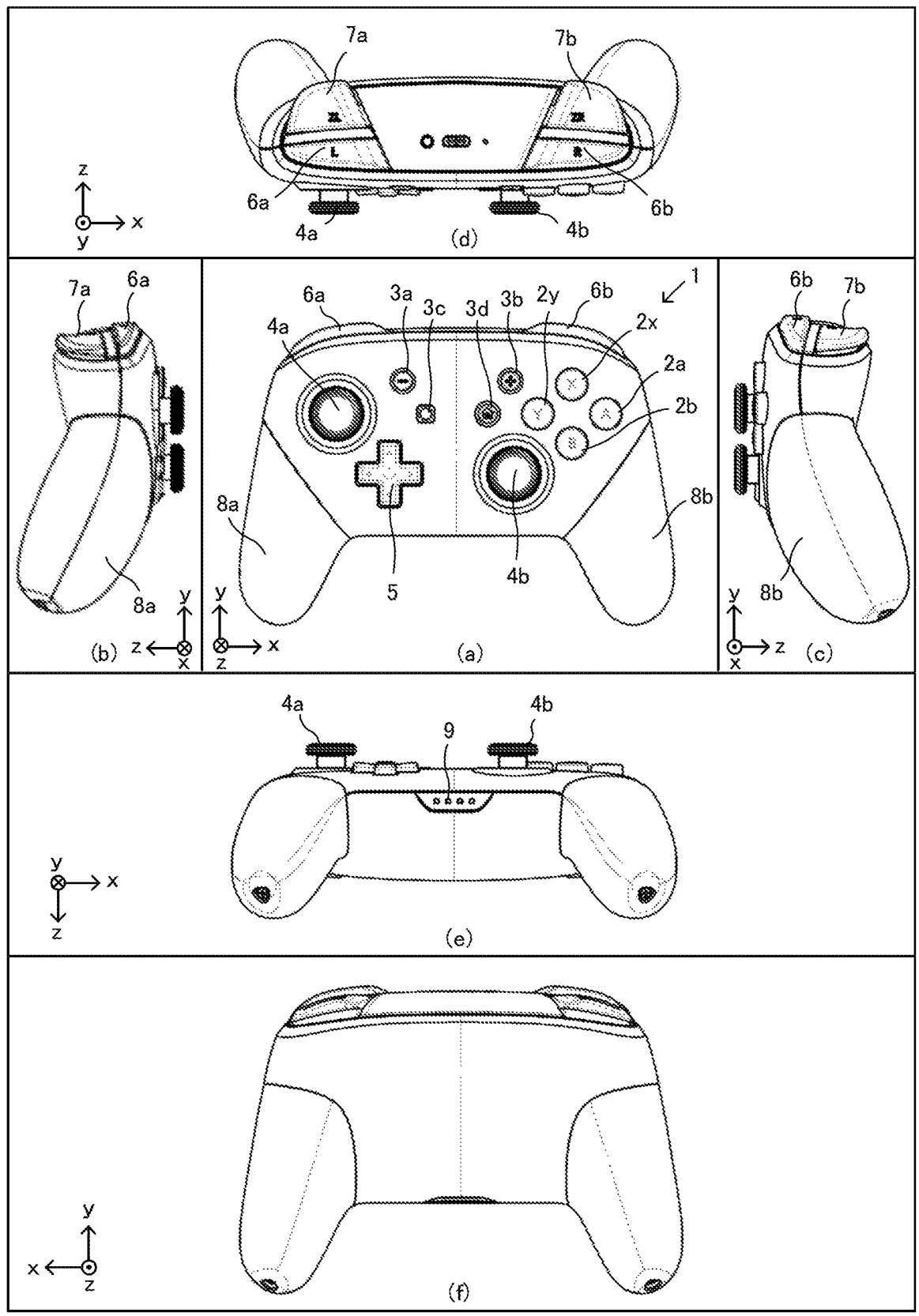
FIG. 2 is an external view of a non-limiting example of the game controller 1.

The details of the game controller 1 are described below. FIG. 2 is an external view of the game controller 1. (a) of FIG. 2 is a front view of the game controller 1. (b) of FIG. 2 is a left side view of the game controller 1. (c) of FIG. 2 is a right side view of the game controller 1. (d) of FIG. 2 is a top view of the game controller 1. (e) of FIG. 2 is a bottom view of the game controller 1. (f) of FIG. 2 is a rear view of the game controller 1. An xyz coordinate system in FIG. 2 is a coordinate system with respect to the game controller 1 and is defined such that a direction perpendicular to a front surface of the game controller 1 (e.g., a direction of pressing an A-button 2a) is a z-axis direction, a left-right direction of the game controller 1 (e.g., a direction connecting the A-button 2a and a Y-button 2y) is an x-axis direction, and an up-down direction of the game controller 1 (e.g., a direction connecting a B-button 2b and an X-button 2x) is a y-axis direction.

As shown in (a) of FIG. 2, in a right region of the front surface of the game controller 1, an A-button 2a, a B-button 2b, an X-button 2x, and a Y-button 2y are placed. Further, on the right side in a center region of the front surface of the game controller 1, a plus button 3b and a home button 3d are placed. Further, below the Y-button 2y and the home button 3d, a right analog stick 4b is placed.

Further, on the left side in the center region of the front surface of the game controller 1, a minus button 3a and a capture button 3c are placed. Further, in a left region of the front surface of the game controller 1, a left analog stick 4a is placed. Further, below the minus button 3a and the capture button 3c, a directional pad 5 is placed.

The A-button 2a, the B-button 2b, the X-button 2x, and the Y-button 2y are buttons capable of being pressed in a depth direction (a positive z-axis direction) in (a) of FIG. 2 and are buttons used for a game operation. Further, the minus button 3a, the plus button 3b, the capture button 3c, and the home button 3d are buttons capable of being pressed in the positive z-axis direction. The home button 3d may be used for, for example, an operation different from a game operation. If the home button 3d is pressed, a menu screen or a setting screen of the game apparatus 100 may be displayed. For example, a user can press the home button 3d at any timing while the game apparatus 100 is executing a game program. If the home button 3d is pressed while a game program is being executed, the game program that is being executed is interrupted, and a predetermined menu screen is displayed. Further, by the pressing of the home button 3d, an on state and an off state of a power supply of the game apparatus 100 or an on state and an off state of the sleep of the game apparatus 100 may be controlled. The capture button 3c is a button used to capture, for example, an image displayed on the display apparatus 200. The capture button 3c and the home button 3d are buttons that are not used for a normal game operation and therefore are used less frequently than other buttons for a game operation (the A-button 2a, the B-button 2b, the X-button 2x, the Y-button 2y, an L-button 6a, an R-button 6b, a ZL-button 7a, a ZR-button 7b, and the like) during a game. It should be noted that the details of the structure of the home button 3d will be described later.

Further, the left analog stick 4a and the right analog stick 4b are devices for indicating a direction and are each configured such that a stick portion operated by the finger of the user can be tilted in any directions (at any angles in up, down, left, right, and oblique directions). It should be noted that the left analog stick 4a and the right analog stick 4b may be able to be pressed in the positive z-axis direction. The directional pad 5 is a device for indicating the up, down, left, and right directions.

It should be noted that the positions of the left analog stick 4a, the directional pad 5, the right analog stick 4b, the A-button 2a, the B-button 2b, the X-button 2x, and the Y-button 2y are not limited to those shown in FIG. 2. For example, the left analog stick 4a may be provided at the position of the directional pad 5 shown in FIG. 2, and the directional pad 5 may be provided at the position of the left analog stick 4a shown in FIG. 2. Further, the right analog stick 4b may be provided at the positions of the A, B, X, and Y-buttons shown in FIG. 2, and the A, B, X, and Y-buttons may be provided at the position of the right analog stick 4b shown in FIG. 2.

Further, the directional pad 5 may not be configured as an integrated key top, and may be configured as independent four buttons. That is, a button corresponding to the up direction of the directional pad 5, a button corresponding to the right direction of the directional pad 5, a button corresponding to the down direction of the directional pad 5, and a button corresponding to the left direction of the directional pad 5 may be provided as independent buttons.

The key tops of the left analog stick 4a and the right analog stick 4b are the same in shape, size, and material. The left analog stick 4a and the right analog stick 4b, however, are different in the weight of tilting the analog stick (the magnitude of the force required to tilt the analog stick at the same angle). Specifically, within each of the left analog stick 4a and the right analog stick 4b, an elastic member (a spring) is provided, and the key top is configured such that when the key top is tilted, the key top returns to the previous position by the restoring force of the elastic member. The characteristics (the spring constants) of these elastic members provided within the analog sticks are different, whereby the left analog stick 4a and the right analog stick 4b are different in weight.

Specifically, the left analog stick 4a is lighter than the right analog stick 4b. Although depending on the game program executed by the game apparatus 100, for example, the left analog stick 4a is used for the operation of moving a game character. On the other hand, the right analog stick 4b is used to move a virtual camera or move a target for the user to take aim. In a case where an object is moved using an analog stick, and if the analog stick is too light, the analog stick is greatly tilted by a small force. Thus, the user cannot move the object as intended. Thus, the right analog stick 4b is heavier than the left analog stick 4a, whereby, for example, in a case where the virtual camera is moved using the right analog stick 4b, it is possible to move the virtual camera more finely and improve the operability.

It should be noted that the left analog stick 4a and the right analog stick 4b may be the same in weight. Alternatively, the right analog stick 4b may be lighter than the left analog stick 4a. Yet alternatively, the left analog stick 4a and the right analog stick 4b may be different in shape, size, and material.

It should be noted that to vary the operational feelings of the left analog stick 4a and the right analog stick 4b, other than the weights of the left analog stick 4a and the right analog stick 4b, the left analog stick 4a and the right analog stick 4b may be configured as follows. For example, the left analog stick 4a and the right analog stick 4b may be different in the tilting range (the movable range) of the key top. Alternatively, the left analog stick 4a and the right analog stick 4b may be different in sensitivity (resolution). For example, the tilting range of the right analog stick 4b is greater than that of the left analog stick 4a, whereby it is possible to perform a more precise operation when moving the virtual camera or the target. Further, the sensitivity of the right analog stick 4b is lower than the left analog stick 4a, whereby it is possible to perform a precise operation. Thus, it is possible to prevent an unintended input. Conversely to the above, the tilting range of the left analog stick 4a may be greater than that of the right analog stick 4b. Alternatively, the sensitivity of the left analog stick 4a may be lower than that of the right analog stick 4b. Further, the left analog stick 4a and the right analog stick 4b may be different in any one, or two or more, of "weight", "tilting range", and "sensitivity".

Figure 3:
FIG. 3 is a diagram showing a non-limiting example of a top surface portion of each of a left analog stick 4a and a right analog stick 4b.

FIG. 3 is a diagram showing an example of a top surface portion of each of the left analog stick 4a and the right analog stick 4b. FIG. 3 is a side view of the top surface portion (a portion to be touched by the user) of the analog stick 4a or 4b. As shown in FIG. 3, a top surface of each of the left analog stick 4a and the right analog stick 4b has a recessed portion in its center. The recessed portion is circular when the analog stick is viewed from above. The recessed portion is so shaped as to slightly swell upward. The height of the highest portion of the recessed portion is approximately the same as the height of the highest portion of an outer periphery of the recessed portion. Further, on a side surface of the top surface portion of each of the left analog stick 4a and the right analog stick 4b, a plurality of ribs (recesses and protrusions) that go around the top surface are formed in a concentric circle. This makes the finger of the user likely to be caught on the side surface of the top surface portion of the analog stick. That is, when the analog stick is tilted in any direction, the finger of the user is less likely to slide. This improves the operability. Further, in a center portion of the top surface of the analog stick, a rib is not provided, thereby improving the feel when the finger of the user operates the analog stick.

Further, as shown in (e) of FIG. 2, four LEDs 9 are provided on a lower surface of the game controller 1. If a plurality of game controllers 1 are connected to the game apparatus 100, the LEDs 9 emit light so that each game controller 1 can be identified by the user. For example, if four game controllers 1 are connected to the game apparatus 100, then in a first game controller 1, only the first one from the left among the four LEDs 9 emits light. In a second game controller 1, only the second one from the left among the four LEDs 9 emits light. In a third game controller 1, only the third one from the left among the four LEDs 9 emits light. In a fourth game controller 1, only the fourth one from the left among the four LEDs 9 emits light. It should be noted that each of a plurality of game controllers may be distinguished by the number of beams of light emitted by the four LEDs 9.

As shown in FIG. 2, to the left and right of the center of the game controller 1, grip portions 8a and 8b, which protrude downward (in a negative y-axis direction), are provided, respectively. The grip portion 8a is held by the left hand of the user. The grip portion 8b is held by the right hand of the user. As shown in (b) and (c) of FIG. 2, the grip portions 8a and 8b are formed so as to be curved in the direction of a back surface of the game controller 1 (the positive z-axis direction).

Further, as shown in (d) of FIG. 2, on an upper surface of the game controller 1, an L-button 6a, a ZL-button 7a, an R-button 6b, and a ZR-button 7b are provided. Specifically, the L-button 6a is provided in a left end portion on the upper surface of the game controller 1. The ZL-button 7a is provided to the side of the L-button 6a closer to the back surface of the game controller 1 (further in the positive z-axis direction). Further, the R-button 6b is provided in a right end portion on the upper surface of the game controller 1. The ZR-button 7b is provided to the side of the R-button 6b closer to the back surface of the game controller 1 (further in the positive z-axis direction).

The L-button 6a, the R-button 6b, the ZL-button 7a, and the ZR-button 7b are buttons used for a game operation. The ZL-button 7a and the ZR-button 7b may be trigger buttons.

Further, each of the buttons (A, B, X, Y, L, R, ZL, and ZR-buttons) in the exemplary embodiment is a button capable of outputting a signal (an ON/OFF signal) indicating whether or not the button is pressed. Alternatively, in another exemplary embodiment, each of the ZL-button 7a and the ZR-button 7b may be a button capable of outputting an analog value corresponding to the amount of pressing of the button. For example, if the user pushes down the ZL-button 7a or the ZR-button 7b to a first position, an analog value corresponding to the first position may be output. If the user pushes down the button to a second position below the first position, an analog value corresponding to the second position may be output.

Figure 4:
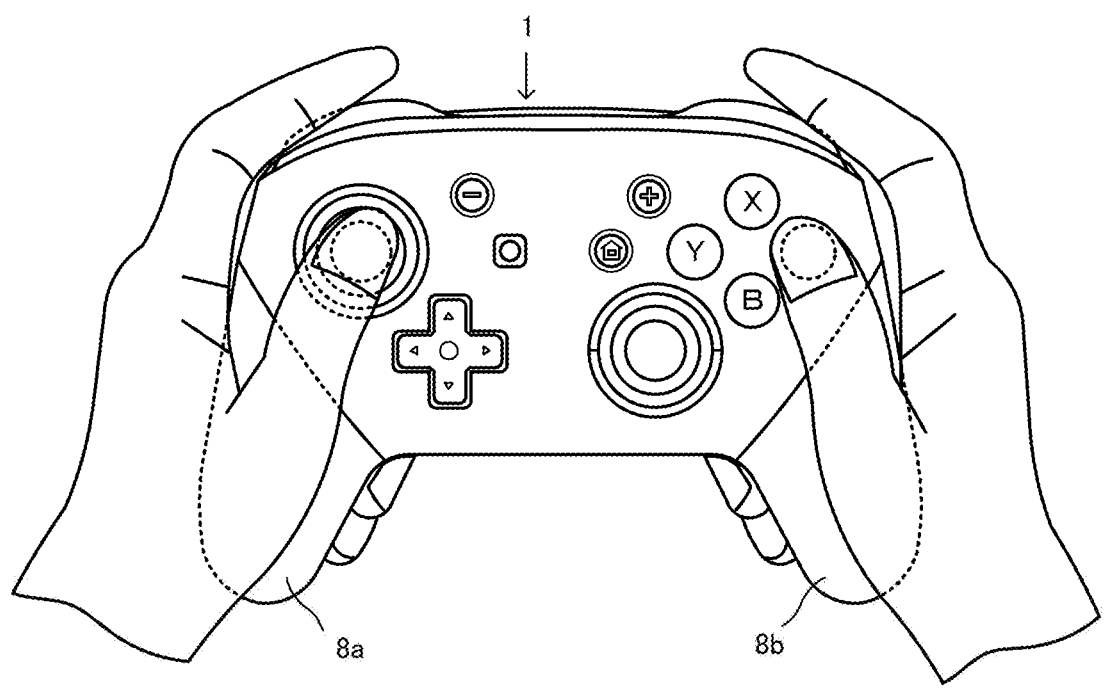
FIG. 4 is a diagram showing a non-limiting example of the state where a user holds the game controller 1 with both hands.

FIG. 4 is a diagram showing the state where the user holds the game controller 1 with both hands. As shown in FIG. 4, if the user holds the grip portion 8a with their left hand and holds the grip portion 8b with their right hand, the user can operate the left analog stick 4a and the directional pad 5 with the thumb of the left hand. Further, the user can operate the minus button 3a and the capture button 3c with the thumb of the left hand. Further, the user can operate the L-button 6a and the ZL-button 7a with the index finger (or the middle finger) of the left hand. Further, the user can operate the A-button 2a, the B-button 2b, the X-button 2x, the Y-button 2y, the right analog stick 4b, the plus button 3b, and the home button 3d with the thumb of the right hand. Further, the user can operate the R-button 6b and the ZR-button 7b with the index finger (or the middle finger) of the right hand. It should be noted that FIG. 4 shows the typical manner of holding the game controller 1. Depending on the user, the game controller 1 may be held in a different manner of holding the game controller 1.

[Details of L/R Button and ZL/ZR Button]

Next, a description is given of the details of the L-button 6a, the ZL-button 7a, the R-button 6b, and the ZR-button 7b, which are provided on the upper surface of the game controller 1.

Figure 5:
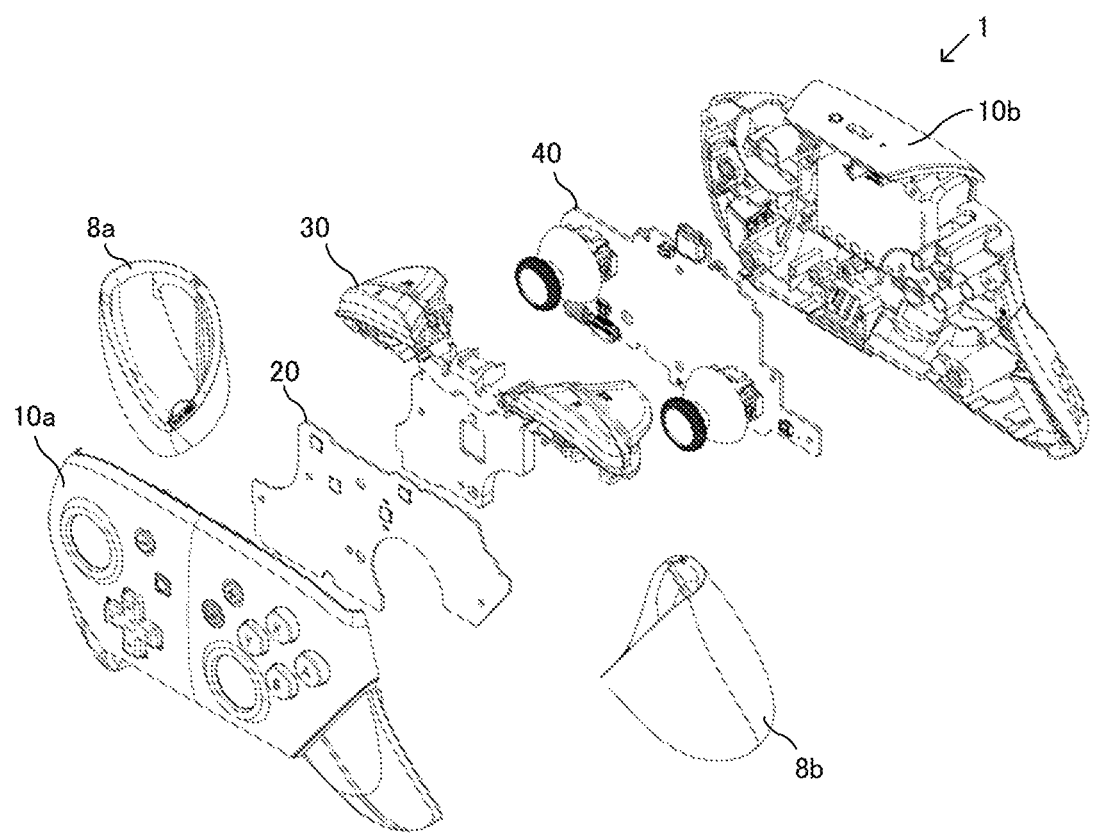
FIG. 5 is an exploded perspective view of a non-limiting example of the game controller 1.

FIG. 5 is an exploded perspective view of the game controller 1. As shown in FIG. 5, a housing 10 of the game controller 1 is formed by connecting a first housing 10a on the front surface side of the game controller 1 and a second housing 10b on the back surface side of the game controller 1. Within the housing 10, a button frame 30 is accommodated. Further, within the housing 10, a first substrate 20 and a second substrate 40 are accommodated.

Figure 6:
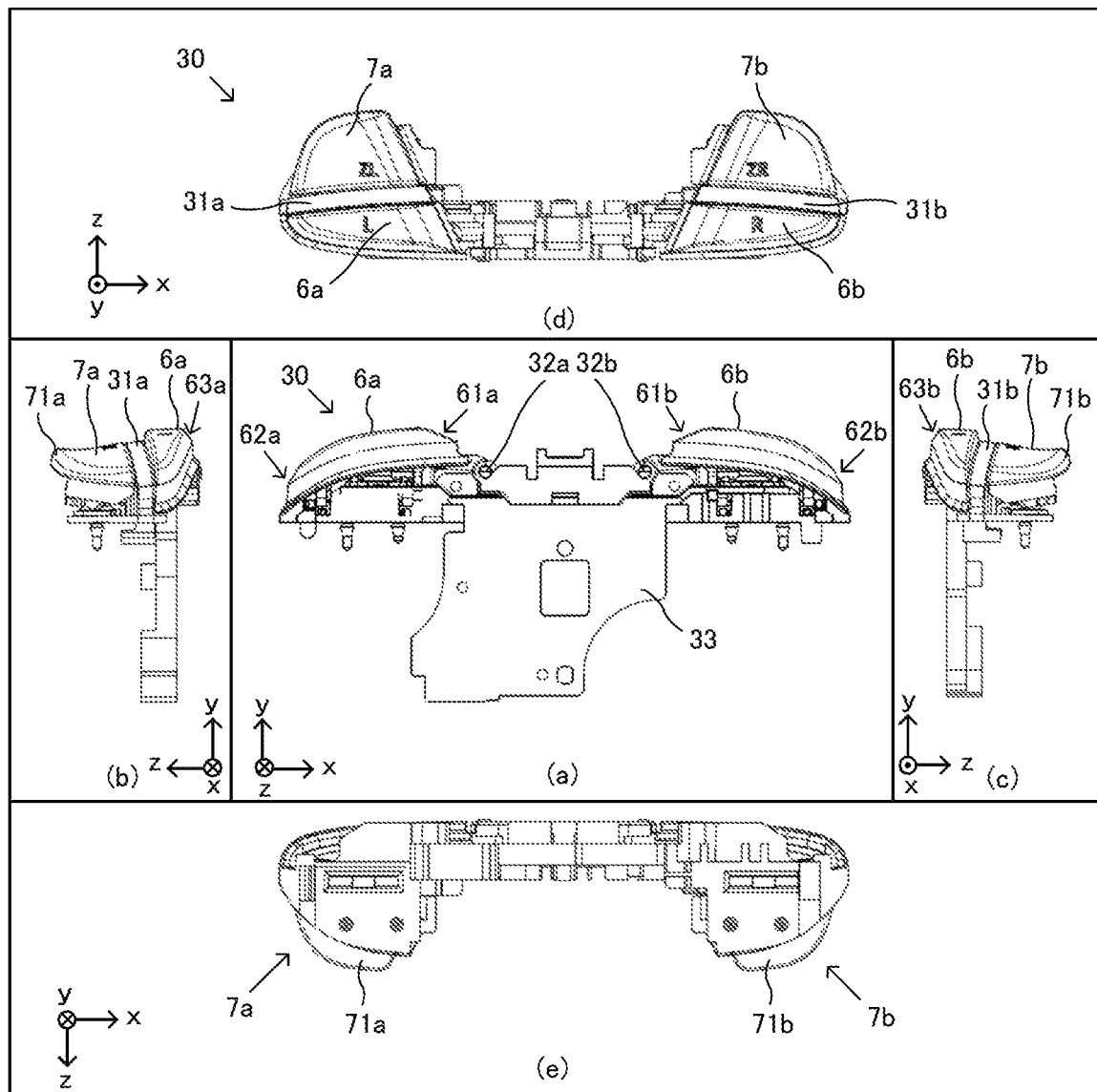
FIG. 6 is an external view of a non-limiting example of a button frame 30.

FIG. 6 is an external view of the button frame 30. (a) of FIG. 6 is a front view of the button frame 30 (a diagram showing the button frame 30 as viewed from the front of the game controller 1). (b) of FIG. 6 is a left side view of the button frame 30. (c) of FIG. 6 is a right side view of the button frame 30. (d) of FIG. 6 is a top view of the button frame 30. (e) of FIG. 6 is a bottom view of the button frame 30. It should be noted that an x-axis, a y-axis, and a z-axis in FIG. 6 correspond to the x-axis, the y-axis, and the z-axis, respectively, in FIG. 2.

Figure 7:
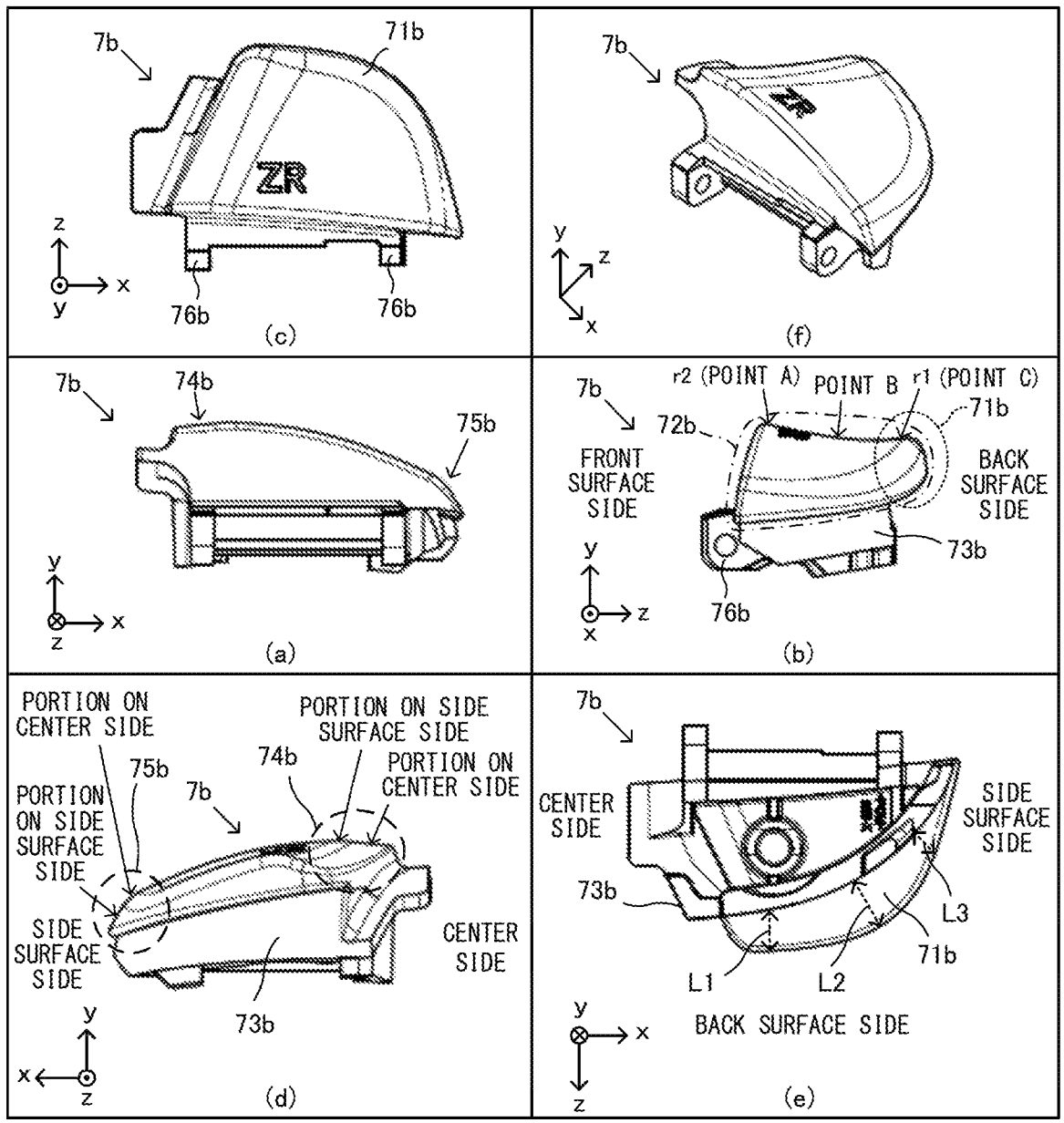
FIG. 7 is an external view of a non-limiting example of a key top of a ZR-button 7b.

FIG. 7 is an external view of the key top of the ZR-button 7b. (a) of FIG. 7 is a front view of the key top of the ZR-button 7b (a diagram showing the key top of the ZR-button 7b as viewed from the front of the game controller 1). (b) of FIG. 7 is a right side view of the key top of the ZR-button 7b. (c) of FIG. 7 is a top view of the key top of the ZR-button 7b. (d) of FIG. 7 is a rear view of the key top of the ZR-button 7b. (e) of FIG. 7 is a bottom view of the key top of the ZR-button 7b. (f) of FIG. 7 is a perspective view of the key top of the ZR-button 7b. It should be noted that an x-axis, a y-axis, and a z-axis in FIG. 7 correspond to the x-axis, the y-axis, and the z-axis, respectively, in FIG. 2.

It should be noted that the ZL-button 7a and the ZR-button 7b are symmetrical, and the ZL-button 7a and the ZR-button 7b have the same shape. Further, the L-button 6a and the R-button 6b are symmetrical, and the L-button 6a and the R-button 6b have the same shape. Hereinafter, although only either one of the ZL-button 7a and the ZR-button 7b will be described, the same applies to the other button. Further, although only either one of the L-button 6a and the R-button 6b will be described, the same applies to the other button. Further, hereinafter, the L-button 6a and the R-button 6b will occasionally be collectively referred to as an "L/R button 6", and the ZL-button 7a and the ZR-button 7b will occasionally be collectively referred to as a "ZL/ZR button 7".

As shown in FIG. 6, the L-button 6a, the R-button 6b, the ZL-button 7a, and the ZR-button 7b are formed integrally with a frame portion 33, which is accommodated within the housing 10. Further, as will be described later, a button detection section for each button is also formed integrally. If the button frame 30 is accommodated in the housing 10, the L-button 6a, the R-button 6b, the ZL-button 7a, and the ZR-button 7b are exposed through an upper surface of the housing 10.

(Description of L/R Button)

As shown in (d) of FIG. 6, the R-button 6b is so shaped as to be horizontally long (is so shaped as to be long in the x-axis direction). That is, the R-button 6b is formed such that the length of the R-button 6b in the direction of the side surface of the game controller 1 is longer than the length of the R-button 6b in the direction of the back surface of the game controller 1. Further, the further in the direction of the side surface (the further in a positive x-axis direction) from the center of the game controller 1, the smaller the width of the R-button 6b.

Further, as shown in (a) of FIG. 6, the further in the direction of the side surface from the center in the left-right direction of the game controller 1, the further downward the R-button 6b slopes overall.

Figure 8A:
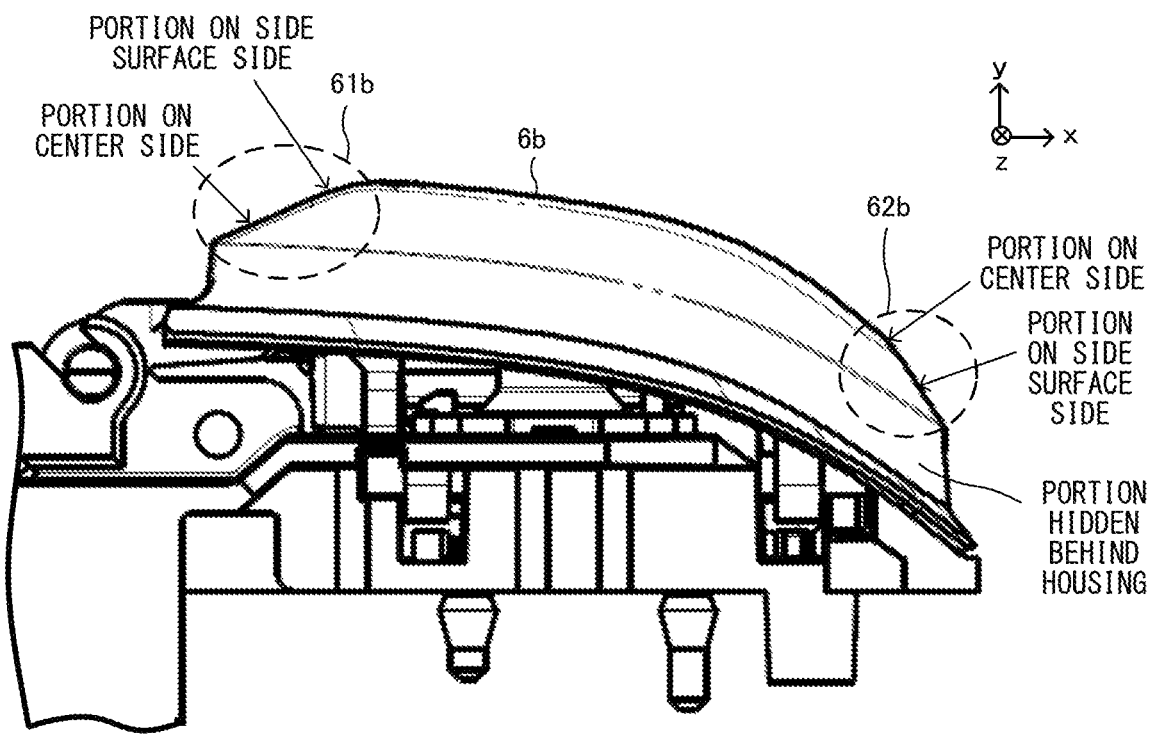
FIG. 8A is a partially enlarged view of a non-limiting example of an R-button 6b as viewed from its front.
Figure 8B:
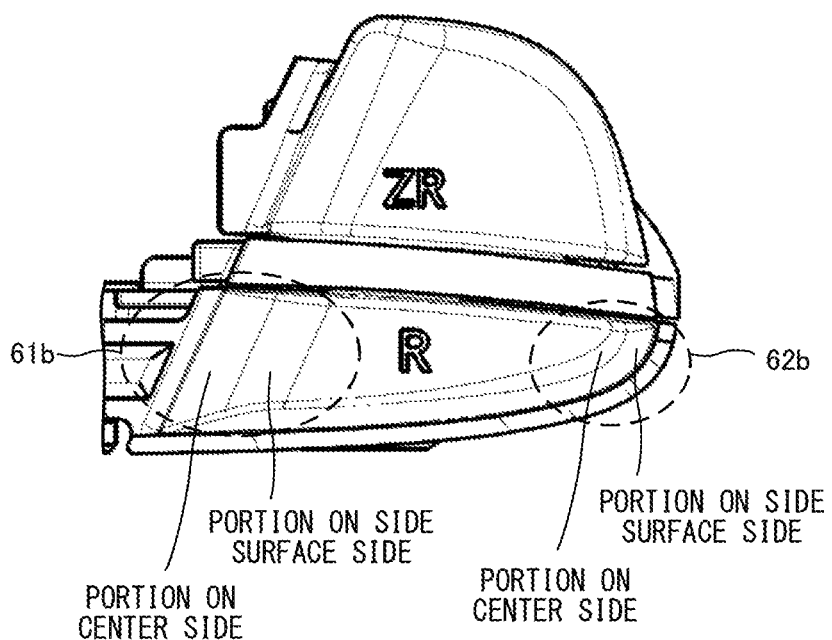
FIG. 8B is a partially enlarged view of a non-limiting example of the R-button 6b as viewed from its upper surface.
Figure 8C:
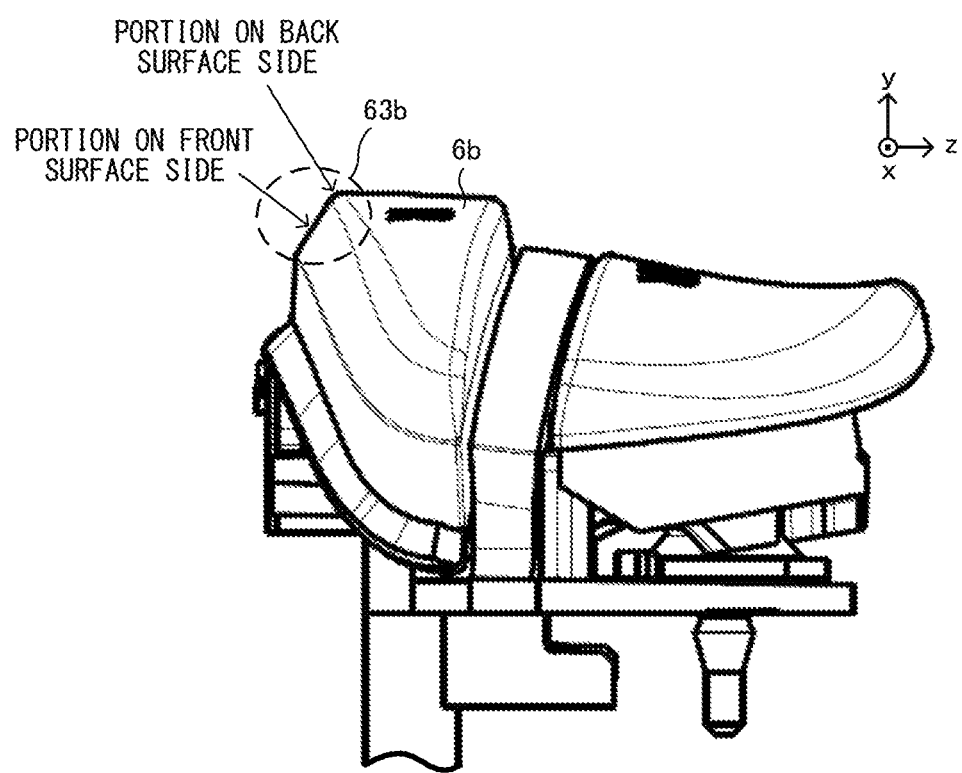
FIG. 8C is a partially enlarged view of a non-limiting example of the R-button 6b as viewed from its right side surface.

Specifically, as shown in (a) of FIG. 6, in an end portion of the R-button 6b on the center side in the left-right direction of the game controller 1 (further in a negative x-axis direction), a sloping portion 61b, which slopes downward, is provided. FIG. 8A is a partially enlarged view of the R-button 6b as viewed from its front. FIG. 8B is a partially enlarged view of the R-button 6b as viewed from its upper surface. FIG. 8C is a partially enlarged view of the R-button 6b as viewed from its right side surface.

More specifically, as shown in FIGS. 8A and 8B, the sloping portion 61 in the end portion of the R-button 6b on the center side of the game controller 1 slopes in two steps. A portion of the R-button 6b close to the end portion on the center side of the game controller 1 has a greater sloping angle. That is, the sloping portion 61b of the R-button 6b includes a portion on the side surface side and a portion on the center side. With respect to the horizontal direction (the x-axis direction in the xyz coordinate system), the sloping angle of the portion on the center side is greater than the sloping angle of the portion on the side surface side.

Further, as shown in (a) of FIG. 6, in an end portion of the R-button 6b on the side surface side in the left-right direction of the game controller 1 (further in the positive x-axis direction), a sloping portion 62*b*, which slopes downward, is provided.

Specifically, as shown in FIGS. 8A and 8B, the end portion of the R-button 6*b* on the side surface side of the game controller 1 slopes in two steps. A portion of the R-button 6*b* close to the end portion on the side surface side of the game controller 1 has a greater sloping angle. That is, the sloping portion 62*b* of the R-button 6*b* includes a portion on the side surface side and a portion on the center side. With respect to the horizontal direction (the x-axis direction in the xyz coordinate system), the sloping angle of the portion on the side surface side is greater than the sloping angle of the portion on the center side.

Further, as shown in (c) of FIG. 6, in an end portion of the R-button 6*b* on the front surface side of the game controller 1 (further in a negative z-axis direction), a sloping portion 63*b*, which slopes downward, is provided.

Specifically, as shown in FIG. 8C, the sloping portion 63*b* in the end portion of the R-button 6*b* on the front surface side of the game controller 1 slopes in two steps. A portion of the R-button 6*b* close to the end portion on the front surface side of the game controller 1 has a greater sloping angle. That is, the sloping portion 63*b* of the R-button 6*b* includes a portion on the front surface side and a portion on the back surface side. With respect to the horizontal direction (the z-axis direction in the xyz coordinate system), the sloping angle of the portion on the front surface side is greater than the sloping angle of the portion on the back surface side.

As described above, the sloping portion 61*b* is provided in the R-button 6*b* on the center side of the game controller 1, whereby it is easy for even a person having a long finger to operate the R-button 6*b*. That is, if the finger of the user is long, and when the user operates the R-button 6*b*, the tip of the finger reaches the end portion of the R-button 6*b* on the center side of the game controller 1. The sloping portion 61*b*, however, is provided in the end portion on the center side, whereby the sloping portion 61*b* fits the finger, and it is easy for the user to operate the R-button 6*b*.

Further, the sloping portion 62*b* is provided in the end portion of the R-button 6*b* on the side surface side of the game controller 1, whereby it is easy for both a person having a long finger and a person having a short finger to operate the R-button 6*b*. That is, a user having a short finger can operate the R-button 6*b* by placing the tip of the finger on the end portion of the R-button 6*b* on the side surface side of the game controller 1. On the other hand, when a user having a long finger operates the R-button 6*b*, the extremity of the index finger hits the end portion of the R-button 6*b* on the center side, and a portion near the base or the second joint of the finger hits the end portion of the R-button 6*b* on the side surface side. The sloping portion 62*b* is provided in the end portion on the side surface side, whereby, when the end portion of the R-button 6*b* on the center side is pressed by the extremity of the index finger, it is possible to make small a force (a force by reaction) applied to the portion near the base or the second joint of the finger, and make it easy for the user to press the R-button 6*b*.

Further, the sloping portion 63*b* is provided in the end portion of the R-button 6*b* on the front surface side of the game controller 1, whereby it is easy for the user to operate the R-button 6*b*. For example, there is a user who holds the game controller 1 by covering the front surface of the game controller 1 with their hand, without holding the grip portion 8 with both hands as in FIG. 4. The sloping portion 63*b* is provided in the R-button 6*b*, whereby it is also easy for such a user to operate the R-button 6*b* and the ZR-button 7*b*.

Specifically, such a user does not access the L/R button 6 and the ZL/ZR button 7 with their finger (the index finger and/or the middle finger) from the side surface side of the housing 10, and accesses the L/R button 6 and the ZL/ZR button 7 with their finger from the front surface side of the housing 10. Here, if the sloping portion 63 (*a, b*) is not provided in the end portion of the L/R button 6 on the front surface side, the finger hits the corner of the L/R button 6 on the front surface side. This makes it difficult for the user to operate the L/R button 6. Further, when such a user operates the ZL/ZR button 7 on the back surface side, the finger may hit the corner of the L/R button 6 on the front surface side and erroneously press the L/R button 6. In the exemplary embodiment, the sloping portion 63 is provided in the L/R button 6 on the front surface side. Thus, even if the user holds the game controller 1 by covering the front surface of the game controller 1 with their hand, it is easy to operate the L/R button 6 and the ZL/ZR button 7. Thus, it is possible to prevent the user from erroneously pressing the L/R button 6 when operating the ZL/ZR button 7.

Further, as shown in (a) of FIG. 6, the L-button 6*a* and the R-button 6*b* are configured to be pivotable using as pivot points a shaft 32*a* and a shaft 32*b*, respectively, which are placed on the center side of the button frame 30. The shaft 32*a* and the shaft 32*b* are placed so as to extend in the z-axis direction (the direction of the back surface of the game controller 1). The L-button 6*a* extends from the shaft 32*a* in the direction of the side surface of the game controller 1 (the negative x-axis direction). The R-button 6*b* extends from the shaft 32*b* in the direction of the side surface of the game controller 1 (the positive x-axis direction). The L-button 6*a* and the R-button 6*b* are configured to pivot using as pivot points the shaft 32*a* and the shaft 32*b*, respectively, thereby being pressed downward in the game controller 1 (in the negative y-axis direction).

As described above, the L-button 6*a* and the R-button 6*b* pivot using as pivot points the shaft 32*a* and the shaft 32*b*, respectively, which are placed on the center side of the game controller 1, slope overall in the direction of the side surfaces, and include the above sloping portions 61 (*a, b*) and 62 (*a, b*). Thus, it is easy for the user to operate the L-button 6*a* and the R-button 6*b*. For example, in the case of a user having a long finger, the extremity of the index finger is placed on the sloping portion 61*b* on the center side, and the index finger comes into contact with the R-button 6*b*, from the extremity to the base of the finger along a curve downward to the right of the R-button 6*b*. In this case, it is easy for the user to press the R-button 6*b* with the entirety of the index finger. Particularly, if the sloping portion 61*b* (see FIG. 8A) is pressed in a direction perpendicular to the sloping surface, the force of the pressing causes the R-button 6*b* to pivot using the shaft 32*b* as a pivot point. Thus, it is also easy for a user having a long finger to operate the R-button 6*b*. Further, in the case of a user having a short finger, for example, the extremity of the index finger is placed on the sloping portion 62*b* on the side surface side. In this case, it is easy for the user to press the R-button 6*b* with the extremity of the index finger. Particularly, if the sloping portion 62*b* (see FIG. 8A) is pressed in the direction perpendicular to the sloping surface, the force of the pressing causes the R-button 6*b* to pivot using the shaft 32*b* as a pivot point. Thus, it is also easy for a user having a short finger to operate the R-button 6*b*.

(Description of ZR/ZL-Button) Next, the ZR/ZL-button is described. As shown in FIG. 6, the ZL-button 7*a* is placed to the side of the L-button 6*a* closer to the back surface of the game controller 1. Further, the ZR-button 7*b* is placed to the side of the R-button 6b closer to the back surface of the game controller 1. The ZL-button 7a and the ZR-button 7b are so shaped as to be horizontally long (are so shaped as to be long in the x-axis direction). That is, the ZL-button 7a and the ZR-button 7b are each formed such that the length of the button in the direction of the side surface of the game controller 1 is longer than the length of the button in the direction of the back surface of the game controller 1.

As shown in FIG. 6, the ZR-button 7b includes a protruding portion 71b, which protrudes in the direction of the back surface of the game controller 1 (the positive z-axis direction) and the direction of the side surface of the game controller 1 (the positive x-axis direction: the right direction). Similarly, the ZL-button 7a includes a protruding portion 71a, which protrudes in the direction of the back surface of the game controller 1 (the positive z-axis direction) and the direction of the side surface of the game controller 1 (the negative x-axis direction: the left direction).

Specifically, as shown in (b) of FIG. 7, the ZR-button 7b includes an upper portion 72b, which includes the protruding portion 71b, and a lower portion 73b, which is below the upper portion 72b. The upper portion 72b of the ZR-button 7b is a portion with which the user comes into direct contact when pressing the button. If the ZR-button 7b is integrated with the button frame 30, and the button frame 30 is accommodated in the housing 10, the upper portion 72b of the ZR-button 7b is exposed to the outside, whereas the lower portion 73b of the ZR-button 7b is almost hidden behind the housing 10 (see FIG. 2). As shown in (e) of FIG. 7, the protruding portion 71b protrudes further in the positive z-axis direction (the direction of the back surface of the game controller 1) and the positive x-axis direction (the direction of the side surface of the game controller 1) than the outer edge of the upper end of the lower portion 73b.

More specifically, the protruding portion 71b extends continuously from the back surface side to the side surface side of the game controller 1. A portion of the protruding portion 71b extending from the back surface side to the side surface side of the game controller 1 (a portion in an oblique direction between the z-axis and the x-axis shown in (e) of FIG. 7) has a circular arc shape (a round shape). Further, as shown in (e) of FIG. 7, a protruding length L2 in the positive z-axis direction and the positive x-axis direction is longer than a protruding length L1 in the positive z-axis direction. That is, the protruding portion 71b is configured such that the length L2 in the oblique direction between the z-axis and the x-axis is longer than the length L1 in the direction along the z-axis. Further, the closer to the side surface, the smaller the degree of protrusion of the protruding portion 71b. Specifically, in (e) of FIG. 7, a length L3 is shorter than the length L2. In an end portion of a side surface of the ZR-button 7b, the protruding portion 71b slightly protrudes further than the lower portion 73b in the positive x-axis direction (the right direction).

As described above, the ZL-button 7a and the ZR-button 7b include the protruding portions 71 (a and b), which protrude in both the direction of the back surface and the direction of the side surface. This makes it possible to increase the areas of the upper surfaces of the key tops of the ZL-button 7a and the ZR-button 7b. Thus, it is easy for the user to operate the ZL-button 7a and the ZR-button 7b. If the entirety of the ZL-button 7a and the ZR-button 7b (the entirety of the buttons including the upper portion 72b and the lower portion 73b) is made large, the areas of the upper surfaces of the key tops of the ZL-button 7a and the ZR-button 7b can also be increased. However, the entirety of the buttons becomes large, and therefore, the housing 10 also becomes large. However, the protruding portions 71 are provided in the ZL-button 7a and the ZR-button 7b as in the exemplary embodiment, whereby it is possible to increase the areas of the upper surfaces of the key tops of the buttons without making the entirety of buttons large. Thus, it is possible to make the key tops of the ZL-button 7a and the ZR-button 7b large without making the entirety of the housing large, and therefore make it easy for the user to operate the ZL-button 7a and the ZR-button 7b.

In the exemplary embodiment, the ZL-button 7a and the ZR-button 7b protrude not only in the direction of the back surface but also in the direction of the side surface. Thus, it is easy for even a user having a short finger to operate the ZL-button 7a and the ZR-button 7b. That is, the ZL/ZR button 7 protrudes not only in the direction of the back surface but also in the direction of the side surface. Thus, the user can operate the ZL/ZR button 7 by placing their finger on, for example, a portion protruding in the direction of the side surface of the ZL/ZR button 7. For example, the ZR-button 7b protrudes in the direction of the side surface (the right direction). Thus, the user accesses the ZR-button 7b with the finger of their right hand from the right side surface of the game controller 1 and places the finger in the portion protruding in the direction of the side surface of the ZR-button 7b, and thereby can press the ZR-button 7b. In the ZR-button 7b, the protruding portion 71b, which protrudes in the direction of the right side surface, is provided. Thus, it is easy for even a user having a short finger to place their finger on the right side surface of the ZR-button 7b. Thus, the user can easily operate the ZR-button 7b. Further, the user can operate the ZL/ZR button 7 by placing their finger on, for example, the round-shaped portion between the ZL/ZR button 7 in the direction of the side surface and the direction of the back surface. This enables the user to operate the ZL/ZR button 7 without stretching their finger to a portion of the ZL/ZR button 7 on the center side (e.g., a portion protruding only in the direction of the back surface).

Further, the protruding portion 71 of the ZL/ZR button 7 extends continuously from the back surface side to the side surface side. The portion of the ZL/ZR button 7 from the back surface side to the side surface side has a round shape. Thus, there is less visual discomfort than in a case where the ZL/ZR button 7 includes a portion protruding only in the direction of the back surface and a portion protruding only in the direction of the side surface. This also improves the operability. In a case where the protruding portion 71 of the ZL/ZR button 7 is divided into a portion protruding only in the direction of the back surface and a portion protruding only in the direction of the side surface, and a portion from the back surface side to the side surface side does not protrude in the direction of the back surface and the direction of the side surface, the button has a discontinuous shape, which is unnatural. Further, in the case of a button having such a shape, the user operates the button by placing their finger on the portion protruding only in the direction of the back surface or the portion protruding only in the direction of the side surface. Thus, if the finger enters between these portions (between the direction of the back surface and the direction of the side surface), the user cannot operate the button. In contrast, the protruding portion 71 of the ZL/ZR button 7 is formed continuously from the back surface side to the side surface side, and the portion from the back surface side to the side surface side has a round shape, which results in a natural shape. Further, the game controller 1 according to the exemplary embodiment is so shaped as to be curved overall, and the round-shaped portion of the protruding portion 71 of the ZL/ZR button 7 matches the shape of the entirety of the game controller 1. Thus, there is no visual discomfort. Further, the protruding portion 71 of the ZL/ZR button 7 is formed continuously from the back surface side to the side surface side. Thus, the user can press the button at any position in this continuously formed portion. Thus, it is easy for the user to operate the ZL/ZR button 7.

Further, as shown in FIG. 7, an upper surface of the protruding portion 71b of the ZR-button 7b forms an integrated surface with an upper surface of a portion of the ZR-button 7b other than the protruding portion 71b. That is, an upper surface of the ZR-button 7b forms a surface continuous from the portion other than the protruding portion 71b (a portion that does not protrude in the direction of the back surface and the direction of the side surface) to the protruding portion 71b. The upper surface of the ZR-button 7b does not have a difference in level in the boundary between the protruding portion 71b and the portion other than the protruding portion 71b. Thus, there is no discomfort when the user operates the ZR-button 7b.

Further, as shown in (b) of FIG. 7, an end portion, in the direction of the back surface, of the protruding portion 71b has a round shape when viewed from the side surface side of the game controller 1. That is, a portion from the upper surface of the protruding portion 71b to a surface in the direction of the back surface has a round shape. As shown in (b) of FIG. 7, the ZR-button 7b is curved upward in the direction of the back surface. The ZR-button 7b, however, is not sharp in the end portion in the direction of the back surface, and has a round shape. Thus, even if the user presses the end portion, in the direction of the back surface, of the ZR-button 7b with their finger, there is no feeling of discomfort.

Further, as shown in (d) of FIG. 7, in an end portion of the ZR-button 7b on the center side in the left-right direction of the game controller 1 (further in the negative x-axis direction), a sloping portion 74b, which slopes downward, is provided. Specifically, the sloping portion 74b in the end portion of the ZR-button 7b on the center side of the game controller 1 slopes in two steps. A portion of the ZR-button 7b close to the end portion on the center side of the game controller 1 has a slightly great sloping angle. That is, the sloping portion 74b of the ZR-button 7b includes a portion on the side surface side and a portion on the center side. With respect to the horizontal direction (the x-axis direction in the xyz coordinate system), the sloping angle of the portion on the center side is greater than the sloping angle of the portion on the side surface side.

Further, as shown in (d) of FIG. 7, in an end portion of the ZR-button 7b on the side surface side in the left-right direction of the game controller 1 (further in the positive x-axis direction), a sloping portion 75b, which slopes downward, is provided. Specifically, the sloping portion 75b in the end portion of the ZR-button 7b on the side surface side of the game controller 1 slopes in two steps. A portion of the ZR-button 7b close to the end portion on the side surface side of the game controller 1 has a slightly great sloping angle. That is, the sloping portion 75b of the ZR-button 7b includes a portion on the side surface side and a portion on the center side. With respect to the horizontal direction (the x-axis direction in the xyz coordinate system), the sloping angle of the portion on the side surface side is greater than the sloping angle of the portion on the center side.

As described above, the end portion of the ZR-button 7b on the center side of the game controller 1 slopes, whereby it is easy for even a person having a long finger to operate the ZR-button 7b. That is, if the finger of the user is long, and when the user operates the ZR-button 7b, the tip of the finger reaches the end portion of the ZR-button 7b on the center side of the game controller 1. The sloping portion 74b, however, is provided in the end portion on the center side, whereby the sloping portion 74b fits the finger, and it is easy for the user to operate the ZR-button 7b (see FIG. 4).

Further, the end portion of the ZR-button 7b on the side surface side of the game controller 1 slopes, whereby it is easy for both a person having a long finger and a person having a short finger to operate the ZR-button 7b. That is, a user having a short finger can operate the ZR-button 7b by placing the tip of the finger on the end portion of the ZR-button 7b on the side surface side of the game controller 1. On the other hand, when a user having a long finger operates the ZR-button 7b, a portion near the base or the second joint of the index finger hits the end portion of the ZR-button 7b on the side surface side, and the tip of the finger hits the end portion of the ZR-button 7b on the center side. A sloping portion 75d is provided in the end portion on the side surface side, whereby, when the end portion of the ZR-button 7b on the center side is pressed by the extremity of the index finger, it is possible to make small a force (a force by reaction) applied to the portion near the base or the second joint of the finger, and make it easy for the user to press the ZR-button 7b.

Further, as shown in (c) of FIG. 2, the extremity of the ZR-button 7b on the back surface side of the game controller 1 (an end portion in the positive z-axis direction) is located closer to the front surface of the game controller 1 than the outer edge (a surface parallel with the back surface) of a center portion of a back surface of the housing 10 is. Specifically, as shown in (d) of FIG. 2, the extremity of the ZR-button 7b on the back surface side slightly protrudes further to the back surface side than the outer edge of the back surface of the housing 10 at the position of the ZR-button 7b thereof, but is located closer to the front surface than the outer edge of the center portion of the back surface of the housing 10 is. Thus, if the game controller 1 is placed on a planar surface, the game controller 1 is supported by the center portion of the back surface of the housing 10.

Figure 9:
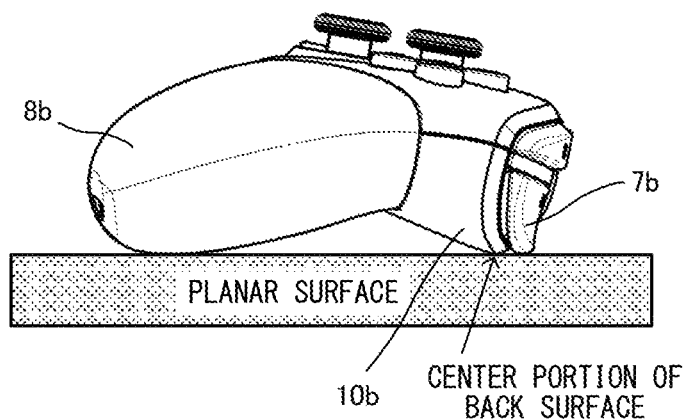
FIG. 9 is a diagram showing, when the game controller 1 is placed on a planar surface, a non-limiting example of the game controller 1 as viewed from a direction parallel with the planar surface.

FIG. 9 is a diagram showing, when the game controller 1 is placed on a planar surface, the game controller 1 as viewed from a direction parallel with the planar surface. As shown in FIG. 9, if the game controller 1 is placed on a planar surface, the grip portion 8a, the grip portion 8b, and the center portion of the back surface of the housing 10 come into contact with the planar surface, and the load of the game controller 1 is applied to these three portions. It should be noted that if the game controller 1 is placed on a planar surface, at least one of the ZL-button 7a and the ZR-button 7b may come into contact with the planar surface. The load, however, is mainly applied to the center portion of the back surface of the housing 10, the grip portion 8a, and the grip portion 8b. Thus, even if the game controller 1 is placed on a planar surface, the ZL-button 7a and the ZR-button 7b are not pressed. Further, even in a case where a large load is applied to the game controller, such as a where the user accidentally steps on the game controller 1 placed on a planar surface, a large load is applied to the center portion of the back surface of the housing 10, the grip portion 8a, and the grip portion 8b, and a large load is not applied to the ZL/ZR button 7. Thus, it is possible to prevent a large load from being applied to the ZL/ZR button 7, which is structurally weaker in strength than the housing 10, and the button from being damaged.

Further, as shown in (b) of FIG. 7, the closer to the back surface side of the game controller 1, the further upward the ZR-button 7b is warped. Specifically, as shown in (c) of FIG. 6 and (b) of FIG. 7, the ZR-button 7b is curved downward from an end portion on the front surface side of the game controller 1 to a center portion of the ZR-button 7b and is curved upward near an end portion on the back surface side of the game controller 1. The degree of warp of the ZR-button 7b gradually becomes larger from the end portion on the front surface side to near the end portion of the back surface side. The ZR-button 7b slopes downward in an end portion on the back surface side (the sloping portion 75d goes around to the back surface side). More specifically, as shown in (b) of FIG. 7, a curvature r1 of the upper surface of the ZR-button 7b on the back surface side of the game controller 1 is greater than a curvature r2 of the upper surface of the ZR-button 7b on the front surface side of the game controller 1. That is, an end portion of the upper surface of the ZR-button 7b on the front surface side (a point A), the center portion of the ZR-button 7b (a point B at the midpoint between the point A and a point C in (b) of FIG. 7), and a portion on the near side (the point C) in an end portion of the ZR-button 7b sloping downward on the back surface side are different in curvature. The closer to the point A, the point B, and the point C, the greater the curvature gradually becomes. Further, a change in the curvature from the point B to the point C is greater than a change in the curvature from the point A to the point B.

As described above, in the game controller 1 according to the exemplary embodiment, the further in the direction of the back surface, the further upward the ZR-button 7b is warped. The degree of warp of the ZR-button 7b gradually becomes larger. The ZR-button 7b slopes downward in the end portion of the back surface side. Thus, it is easy for the user to operate the ZR-button 7b. For example, if the degree of warp of the ZR-button 7b abruptly changes, the ZR-button 7b is a hindrance and makes it difficult for a user having a long finger to operate the button. For example, if the user places their index finger on the back surface of the game controller 1 without placing the finger on the ZR-button 7b when the user does not operate the ZR-button 7b, the user needs to move the finger from the back surface onto the ZR-button 7b when operating the ZR-button 7b. If, however, the degree of warp of the ZR-button 7b abruptly changes, the finger hits the apex of this warped portion. In the game controller 1 according to the exemplary embodiment, however, the degree of warp of the ZR-button 7b gradually becomes larger. Thus, the finger of the user is less likely to hit the apex of the warped portion, and it is easy for the user to operate the ZR-button 7b. Further, the end portion of the ZR-button 7b on the back surface side of the game controller 1 slopes downward. Thus, the finger of the user is less likely to hit the warped portion.

Specifically, in the ZR-button 7b, the sloping portion 71b is provided on the back surface side, and an upper end portion of the second housing 10b does not protrude in the direction of the back surface. Thus, if the user places their finger on the housing 10 on the back surface side, it is easy to access the ZR-button 7b and the R-button 6b. As shown in FIGS. 2 and 7, the extremity of the ZR-button 7b on the back surface side protrudes slightly further to the back surface side than the outer edge of the second housing 10b at the position of the ZR-button 7b. However, the sloping portion 71b is provided, and further, the upper end portion of the second housing 10b does not protrude in the direction of the back surface. Thus, when the user moves their finger from the back surface side of the housing 10 to the positions of the ZR-button 7b and the R-button 6b, the finger is less likely to hit the extremity of the ZR-button 7b on the back surface side and the upper end portion of the housing 10 on the back surface side. Thus, it is possible to smoothly move the finger from the back surface side to the positions of the ZR-button 7b and the R-button 6b.

Further, as shown in (b) and (c) of FIG. 7, the lower portion 73b of the ZR-button 7b includes a bearing portion 76b and is supported to be pivotable by a shaft extending in the left-right direction of the game controller 1 (the x-axis direction). The bearing portion 76b is provided further in the direction of the front surface of the game controller 1 (the negative z-axis direction). The ZR-button 7b is configured to pivot about the shaft, thereby being pressed in the down direction of the game controller 1 (the negative y-axis direction).

Figure 10:
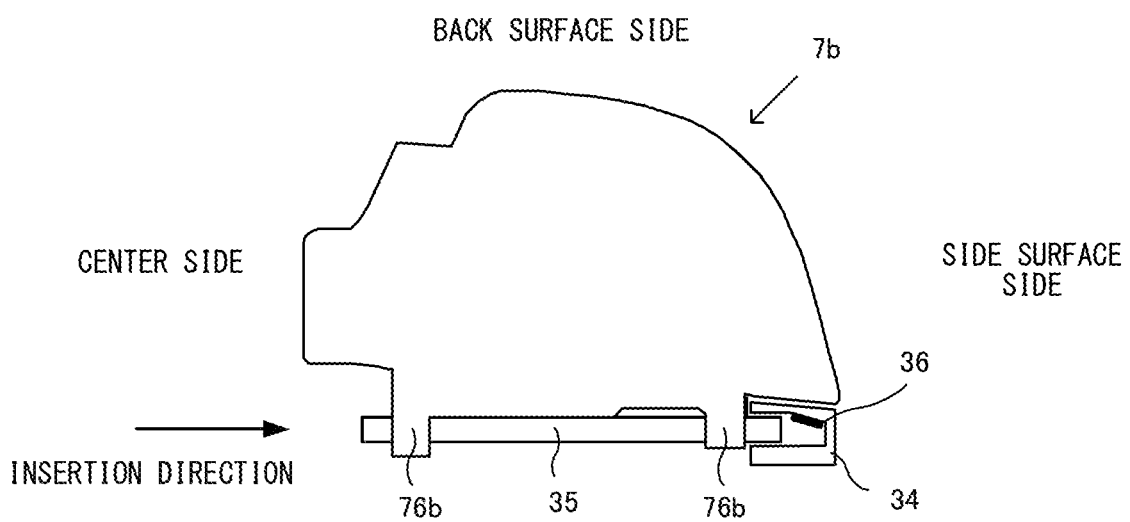
FIG. 10 is a diagram showing a non-limiting example of a structure for fixing the ZR-button 7b to the button frame 30.

FIG. 10 is a diagram showing an example of a structure for fixing the ZR-button 7b to the button frame 30. FIG. 10 is a diagram showing the ZR-button 7b as viewed from its upper surface. As shown in FIG. 10, the ZR-button 7b is supported to be pivotable by a shaft 35. In an end portion of the button frame 30 on the right side, a bearing portion 34, which receives the shaft 35, is provided. The shaft 35 is inserted from the center side of the game controller 1 in the direction of the side surface of the game controller 1, and is not inserted from the side surface side of the game controller 1. The shaft 35 is configured to be inserted only from the center side of the game controller 1, and therefore, it is possible to extend the ZR-button 7b to near an end portion of the side surface of the game controller 1. Further, the entrance of the bearing portion 34 is slightly larger than the diameter of the shaft 35. The further in the depth direction of the bearing portion 34, the narrower the bearing portion 34. For example, a buffer material 36 is applied inside the bearing portion 34 in the depth direction. Consequently, when the shaft 35 is inserted, it is possible to firmly fix the shaft 35 to the button frame 30. It should be noted that the position of the buffer material 36 is not limited to that exemplified in FIG. 10. Alternatively, the buffer material may be provided at any position where the ZR-button 7b comes into contact with a part of the button frame 30.

(Relationship Between L/R Button and ZL/ZR Button)
Next, the relationship between the L/R button and the ZL/ZR button is described. As shown in (d) of FIG. 6, the length in the left-right direction (the x-direction) of the L-button 6a is longer than the length in the left-right direction of the ZL-button 7a. Further, the length in the vertical direction (the z-direction: the direction of the front surface of the game controller 1) of the ZL-button 7a is longer than the length in the vertical direction of the L-button 6a. That is, the ZL-button 7a is formed to so as be longer than the L-button 6a in the direction of the back surface of the game controller 1.

Further, the further in the direction of the side surface of the game controller 1, the further downward the L/R button 6 slopes. Thus, it is easy for the user to operate the ZL/ZR button 7, which is located on the back surface side. Thus, it is possible to prevent the user from erroneously pressing the L/R button 6 when pressing the ZL/ZR button 7. That is, as shown in FIG. 4, if the user presses the ZL/ZR button 7 on the back surface side with their index finger, for example, a portion from the first joint to the second joint of the index finger may touch the L/R button 6. At this time, if the further in the direction of the side surface from the center of the game controller 1, the further downward the L/R button 6 does not slope, the finger is likely to come into contact with the L/R button 6. The L/R button 6, however, slopes downward, and therefore, the finger is less likely to hit an end portion of the L/R button 6 on the side surface side. Thus, it is possible to prevent the user from erroneously pressing the L/R button 6 when pressing the ZL/ZR button 7.

Further, in the end portion of the L/R button 6 on the side surface side, the sloping portion 62 (*a, b*), which slopes in two steps, is provided. Thus, when the user operates the ZL/ZR button 7, the finger is less likely to hit the end portion of the L/R button 6 on the side surface side. Thus, it is possible to prevent the user from erroneously pressing the L/R button 6. For example, a user having a long finger operates the ZL/ZR button 7 by placing the finger in an end portion of the ZL/ZR button 7 on the center side. At this time, a base portion of the finger may hit the end portion of the L/R button 6 on the side surface side. In the exemplary embodiment, the end portion of the L/R button 6 on the side surface side slopes downward, and therefore, the base portion of the finger is less likely to hit the end portion of the L/R button 6 on the side surface side. Thus, it is possible to prevent the user from erroneously pressing the L/R button 6 when operating the ZL/ZR button 7.

Further, the closer to the side surface of the game controller 1, the smaller the width (the width in the z-direction) of the L/R button 6. This makes it possible to prevent the user from erroneously pressing the L/R button 6 when pressing the ZL/ZR button 7. For example, if the width of the L/R button 6 is great in an end portion of the side surface of the L/R button 6, and when the user operates the ZL/ZR button 7 by moving their finger from the position of the L/R button 6 to the position of the ZL/ZR button 7, the finger may touch the end portion of the side surface of the L/R button 6, and the user may erroneously press the L/R button 6. However, the closer to the side surface, the smaller the width of the L/R button 6. Thus, it is possible to prevent the user from erroneously pressing the L/R button 6.

Further, the L/R button 6 includes the sloping portion 63 (*a, b*) in an end portion of the L/R button 6 on the front surface side. Thus, when the user places their finger on the front surface side of the housing 10, it is easy to access the L/R button 6, and it is also easy to access the ZL/ZR button 7. That is, the end portion of the L/R button 6 on the front surface side slopes, and therefore, when the user moves their finger from the front surface side of the housing 10 to the ZL/ZR button 7, it is possible to prevent the finger from touching the L/R button 6. Further, as described above, the end portion of the L/R button 6 on the front surface side slopes. Thus, also in the case of a user who holds the game controller 1 by covering the front surface of the game controller 1 with their hand, without holding the grip portion 8 of the game controller 1, it is easy for the user to operate the ZL/ZR button 7. Thus, it is possible to prevent the user from erroneously pressing the L/R button 6 when operating the ZL/ZR button 7.

Further, as shown in (d) of FIG. 6, the ZR-button 7*b* is located closer to the side surface of the game controller 1 than the R-button 6*b* is. Specifically, the left end (an end portion on the center side in the left-right direction of the game controller 1) of the ZR-button 7*b* is located closer to the side surface of the game controller 1 (further in the positive x-axis direction) than the left end (an end portion on the center side in the left-right direction of the game controller 1) of the R-button 6*b*. On the other hand, the right end (an end portion on the side surface side in the left-right direction of the game controller 1) of the ZR-button 7*b* is approximately coincide with the right end (an end portion on the side surface side in the left-right direction of the game controller 1) of the R-button 6*b*. Thus, the center position of the ZR-button 7*b* is located closer to the side surface of the game controller 1 than the center position of the R-button 6*b* is. The button detection sections provided below the ZR-button 7*b* and the R-button 6*b* also have a similar positional relationship.

Figure 11:
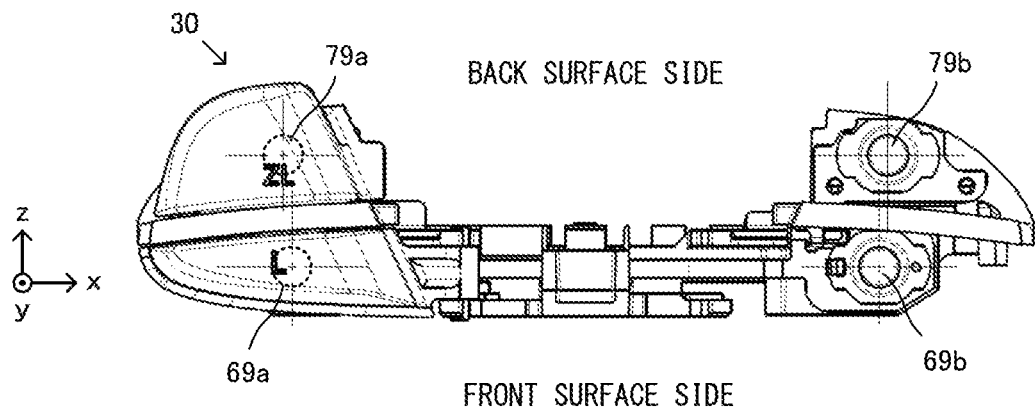
FIG. 11 is a top view of a non-limiting example of the button frame 30 when the key tops of the R-button 6b and the ZR-button 7b are removed.

FIG. 11 is a top view of the button frame 30 when the key tops of the R-button 6*b* and the ZR-button 7*b* are removed.

As shown in FIG. 11, below the key top of the R-button 6*b*, an R-button detection section 69*b* for detecting an operation on the R-button 6*b* is placed. Similarly, below the key top of the L-button 6*a*, an L-button detection section 69*a* for detecting an operation on the L-button 6*a* is placed. Further, below the key top of the ZR-button 7*b*, a ZR-button detection section 79*b* for detecting an operation on the ZR-button 7*b* is placed. Similarly, below the key top of the ZL-button 7*a*, a ZL-button detection section 79*a* for detecting an operation on the ZL-button 7*a* is placed.

Specifically, the R-button detection section 69*b* is placed in the approximate centers in the left-right direction (the x-axis direction) and the front-back direction (the z-axis direction) of the key top of the R-button 6*b*. Further, the ZR-button detection section 79*b* is placed in the approximate center in the front-back direction (the z-axis direction) of the key top of the ZR-button 7*b* and placed slightly closer to the center of the game controller 1 than the center in the left-right direction of the key top of the ZR-button 7*b*.

If the R-button detection section 69*b* and the ZR-button detection section 79*b* are compared with each other, the ZR-button detection section 79*b* is located closer to the side surface of the game controller 1 than the R-button detection section 69*b* is. Similarly, if the L-button detection section 69*a* and the ZL-button detection section 79*a* are compared with each other, the ZL-button detection section 79*a* is located closer to the side surface of the game controller 1 than the L-button detection section 69*a* is. That is, the ZL-button detection section 79*a* and the ZR-button detection section 79*b* are located on the outer side of the game controller 1, and the L-button detection section 69*a* and the R-button detection section 69*b* are located on the inner side of the game controller 1.

The reason why the ZL-button 7*a* and the ZR-button 7*b* (the ZL-button detection section 79*a* and the ZR-button detection section 79*b*) on the back surface side are located further outside is to match the track of the finger when the user operates the ZR-button 7*b* and the R-button 6*a* with their index finger, for example.

Figure 12:
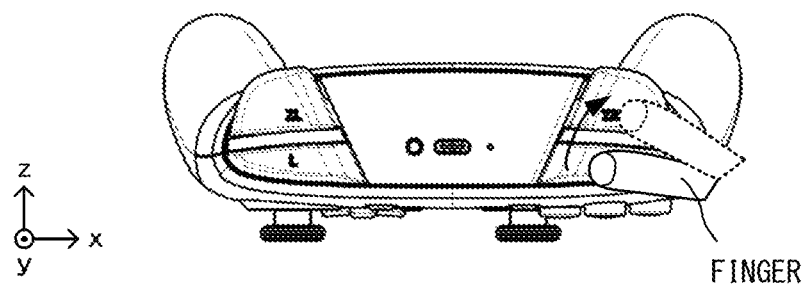
FIG. 12 is a diagram showing a non-limiting example of the motion of the index finger when the user operates the ZR-button 7b and the R-button 6b.

FIG. 12 is a diagram showing the motion of the index finger when the user operates the ZR-button 7*b* and the R-button 6*b*. As shown in FIG. 12, if the index finger moves from the position of the R-button 6*b* to the position of the ZR-button 7*b*, the finger of the user moves so as to draw a circular arc about the base of the finger. For example, if the user holds the grip portion 8*b* with their right hand, the base of the index finger is typically located on the extension of the R-button 6*b* on the right side surface of the game controller 1 (see FIG. 4). If the user operates the ZR-button 7*b* when placing their index finger on the R-button 6*b*, the user moves the finger in the direction of the back surface while almost keeping fixing the base of the index finger. Thus, the index finger of the user moves so as to draw a circular arc about its base. The further in the direction of the back surface of the game controller 1 the finger moves, the further in the direction of the side surface of the game controller 1 the extremity of the finger moves. Thus, the extremity of the index finger is located further in the direction of the side surface of (on the outer side of) the game controller 1 after the finger moves to the position of the ZR-button 7b than when the finger is located at the position of the R-button 6a.

In the game controller 1 according to the exemplary embodiment, the ZR-button 7b is placed on the outer side of the R-button 6b, taking into account such a motion of the finger of the user. Similarly, the ZR-button detection section 79b is also placed on the outer side of the R-button detection section 69b. With such placement of the buttons, it is possible to make it easy for the user to operate the ZR-button 7b and the R-button 6a. Further, the detection section for each button is similarly placed, whereby it is possible to place the detection section for the button approximately immediately below the finger when the user presses the button, and to certainly detect the operation of the user.

Referring back to FIG. 6, between the R-button 6b and the ZR-button 7b, a division wall 31b (a predetermined surface), which divides these buttons, is provided. The division wall 31b is a part of the button frame 30. Here, the height of the division wall 31b and the heights of the R-button 6b and the ZR-button 7b are described. It should be noted that each of the "heights" of the R-button 6b, the ZR-button 7b, and the division wall 31b as used herein indicates the distance from a surface parallel with the z-axis (an axis parallel with the direction of pressing the A-button 2a or the like provided on the front surface of the game controller 1) and the x-axis (an axis parallel with the left-right direction of the game controller 1 when viewed from the front) with respect to the game controller 1. That is, each of the "heights" of the R-button 6b, the ZR-button 7b, and the division wall 31b is a height with respect to the z-axis and the x-axis and indicates a distance in the y-axis direction.

Figure 13:
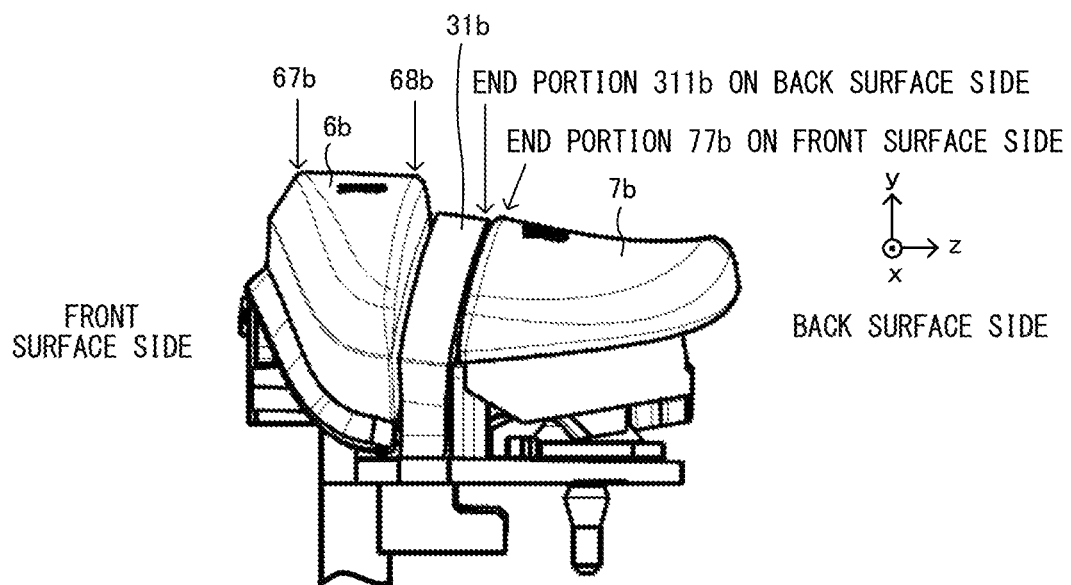
FIG. 13 is a partially enlarged view of a non-limiting example of (c) of FIG. 6.

FIG. 13 is a partially enlarged view of (c) of FIG. 6. As shown in FIG. 13, the height of the division wall 31b is smaller than that of the R-button 6b. Even when the R-button 6b is pressed, the height of the division wall 31b is smaller than the height of the R-button 6b. That is, both when the R-button 6b is not pressed and when the R-button 6b is pressed, a straight line extending from any point on an upper surface of the R-button 6b in the z-axis direction does not hit the division wall 31b. Further, if the ZR-button 7b is not pressed, the height of an end portion 311b of the division wall 31b on the back surface side of the game controller 1 is slightly smaller than the height of an end portion 77b of the ZR-button 7b on the front surface side of the game controller 1. That is, in a case where the ZR-button 7b is not pressed, a straight line extending from the end portion 77b of the ZR-button 7b in the negative z-axis direction does not hit the end portion 311b of the division wall 31b on the back surface side. Even when the ZR-button 7b is pressed, the height of the end portion 311 of the division wall 31b on the back surface side is slightly smaller than, or approximately the same as, the height of the end portion 77b of the ZR-button 7b on the front surface side of the game controller 1. That is, in a case where the ZR-button 7b is pressed, a straight line extending from the end portion 77b of the ZR-button 7b in the negative z-axis direction does not hit the end portion 311b of the division wall 31b on the back surface side, or passes through the end portion 311b of the division wall 31b.

The division wall 31b is provided between the R-button 6b and the ZR-button 7b, whereby the user can use the division wall 31b as a place to put their finger when the user does not operate the R-button 6b or the ZR-button 7b. Thus, it is possible to prevent the user from erroneously operating the R-button 6b or the ZR-button 7b. Further, both when the ZR-button 7b is not pressed and when the ZR-button 7b is pressed, the height of the end portion 77b of the ZR-button 7b on the front surface side of the game controller 1 is greater than (or substantially the same as) the height of the end portion 311b of the division wall 31b on the back surface side. Thus, it is possible to make the finger less likely to be caught between the ZR-button 7b and the division wall 31b. The ZR-button 7b pivots using as a pivot point the shaft 35 (see FIG. 10), which is located on the division wall 31b side in FIG. 13. Thus, if the ZR-button 7b is pressed, a gap occurs between the ZR-button 7b and the division wall 31b. However, even when the ZR-button 7b is pressed, and if the height of the division wall 31b is smaller than (or substantially the same as) the height of the ZR-button 7b in a boundary portion between the ZR-button 7b and the division wall 31b, the finger is less likely to enter the gap between the ZR-button 7b and the division wall 31b, and the finger is less likely to be caught.

Further, if the heights of the R-button 6b on the front surface side and the ZR-button 7b on the back surface side are compared with each other, the height of an end portion 68b of the R-button 6b on the back surface side of the game controller 1 is greater than the height of the end portion 77b of the ZR-button 7b on the front surface side of the game controller 1. Specifically, as shown in FIG. 13, the height of the R-button 6b is greater than that of the ZR-button 7b overall from the end portion 67b on the front surface side of the game controller 1 to the end portion 68b on the back surface side of the game controller 1. That is, a straight line extending from any point on the upper surface of the R-button 6b in the z-axis direction does not hit the ZR-button 7b. Thus, the user only touches the R-button 6b and the ZR-button 7b with their finger and thereby can recognize whether the button is the R-button 6b or the ZR-button 7b.

It should be noted that the closer to the side surface, the further downward the R-button 6b slopes. Thus, in the end portion on the side surface side (the end portion in the near-side direction of the paper in FIG. 13), the height of the R-button 6b is approximately the same as that of the ZR-button 7b. That is, as shown in (f) of FIG. 2, if the game controller 1 is viewed from the back surface side, the heights of the end portions of the L/R button 6 and the ZL/ZR button 7 on the side surface side are approximately the same. Thus, in a case where the user moves their finger in the front-back direction of the game controller 1, the finger is less likely to hit the end portions of the L/R button 6 and the ZL/ZR button 7 on the side surface side. Thus, it is possible to prevent the user from erroneously pressing the ZL/ZR button 7 when pressing the L/R button 6, and conversely, it is possible to prevent the user from erroneously pressing the L/R button 6 when pressing the ZL/ZR button 7.

As described above, in the exemplary embodiment, the ZL/ZR button 7 is provided to the side of the L/R button 6 closer to the back surface side of the game controller 1. The ZL/ZR button 7 includes the protruding portion 71, which protrudes in the direction of the back surface and the direction of the side surface, whereby it is easy for the user to operate the ZL/ZR button 7, which is located on the back surface side. Further, the L/R button 6 and the ZL/ZR button 7 include the above features (the sloping portion in the end portion in the left-right direction (the x-axis direction), the sloping portion in the end portion in the front-back direction (the z-axis direction), the position in the left-right direction, the height in the y-axis direction, and the like). Thus, it is difficult for the user to confuse the L/R button 6 and the ZL/ZR button 7 with each other, and it is easy for the user to operate the L/R button 6 and the ZL/ZR button 7.

Further, in the exemplary embodiment, the L/R button 6, the ZL/ZR button 7, the shafts supporting these buttons, and the detection sections for detecting the pressing of these buttons are formed integrally as the button frame 30. Thus, it is possible to make an error in the manufacture of each button smaller than a case where each button is fixed to the housing 10, and to prevent rattling when each button is operated.

[Description of Grip Portion]

Figure 14:
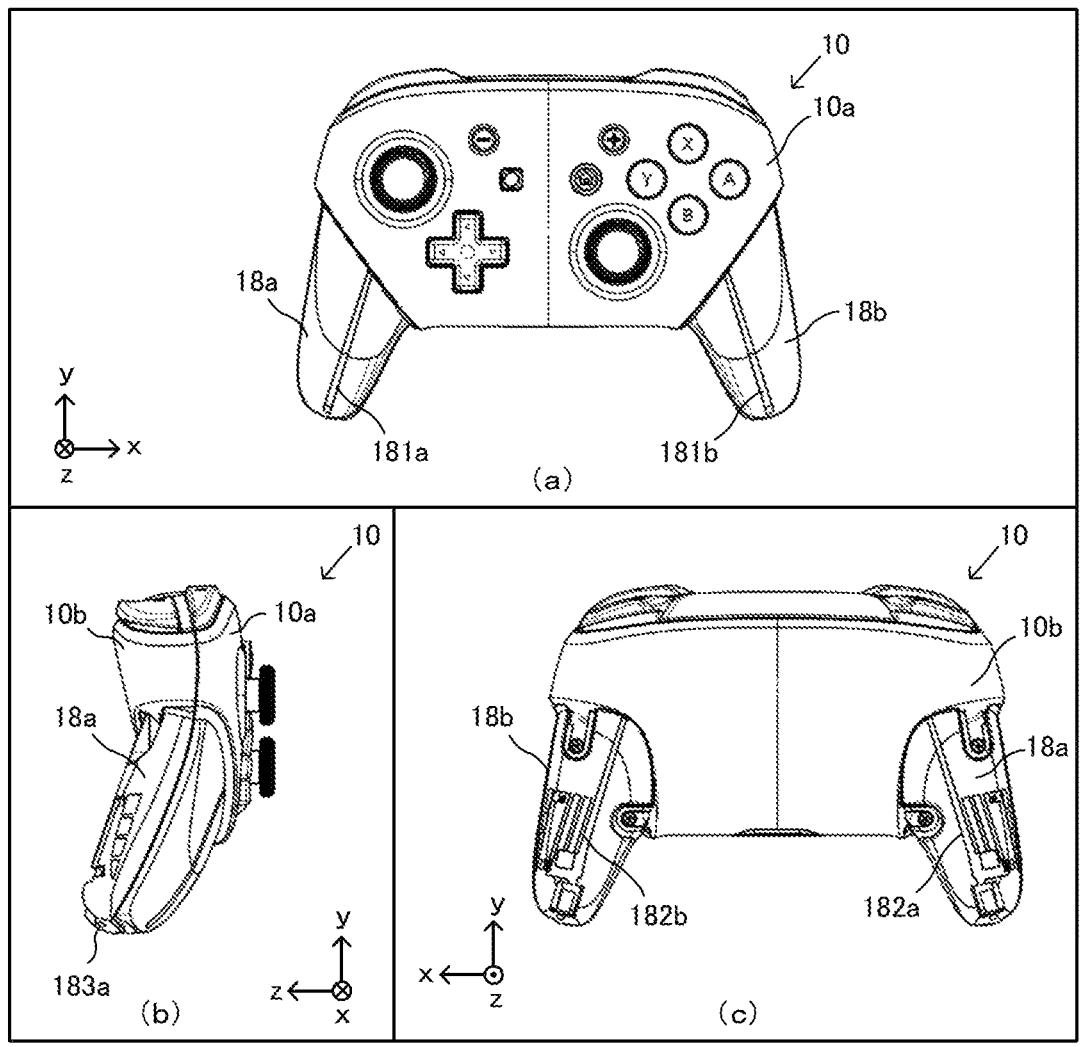
FIG. 14 is an external view of a non-limiting example of the state where a grip portion 8 of the game controller 1 is removed.
Figure 15:
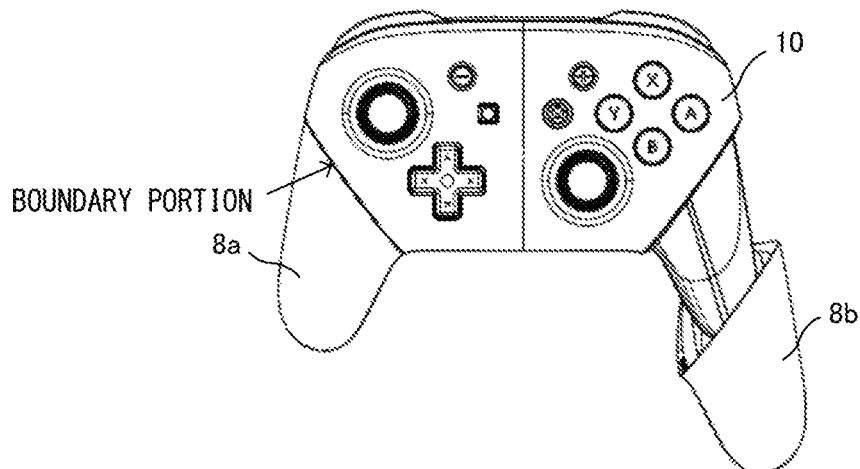
FIG. 15 is a diagram showing a non-limiting example of the state of the middle of removing a grip portion 8b of the game controller 1 on the right side.

Next, the grip portion 8 of the game controller 1 is described. FIG. 14 is an external view of the state where the grip portion 8 of the game controller 1 is removed. (a) of FIG. 14 is a front view when the grip portion 8 of the game controller 1 is removed. (b) of FIG. 14 is a left side view when the grip portion 8 of the game controller 1 is removed. (c) of FIG. 14 is a rear view when the grip portion 8 of the game controller 1 is removed. FIG. 15 is a diagram showing the state of the middle of removing the grip portion 8*b* of the game controller 1 on the right side. It should be noted that an x-axis, a y-axis, and a z-axis in FIG. 14 correspond to the x-axis, the y-axis, and the z-axis, respectively, in FIG. 2.

As shown in FIGS. 14 and 15, each of the grip portions 8*a* and 8*b* of the game controller 1 is configured to be able to be separated from the housing 10 (a main body housing). As described above, the housing 10 is formed by connecting the first housing 10*a* on the front surface side of the game controller 1 and the second housing 10*b* on the back surface side of the game controller 1 (FIG. 5).

As shown in FIG. 14, the housing 10, which is formed by connecting the first housing 10*a* and the second housing 10*b*, includes a controller main body portion in which various operation buttons, analog sticks, and the like for a game operation are provided, a first holding portion (first protruding portion) 18*a*, and a second holding portion (second protruding portion) 18*b*. The first holding portion 18*a* protrudes downward (in the negative y-axis direction) from the left of the center of the controller main body portion. As shown in (b) of FIG. 14, the first holding portion 18*a* is curved in the direction of the back surface (the positive z-axis direction). The second holding portion 18*b* protrudes downward (in the negative y-axis direction) from the right of the center of the controller main body portion. The second holding portion 18*b* is curved in the direction of the back surface (the positive z-axis direction). It should be noted that the first holding portion (first protruding portion) 18*a* is a portion to be held (through the grip portion 8*a*) by the left hand of the user when the grip portion 8*a* is connected to the first holding portion 18*a*. Here, the first holding portion (first protruding portion) 18*a* is not a portion to be directly held by the user, but is a portion to be indirectly held by the user. Thus, the first holding portion 18*a* is referred to as a "first holding portion". The same applies to the second holding portion (second protruding portion) 18*b*.

In the first holding portion 18*a*, a guide 181*a* is provided on the front surface side. The guide 181*a* is a long and narrow recessed groove and is used to guide the grip portion 8*a* to a predetermined position in the process of fitting the grip portion 8*a* to the first holding portion 18*a*. The guide 181*a* extends from an extremity portion (a lower portion in FIG. 14) to the base (an upper portion) of the first holding portion 18*a*. The guide 181*a* is formed such that the width of the guide 181*a* on the extremity side is greater than that of the guide 181*a* on the base side.

Further, as shown in (c) of FIG. 14, in the first holding portion 18*a*, a guide 182*a* is provided on the back surface side. The guide 182*a* is a long and narrow recessed groove and is used to guide the grip portion 8*a* to a predetermined position in the process of fitting the grip portion 8*a* to the first holding portion 18*a*. The guide 182*a* extends from an extremity portion (a lower portion) to the base (an upper portion) of the first holding portion 18*a*. The guide 182*a* is formed such that the width of the guide 182*a* on the extremity side is greater than that of the guide 182*a* on the base side.

Further, as shown in (b) of FIG. 14, at the extremity of the first holding portion 18*a*, a screw hole 183*a*, through which to insert a screw, is provided. The grip portion 8*a* is fitted to the first holding portion 18*a*, and the grip portion 8*a* and the first holding portion 18*a* are screwed together, thereby fixing the grip portion 8*a* to the first holding portion 18*a*. It should be noted that a screw hole does not necessarily need to be provided at the extremity of the first holding portion 18*a*. Alternatively, a screw hole may be provided in an extremity portion including the extremity (including the extremity and a portion near the extremity).

The same applies to the second holding portion 18*b*. That is, also in the second holding portion 18*b*, guides 181*b* and 182*b* are provided on the front surface side and the back surface side. Further, in an extremity portion of the second holding portion 18*b*, a screw hole 183*b*, through which to insert a screw, is provided.

Figure 16:
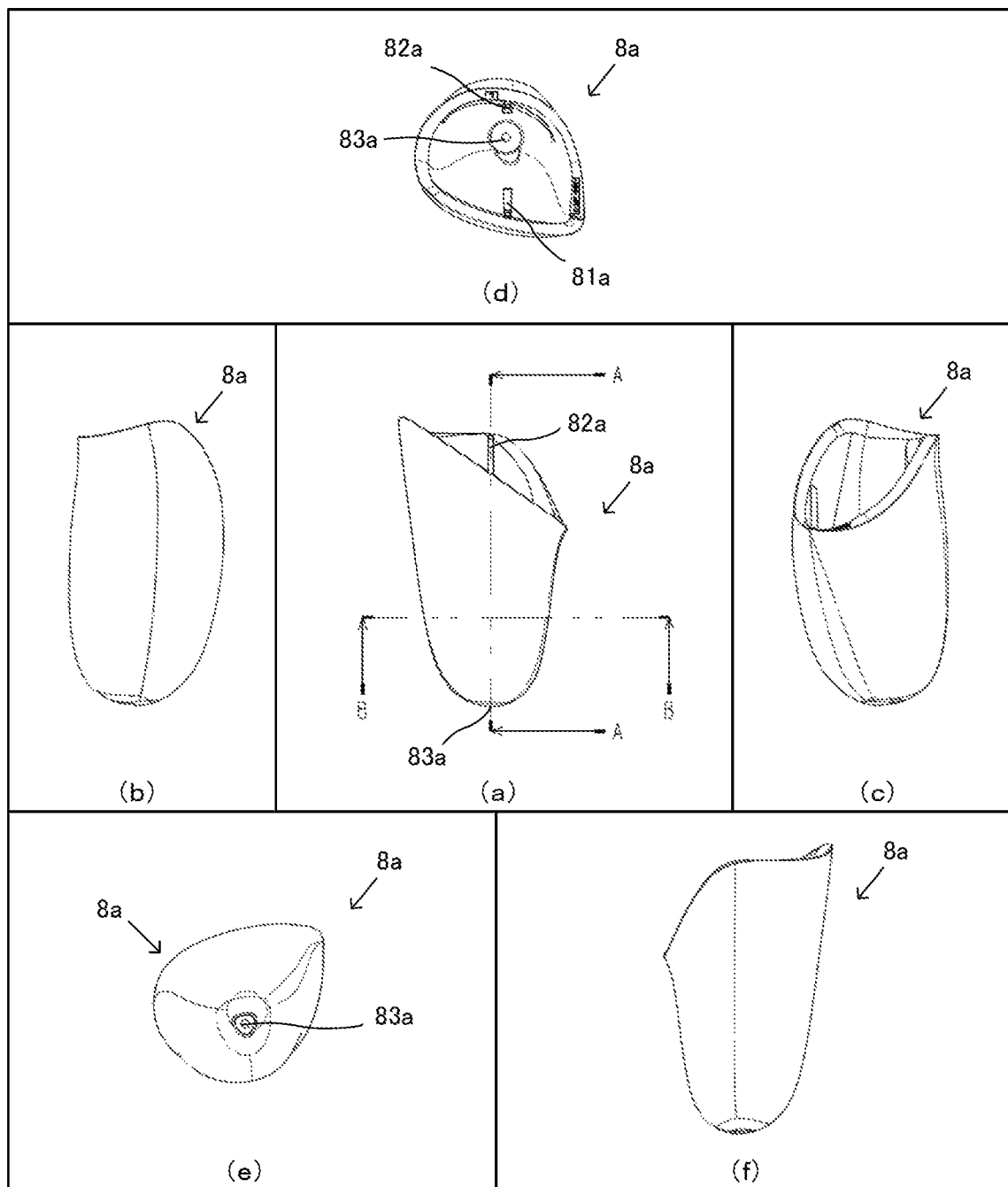
FIG. 16 is an external view of a non-limiting example of a grip portion 8a, which is fitted to a first holding portion 18a of a housing 10.
Figure 17A:
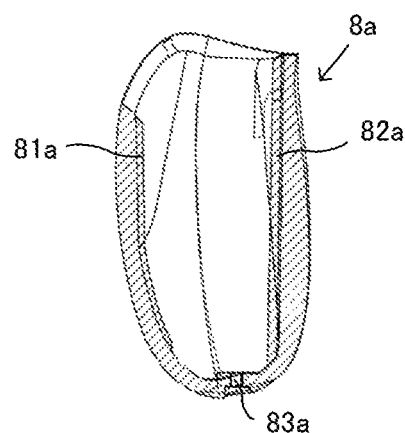
Figure 17B:
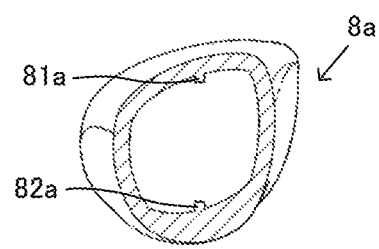

Next, the grip portion 8 is described in detail. FIG. 16 is an external view of the grip portion 8*a*, which is fitted to the first holding portion 18*a* of the housing 10. (a) of FIG. 16 is a front view of the grip portion 8*a* and is a diagram of the grip portion 8*a* as viewed from the same direction as that in (a) of FIG. 2. Further, (b) of FIG. 16 is a left side view of the grip portion 8*a*. (c) of FIG. 16 is a right side view of the grip portion 8*a*. (d) of FIG. 16 is a top view of the grip portion 8*a*. (e) of FIG. 16 is a bottom view of the grip portion 8*a*. (f) of FIG. 16 is a rear view of the grip portion 8*a*. FIG. 17A is a cross-sectional view along a line A-A in FIG. 16. FIG. 17B is a cross-sectional view along a line B-B in FIG. 16.

It should be noted that in FIGS. 16, 17A, and 17B, a structure for fixing a vibration motor 50 described later is omitted. The structure for fixing the vibration motor 50 will be described in detail later.

Further, the grip portion 8*a* on the left side and the grip portion 8*b* on the right side are symmetrical. Although only the grip portion 8*a* on the left side is described below, the same applies to the grip portion 8*b* on the right side. Further, hereinafter, the grip portions 8*a* and 8*b* will occasionally be collectively referred to as a "grip portion 8", and the first holding portion 18*a* and the second holding portion 18*b* will occasionally be collectively referred to as a "holding portion 18".

As shown in FIG. 16, the grip portion 8*a* is a hollow member and is so shaped as to protrude in a predetermined direction (downward). The grip portion 8*a* is so shaped that if the grip portion 8*a* is cut along a plane perpendicular to the predetermined direction, the outer periphery of the cross section is approximately elliptical. Specifically, the shape of the outer periphery of the cross section is a shape obtained by deforming an ellipse and is an approximately oval shape having a blunt end and a pointed end (FIG. 17B). It should be noted that the shape of the cross section is not limited to an approximate ellipse, and may be any shape such as a polygon (e.g., a triangle, a quadrilateral, a pentagon, or the like) having round corners.

The upper end of the grip portion 8*a* is open, and the lower end (except for the screw hole) of the grip portion 8*a* is closed. Further, the grip portion 8*a* is so formed that a left side surface of the grip portion 8*a* is longer in the up-down direction than a right side surface of the grip portion 8*a*. The area of the left side surface of the grip portion 8*a* is larger than the area of the right side surface of the grip portion 8*a*. If the user grips the grip portion 8*a* with their left hand, a center portion of the palm hits the left side surface side of the grip portion 8*a*, a base portion of the thumb hits the front surface side of the grip portion 8*a*, and the middle finger, the third finger, and the little finger hit the back surface side to the right side surface side of the grip portion 8*a* so as to go around these sides. That is, the left side surface of the grip portion 8*a*, of which the area is larger, hits the center portion of the palm of the user, and the right side surface of the grip portion 8*a*, of which the area is smaller, hits the middle finger, the third finger, the little finger, and the like.

The grip portion 8*a* is not formed by connecting two housing members (10*a* and 10*b*) with a screw or the like as in the housing 10, and is molded in an integrated manner. The surface of the grip portion 8*a* is smooth without a difference in level in a boundary portion formed by connecting two members as in the housing 10. It should be noted that depending on the method for molding the grip portion 8*a*, it may be possible to visually recognize the boundary between a plurality of members. The grip portion 8*a*, however, does not have a difference in level formed in a boundary portion between a plurality of separated members assembled and connected together by screwing, and the surface of the grip portion 8*a* is almost smooth.

As shown in FIGS. 16, 17A, and 17B, inside the grip portion 8*a*, the guide 81*a* is provided on the front surface side of the game controller 1, and the guide 82*a* is provided on the back surface side of the game controller 1. The guide 81*a* and the guide 82*a* are provided at positions opposed to each other. That is, the guide 81*a* and the guide 82*a* are provided on a straight line dividing the grip portion 8*a* into two approximately equal parts.

The guide 81*a* and the guide 82*a* are long and narrow protruding portions. Specifically, the guide 82*a* is formed so as to extend from an opening portion (the base) of the grip portion 8*a* to the lower end (an extremity portion) of the grip portion 8*a*. Further, the guide 81*a* is formed so as to extend from the opening portion (the base) of the grip portion 8*a* to near the lower end (the extremity portion) of the grip portion 8*a*. The guide 81*a* and the guide 82*a* are small in width in the opening portions (the bases). The closer to the extremity, the larger the width of the guide.

The protruding guide 81*a* of the grip portion 8*a* and the recessed guide 181*a* of the first holding portion 18*a* are engaged together, the protruding guide 82*a* of the grip portion 8*a* and the recessed guide 182*a* of the first holding portion 18*a* are engaged together, and the grip portion 8*a* is slid (upward as in FIG. 15), whereby it is possible to fit the grip portion 8*a* to the first holding portion 18*a* of the housing 10.

As described above, the grip portion 8*a* is so formed that the closer to the extremity, the larger the widths of the guides 81*a* and 82*a* of the grip portion 8*a*. The first holding portion 18*a* is so formed that the closer to the extremity, the larger the widths of the guides 181*a* and 182*a* of the first holding portion 18*a*. Thus, when the grip portion 8*a* is fitted to the first holding portion 18*a*, first, portions (protrusions) having smaller widths in the guides 81*a* and 82*a* of the grip portion 8*a* are engaged with portions (recessed grooves) having larger widths in the guides 181*a* and 182*a* of the first holding portion 18*a*. Thus, it is easy to fit the grip portion 8*a* to the first holding portion 18*a*. Further, the guides 81*a* and 82*a* extend to near the extremity of the grip portion 8*a*. Thus, it is easy to remove or attach the grip portion 8*a*.

Further, at the extremity of the grip portion 8*a*, a screw hole 83*a* is provided. The screw is inserted into the screw hole 83*a* and screwed, thereby connecting the first holding portion 18*a* and the grip portion 8*a*. The grip portion 8*a* is screwed to the first holding portion 18*a* at the extremity of the grip portion 8*a*. Thus, the user is less likely to touch the screw hole during a game operation. That is, if the user grips the grip portion 8 as in FIG. 4, the hand is less likely to touch the extremity portion of the grip portion 8. Thus, it is possible to eliminate discomfort when the user grips the grip portion 8. It should be noted that the screw hole 83*a* may be a hole with a thread groove, or may be a hole without a thread groove.

As is clear from FIG. 15, the grip portion 8 covers the entirety of the outer periphery of the holding portion 18 of the housing 10. If the holding portion 18 is cut along a plane perpendicular to the longitudinal direction, the grip portion 8 covers the entirety of the outer periphery of the cross section of the holding portion 18. That is, the entirety of the holding portion 18 including a boundary portion between the first housing 10*a* and the second housing 10*b* is covered with the grip portion 8. Thus, if the user grips the grip portion 8, it is possible to prevent discomfort from occurring. That is, if the housing 10 is formed by connecting the first housing 10*a* and the second housing 10*b*, a difference in level may occur in the boundary portion between the two members, and the user may feel discomfort when gripping the holding portion 18. This may hinder a game operation. In the exemplary embodiment, the boundary portion between the first housing 10*a* and the second housing 10*b* is covered with the grip portion 8, whereby, when the user holds the game controller 1, the game controller 1 is likely to fit the hand well, and it is possible to improve the feel when the user grips the holding portion.

Further, if the housing 10 and the grip portion 8*a* are connected together, a boundary portion (see FIG. 15) between the housing 10 and the grip portion 8*a* is smoothly joined. Specifically, the height of the surface of the grip portion 8*a* in the boundary portion between the housing 10 and the grip portion 8*a* is substantially the same as the height of the surface of the controller main body portion of the housing 10 in the boundary portion. That is, there is no difference in level in the boundary portion between the grip portion and the controller main body portion. The heights of the surfaces of the controller main body portion and the grip portion 8 in the boundary portion between the controller main body portion and the grip portion 8 are the same. Thus, it is possible to improve the feel when the user holds the game controller 1.

It should be noted that the above configurations of the grip portion 8 and the holding portion 18 are merely illustrative, and may be the following configurations.

For example, in the above description, the protruding guides 81 and 82 are provided on the grip portion 8 side, and the recessed guides 181 and 182 are provided on the holding portion 18 side. Alternatively, a recessed guide may be provided on the grip portion 8 side, and a protruding guide may be provided on the holding portion 18 side. Yet alternatively, the guides 81*a*, 82*a*, 181*a*, and 182*a* may not necessarily need to be provided.

Further, in the above description, a screw is used to connect the grip portion 8 and the housing 10. However, a fixing structure for fixing the grip portion 8 to the housing 10 is not limited to this. Alternatively, for example, a latch portion (a hook) may be provided in either one of the grip portion 8 and the housing 10, a latched portion may be provided in the other, and the latch portion and the latched portion may be engaged together, thereby fixing the grip portion 8 to the housing 10. For example, the grip portion 8 may not be fixed to the holding portion 18 with a screw, and a latch portion (a hook) may be provided at the extremity of a guide used to fit the grip portion 8 to the holding portion 18. Thus, the grip portion 8 may be guided by the guide, and when the grip portion 8 is fitted all the way to the holding portion 18, the latch portion (the hook) may be caught by the latched portion of the holding portion 18. Yet alternatively, for example, a rubber member (or another cushioning buffer material, an elastic member, or the like) may be provided inside the grip portion 8 or outside the holding portion 18, and the grip portion 8 may be press-fitted to the holding portion 18, thereby fixing the grip portion 8 to the holding portion 18. Yet alternatively, for example, thread grooves may be provided in the grip portion 8 and the holding portion 18, and the grip portion 8 may be screwed to the holding portion 18, thereby fixing the grip portion 8 to the holding portion 18.

Further, the color and the material of the grip portion 8 may be the same as or different from those of the housing 10. For example, the grip portion 8 and the housing 10 may be formed of the same material and have the same color. Alternatively, the grip portion 8 and the housing 10 may be formed of the same material and have different colors. Yet alternatively, the grip portion 8 and the housing 10 may be formed of different materials and have the same color. For example, the grip portion 8 may be formed of a material softer than, or a material harder than, that of the housing 10.

Further, in the above description, the grip portion 8 covers the entirety of the holding portion 18. Alternatively, a part of the holding portion 18 may not be covered with the grip portion 8. For example, the grip portion 8 may cover at least a part of the boundary portion between the first housing 10a and the second housing 10b in the holding portion 18. Yet alternatively, the grip portion 8 may not cover the entire periphery of the holding portion 18, but may cover the boundary portion between the first housing 10a and the second housing 10b and cover at least a part of the outer periphery of the holding portion 18.

Further, in the above description, the left and right grip portions 8 are fitted to the housing 10 (the main body housing) of the game controller 1. Alternatively, for example, a grip portion as described above may be connected to a holding portion of a mobile game apparatus obtained by integrating a processing apparatus (a CPU or the like) for performing game processing and a display apparatus. In the mobile game apparatus, a main body housing including a holding portion may be formed by connecting a first housing and a second housing, and a grip portion for covering the holding portion may be provided. The grip portion is configured to at least cover a boundary portion between the first housing and the second housing in the holding portion.

Further, the above grip portion may be used not only in the two-handed game controller 1, but also in a one-handed controller. For example, in the one-handed controller, a main body housing including a holding portion may be formed by connecting a first housing and a second housing, and a grip portion for covering the holding portion may be provided. The grip portion is configured to at least cover a boundary portion between the first housing and the second housing in the holding portion of the one-handed controller.

[Description of NFC and Inner Substrates]

Next, the substrates within the game controller 1 are described. As shown in FIG. 5, within the housing 10, the first substrate 20 and the second substrate 40 are accommodated. The first substrate 20 is located on the front surface side of the game controller 1, and the second substrate 40 is located on the back surface side of the game controller 1. That is, the game controller 1 has a two-layer structure including the first substrate 20 and the second substrate 40.

Specifically, if the game controller 1 is viewed from the front (the front surface), the first substrate 20 and the second substrate 40 placed within the housing 10 overlap each other. That is, if the first substrate 20 and the second substrate 40 are projected (subjected to parallel projection) onto a plane parallel with the front surface of the game controller 1, the projected first substrate 20 overlaps at least a part of the projected second substrate 40. The first substrate 20 and the second substrate 40 are described below.

Figure 18A:
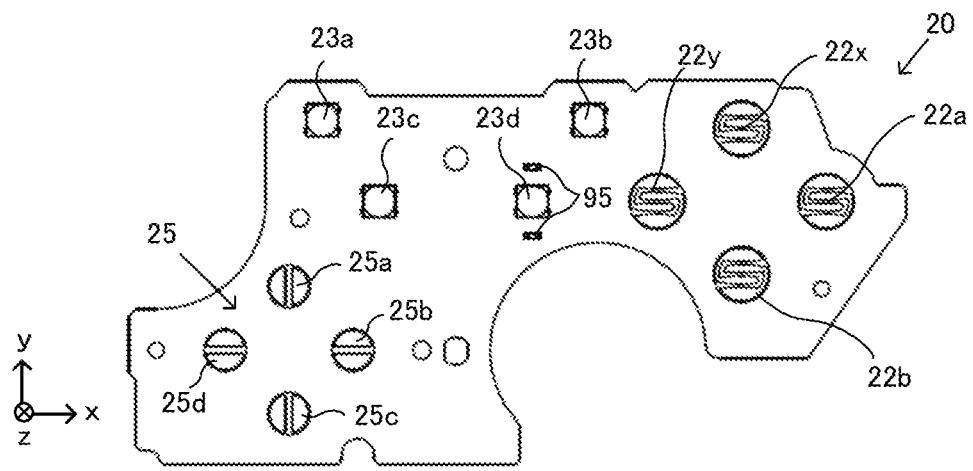
FIG. 18A is a front view of a non-limiting example of a first substrate 20.
Figure 18B:
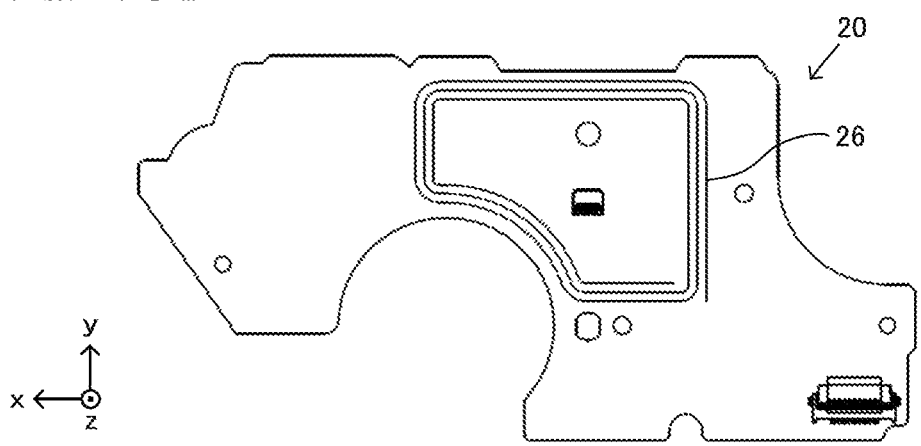
FIG. 18B is a rear view of a non-limiting example of the first substrate 20.

FIG. 18A is a front view of the first substrate 20. FIG. 18B is a rear view of the first substrate 20.

As shown in FIG. 18A, in a right region of the front surface of the first substrate 20, a switch (contact) 22a, which corresponds to the A-button 2a, a switch 22b, which corresponds to the B-button 2b, a switch 22x, which corresponds to the X-button 2x, and a switch 22y, which corresponds to the Y-button 2y, are placed. If the first substrate 20 is accommodated in the housing 10, the switch 22a, the switch 22b, the switch 22x, and the switch 22y are located immediately below the A-button 2a, the B-button 2b, the X-button 2x, and the Y-button 2y, respectively. For example, if the A-button 2a is pressed in the state where the first substrate 20 is accommodated in the housing 10, the switch 22a is also pressed, and the pressing of the A-button 2a is detected. The same applies to the B-button 2b, the X-button 2x, and the Y-button 2y.

Further, in a center region of the front surface of the first substrate 20, a switch 23a, which corresponds to the minus button 3a, a switch 23b, which corresponds to the plus button 3b, a switch 23c, which corresponds to the capture button 3c, and a switch 23d, which corresponds to the home button 3d, are provided. Further, above and below the switch 23d, which corresponds to the home button 3d, LEDs 95 are placed. The detailed structure of the home button 3d will be described later.

If the first substrate 20 is accommodated in the housing 10, the switch 23a, the switch 23b, the switch 23c, and the switch 23d are located immediately below the minus button 3a, the plus button 3b, the capture button 3c, and the home button 3d, respectively. For example, if the minus button 3a is pressed in the state where the first substrate 20 is accommodated in the housing 10, the switch 23a is also pressed, and the pressing of the minus button 3a is detected. The same applies to the plus button 3b, the capture button 3c, and the home button 3d.

Further, in a lower left region of the front surface of the first substrate 20, switches 25 (25a to 25d), which correspond to the directional pad 5, are placed. Specifically, the up direction of the directional pad 5 corresponds to the switch 25a, the right direction of the directional pad 5 corresponds to the switch 25b, the down direction of the directional pad 5 corresponds to the switch 25c, and the left direction of the directional pad 5 corresponds to the switch 25d. For example, if the up direction of the directional pad 5 is pressed, the switch 25a is also pressed, and the pressing of the up direction of the directional pad 5 is detected. The same applies to the other directions of the directional pad 5.

Meanwhile, as shown in FIG. 18B, in a center region of the back surface of the first substrate 20 (the surface on the back surface side of the game controller 1), an NFC antenna 26 is placed. The NFC antenna 26 is an antenna used for contactless communication. As the NFC antenna 26, a spiral antenna or a loop antenna is used.

Here, "contactless communication" in the present specification means a communication technique for performing communication at an extremely short distance (e.g., several centimeters to several tens of centimeters; typically, 10 centimeters or less). That is, "contactless communication" in the present specification does not mean a communication technique capable of performing communication even in a case where devices are several meters to several tens of meters away from each other, such as Bluetooth (registered trademark) or a wireless LAN, and means a communication technique for performing communication by holding an external storage device (an IC tag) over the apparatus. For example, contactless communication may be NFC (Near Field Communication) or RFID at the above extremely short distance. In the exemplary embodiment, it is assumed that contactless communication is NFC. It should be noted that not only the NFC standard but also another communication standard for performing contactless communication at the above extremely short distance may be used.

If the external storage device is present in a predetermined range in which the game controller 1 can perform communication, the game controller 1 can read data from the external storage device or write data to the external storage device. Typically, the predetermined range in which the game controller 1 can perform communication is within a region surrounded by the NFC antenna 26, and the distance from the NFC antenna 26 in the z-axis direction (both the positive and negative z-axis directions) shown in FIG. 18B is within the above extremely short distance. Even an external storage device that does not have a battery can communicate with the game controller 1. If the external storage device is placed in the predetermined range in which the game controller 1 can perform communication, an electromotive force is generated in the external storage device by an electromagnetic wave sent from the NFC antenna 26, and the game controller 1 can communicate with the external storage device. It should be noted that the external storage device may include a power supply and may be able to operate without an electromotive force from the game controller 1. It should be noted that the external storage device may be in any form such as a card, a figure having the shape of a predetermined character, an electronic device such as a mobile phone or a smartphone, or the like.

Figure 19:
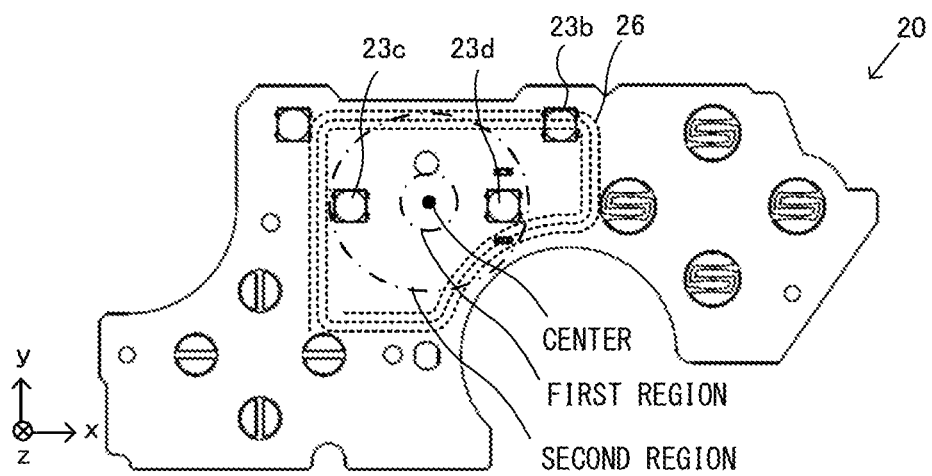
FIG. 19 is a front view of a non-limiting example of the first substrate 20 and a diagram showing a non-limiting example of the state where an NFC antenna 26 placed on a back surface of the first substrate 20 is projected onto a front surface of the first substrate 20.

FIG. 19 is a front view of the first substrate 20 and a diagram showing the state where the NFC antenna 26 placed on the back surface of the first substrate 20 is projected onto the front surface of the first substrate 20. In FIG. 19, the NFC antenna 26 placed on the back surface is indicated by a dashed line.

As shown in FIG. 19, in the region surrounded by the NFC antenna 26, the switch 23c, which corresponds to the capture button 3c, and the switch 23d, which corresponds to the home button 3d, are placed. That is, in a region on the front surface side corresponding to the region on the back surface side surrounded by the NFC antenna 26, the switch 23c, which corresponds to the capture button 3c, and the switch 23d, which corresponds to the home button 3d, are placed. In other words, if the game controller 1 is viewed from the front, the NFC antenna 26 (a region occupied by the NFC antenna 26) overlaps the capture button 3c and the home button 3d. Specifically, in a second region around a first region near the center of the region surrounded by the NFC antenna 26, the switch 23c, which corresponds to the capture button 3c, and the switch 23d, corresponds to the home button 3d, are provided.

Further, on the NFC antenna 26, the switch 23b, which corresponds to the plus button 3b, is placed. The other switches are placed outside the region surrounded by the NFC antenna 26.

If the external storage device (the IC tag) is placed in the region surrounded by the NFC antenna 26, the game controller 1 can communicate with the external storage device. Even if the external storage device is placed outside the region surrounded by the NFC antenna 26, the game controller 1 cannot communicate with the external storage device. It should be noted that "the region surrounded by the antenna" is a region including a portion on the line of the antenna and inside the antenna. Thus, if the external storage device is placed near (held over) the capture button 3c and the home button 3d, which are placed in the center portion of the game controller 1, the game controller 1 can read data stored in the external storage device or write data to the external storage device. On the other hand, even if the external storage device is placed on, for example, the A-button 2a, the B-button 2b, or the directional pad 5, the game controller 1 cannot communicate with the external storage device.

Figure 20:
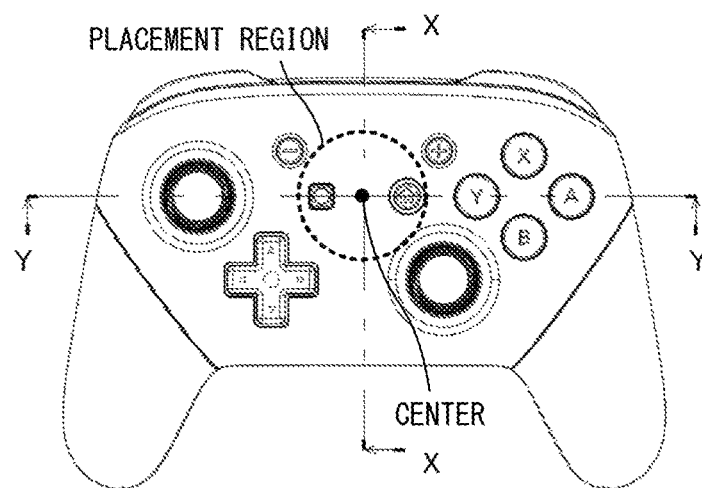
FIG. 20 is a diagram showing a non-limiting example of the position of the NFC antenna 26 in the game controller 1.

FIG. 20 is a diagram showing the position of the NFC antenna 26 in the game controller 1. A center shown in FIG. 20 indicates the center of the region surrounded by the NFC antenna 26 shown in FIG. 19. As shown in FIG. 20, the NFC antenna 26 is placed in the center in the left-right direction of the game controller 1.

As shown in FIG. 20, the capture button 3c and the home button 3d are placed in the center region of the front surface of the game controller 1, and a predetermined region including the positions of the buttons 3c and 3d is the region surrounded by the NFC antenna 26. Thus, the external storage device is placed in a region indicated by a dashed line in FIG. 20. This region has an approximately planar surface and is so shaped as to facilitate the placement of the external storage device. It should be noted that there is a case where even outside the region indicated by a dashed line in FIG. 20, the game controller 1 can communicate with the external storage device. For example, as shown in FIG. 19, a portion near the plus button 3b (the switch 23b) is included in the region surrounded by the NFC antenna 26. Thus, there is a case where even if the external storage device is placed near the plus button 3b, the game controller 1 can communicate with the external storage device. The region indicated by a dashed line including the center in FIG. 20, however, is a region where it is easiest to communicate with the external storage device.

Figure 21:
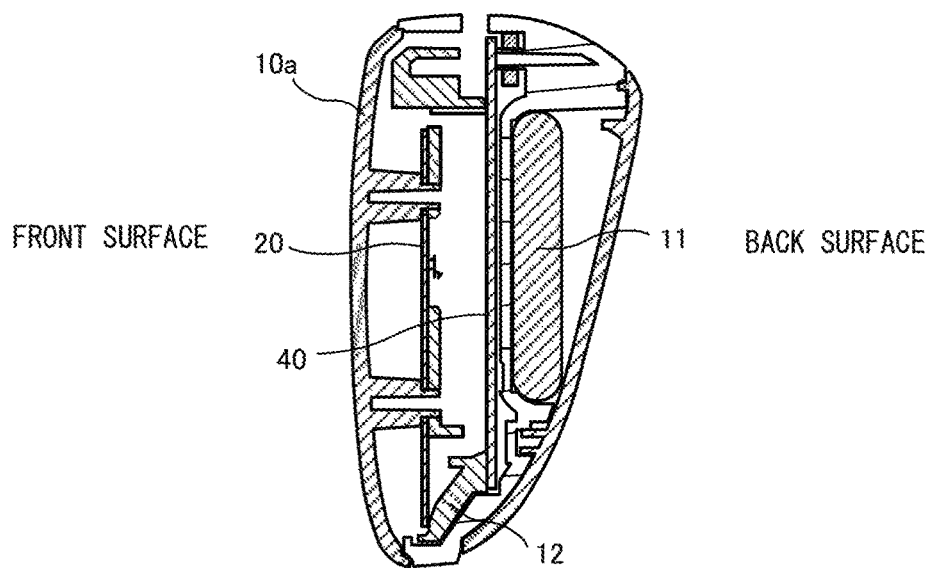
Figure 22:
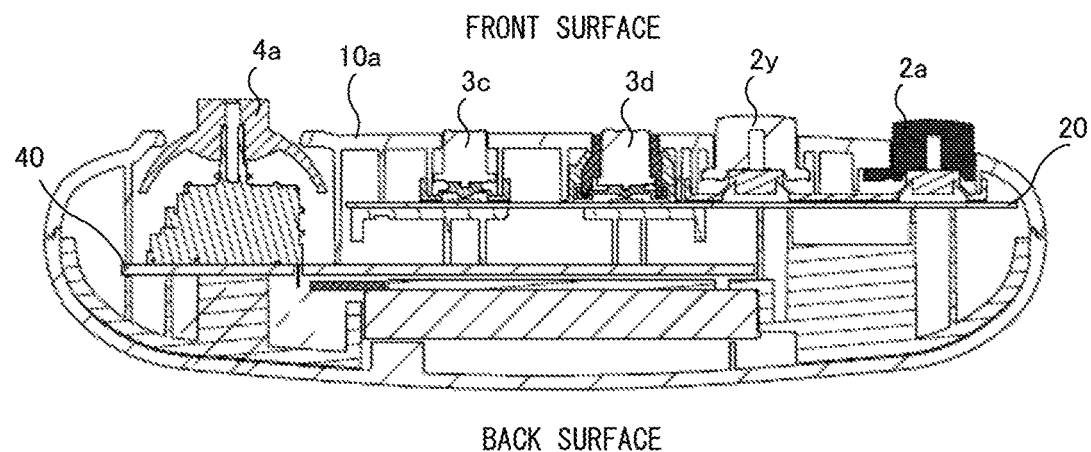

FIG. 21 is a cross-sectional view along a line X-X in FIG. 20. FIG. 22 is a cross-sectional view along a line Y-Y in FIG. 20.

As shown in FIG. 21, the first substrate 20 is placed on the front surface side of the game controller 1. That is, the first substrate 20 is provided closer to the front surface than the center of the housing 10 in the front-back direction of the game controller 1 is. Thus, the NFC antenna 26 is placed at a position closer to the front surface of the game controller 1. Thus, if the external storage device is placed on the front surface side, it is easy for the game controller 1 to communicate with the external storage device.

Further, the second substrate 40 is placed on the back surface side of the game controller 1. To the side of the second substrate 40 closer to the back surface, a battery 11 is placed. Further, below the housing 10, a light-guiding member 12 for guiding light from an LED of the second substrate 40 is provided. The light-guiding member guides light from the LED to outside, and the LED 9 emits light.

As shown in FIG. 22, upper surfaces of the key tops of the capture button 3c and the home button 3d have substantially the same heights as that of the surface of the first housing 10a. Since the upper surfaces of the key tops of the capture button 3c and the home button 3d have substantially the same heights as that of the surface of the first housing 10a, even if the external storage device is placed on the capture button 3c and the home button 3d, the capture button 3c and the home button 3d are not pressed.

Here "the upper surface of the key top has substantially the same height as that of the surface of the housing" means such a height that even if the external storage device is placed on the key top, the button is not pressed (such a height that the pressing of the button is not detected). That is, if the external storage device is placed on the capture button 3c and the home button 3d, the upper surfaces of the key tops of the capture button 3c and the home button 3d may be slightly higher than the surface of the first housing 10a insomuch that the capture button 3c and the home button 3d are not pressed (insomuch that the pressing of the capture button 3c and the home button 3d is not detected).

It should be noted that the upper surfaces of the key tops of the capture button 3c and the home button 3d may be lower than the surface of the first housing 10a.

On the other hand, the key tops of the Y-button 2y and the A-button 2a (the same applies to the B-button 2b and the X-button 2x) protrude further upward than the surface of the first housing 10a. If the external storage device is placed on the Y-button 2y, the Y-button 2y is pressed by the external storage device.

Further, as is clear from FIGS. 22, 2, and the like, the capture button 3c and the home button 3d are smaller than the Y-button 2y, the A-button 2a, and the like.

It should be noted that similarly to the capture button 3c and the home button 3d, the plus button 3b and the minus button 3a may also be configured such that the upper surfaces of the key tops of the plus button 3b and the minus button 3a have substantially the same heights as the surface of the first housing 10a. Further, the upper surfaces of the key tops of the plus button 3b and the minus button 3a may be lower than the surface of the first housing 10a. As described above, the upper surfaces of the key tops of the plus button 3b and the minus button 3a are configured not to protrude from the surface of the first housing 10a, whereby it is possible to prevent these buttons from being pressed when an external storage device is placed in an area surrounded by the NFC antenna 26.

Further, as compared with the capture button 3c and the home button 3d, the upper surfaces of the key tops of the plus button 3b and the minus button 3a may be slightly higher than the upper surfaces of the key top of the capture button 3c and the home button 3d. The upper surfaces of the key tops of the plus button 3b and the minus button 3a are slightly higher than the upper surfaces of the key tops of the capture button 3c and the home button 3d, whereby the user can distinguish these buttons only by touching the plus button 3b, the minus button 3a, the plus button 3b, and the minus button 3a, without viewing a portion around the hand. Thus, it is possible to prevent an erroneous operation. Further, the capture button 3c and the home button 3d are lower than the plus button 3b and the minus button 3a, whereby it is possible to prevent an erroneous operation on the capture button 3c and the home button 3d, which are near the center of a reading area of an external storage device more certainly. That is, the capture button 3c, the home button 3d, the plus button 3b, and the minus button 3a are configured not to protrude from the surface of the first housing 10a, whereby in a case where an external storage device is placed in a reading area, it is possible to prevent an erroneous operation on these buttons. The capture button 3c and the home button 3d are lower than the plus button 3b and the minus button 3a, whereby it is easy to distinguish these buttons, and it is possible to prevent an erroneous operation on the capture button 3c and the home button 3d more certainly.

As described above, the capture button 3c, the home button 3d, the plus button 3b, and the minus button 3a may be configured not to protrude from the surface of the first housing 10a. It should be noted that these buttons may be such that the upper surfaces of the key tops of the buttons may be lower than the surface of the first housing 10a in the state where the buttons are pressed, and the buttons is invisible when viewed from the side (in the horizontal direction) of the surface of the first housing 10a in the state where the buttons are not pressed. Further, these buttons may be configured such that the pressing of the buttons are not detected in the state where the upper surfaces of the buttons have the same height as the surface of the housing (e.g., when the upper surfaces of the buttons are slightly pressed and have the same heights as the surface of the housing in a case where the upper surfaces of the buttons slightly protrude from the surface of the housing).

Figure 23:
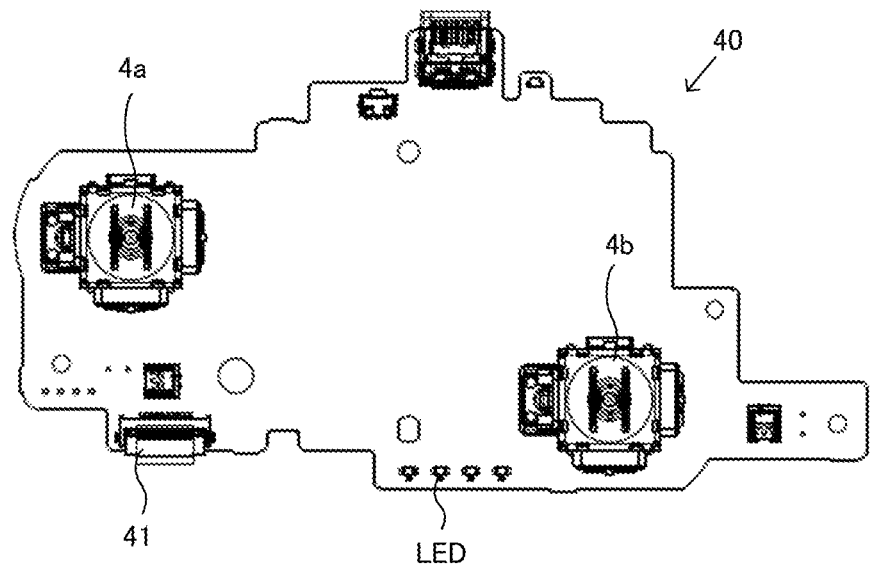
FIG. 23 is a front view of a non-limiting example of a second substrate 40.

FIG. 23 is a front view of the second substrate 40. As shown in FIG. 23, on the front surface of the second substrate 40 (the surface on the front surface side of the game controller 1), the left analog stick 4a is placed on the left side, and the right analog stick 4b is placed on the right side. Further, near the lower end in the center in the left-right direction of the second substrate 40, four LEDs are placed. Further, below the left analog stick 4a, a connection portion 41 is placed. The first substrate 20 and the second substrate 40 are connected together via the connection portion 41.

Figure 24:
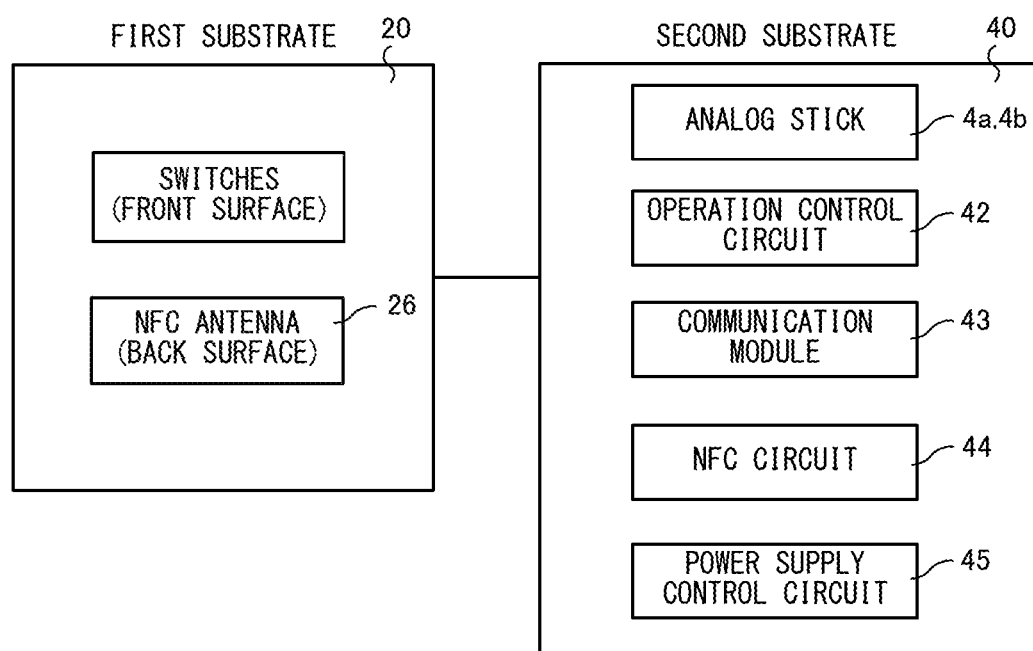
FIG. 24 is a block diagram showing a non-limiting example of the functional configurations of the first substrate 20 and the second substrate 40.

FIG. 24 is a block diagram showing an example of the functional configurations of the first substrate 20 and the second substrate 40. As shown in FIG. 24, in the second substrate 40, in addition to the analog sticks 4a and 4b, various control circuits for controlling the game controller 1 are provided. For example, in the second substrate 40, as control circuits, an operation control circuit 42 for generating and packetizing operation data indicating whether or not each of the buttons (2a, 2b, 2x, 2b, 3a to 3d, 5, 6a, 6b, 7a, and 7b) is pressed, a communication module (a communication circuit and an antenna) 43 for transmitting the operation data to the game apparatus 100, an NFC circuit 44 for controlling NFC communication, a power supply control circuit 45 for controlling power supply, and the like are placed.

Each switch placed on the first substrate 20 is connected to the operation control circuit 42. If each switch placed on the first substrate 20 is pressed, a signal corresponding to the pressing of the switch flows through the second substrate 40. As a result, the operation control circuit 42, which is placed on the second substrate 40, generates and packetizes operation data. Then, the operation data is output to the game apparatus 100 via the communication module. Further, the NFC circuit 44 controls the emission of a radio wave using the NFC antenna 26, the reading of data from the external storage device, the writing of data to the external storage device, and the like.

As described above, the game controller 1 includes the first substrate 20 and the second substrate 40, whereby it is possible to provide a controller with more functions without making the controller itself large. That is, if viewed from from the front surface (or the back surface) of the game controller 1, the first substrate 20 and the second substrate 40 overlap each other. Since the substrates thus have a two-layer structure, it is not necessary to increase the areas of the substrates, and it is possible to make the game controller 1 small. Further, the NFC antenna 26 is placed on, between the first substrate 20 and the second substrate 40, the first substrate 20 on the front surface side, whereby it is possible to shorten the distance between the surface of the housing 10 on the front surface side and the NFC antenna 26. This makes it possible to shorten the distance from the external storage device and facilitate communication with the external storage device.

Further, a switch is placed on the front surface of the first substrate 20, and the NFC antenna 26 is placed on the back surface of the first substrate 20 and at the position where the switch is placed, whereby it is possible to place a button in a region where the external storage device is to be placed (held over). This makes it possible to provide the game controller 1 with an NFC communication function and also place various buttons. Normally, to prevent an erroneous operation when the external storage device is read, a reading region (an antenna) for reading the external storage device is placed at the position where no button is provided. In this case, however, the game controller becomes large. In the exemplary embodiment, the upper surface of a button is low, whereby it is possible to prevent an erroneous operation on the button and also place a reading region (an antenna) at the position of the button. This can save space. That is, the upper surface of the button is low, whereby it is possible to solve the problem of an erroneous operation on the button in a case where the button and the reading region for the external storage device are placed so as to overlap each other, and it is possible to make the game controller small. Further, the smaller the area of the NFC antenna, the smaller the range where the game controller can perform communication. Thus, some size is required. If the NFC antenna 26 is placed on a single substrate, it is difficult to place another circuit in the region surrounded by the NFC antenna 26. Thus, in a case where the NFC antenna 26 is placed on a single substrate, and various buttons are placed, the substrate becomes large. Conversely, if various buttons are placed without making the substrate large, the region for the NFC antenna 26 becomes small. In the exemplary embodiment, the substrates have a two-layer structure, and the NFC antenna 26 is placed in the first substrate 20, while a control circuit is placed on the second substrate 40. Thus, it is possible to separate the NFC antenna 26 from another circuit. This increases the degree of freedom for design. Further, switches for operation buttons are provided on the front surface of the first substrate 20, and the NFC antenna 26 is provided on the back surface, whereby it is possible to place the NFC antenna 26, regardless of the positions of the operation buttons.

Further, in the exemplary embodiment, the analog sticks 4a and 4b are placed on the second substrate 40 on the back surface side. Each analog stick is used to input a direction by tilting an operation section of the analog stick and therefore requires some height. Thus, if the second substrate 40 including the analog sticks is placed on the front surface side of the game controller 1, the thickness of the game controller 1 increases. In the exemplary embodiment, the second substrate 40 is placed on the back surface side of the game controller 1, whereby it is possible to configure the game controller 1 to be thin. Further, the analog sticks 4a and 4b are mounted on a substrate (the second substrate 40) and integrated with the substrate, whereby it is possible to reduce the number of components as compared with a case where the analog sticks 4a and 4b are separate components.

Further, the substrates have a two-layer structure, and the NFC antenna 26 is placed on the first substrate 20 at a position close to the front surface of the housing 10, thereby increasing the degree of freedom for placing the second substrate 40. For example, it is possible to place the second substrate 40 in accordance with the heights of the analog sticks. It should be noted that the analog sticks may be mounted on yet another substrate different from the second substrate 40.

It should be noted that the above configuration of the game controller 1 may be applied not only to the two-handed game controller 1, but also to a one-handed controller. For example, the one-handed controller may include a first substrate on the front surface side of the controller and a second substrate on the back surface side of the controller. A switch for a button may be provided on the front surface of the first substrate (the surface on the front surface side of the controller), and an NFC antenna may be provided on the back surface of the first substrate. The switch on the front surface of the first substrate is provided in a region corresponding to a region surrounded by the NFC antenna provided on the back surface of the first substrate. Further, the one-handed controller may include an analog stick, and the analog stick may be provided on the second substrate.

[Description of Vibration Motor]

Figure 25:
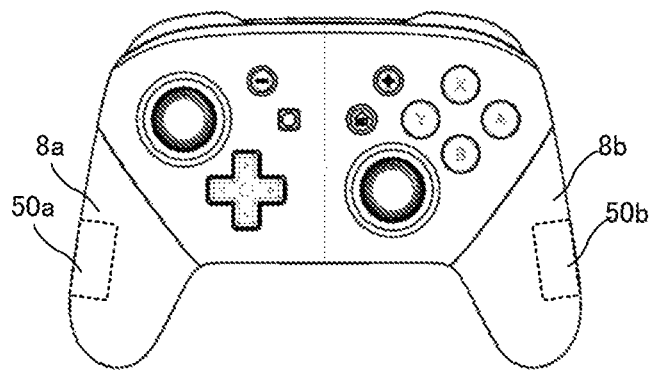
FIG. 25 is a diagram schematically showing a non-limiting example of a vibration motor provided in the grip portion 8 of the game controller 1.

Next, a vibration motor provided in the game controller 1 is described. FIG. 25 is a diagram schematically showing a vibration motor provided in the grip portion 8 of the game controller 1. It should be noted that hereinafter, vibration motors 50a and 50b will be collectively referred to as a "vibration motor 50".

As shown in FIG. 25, within the grip portions 8a and 8b of the game controller 1, the vibration motors 50a and 50b, respectively, are placed. Within the grip portion 8a, the vibration motor 50a is placed on the left side in the left-right direction of the game controller 1. Further, within the grip portion 8b, the vibration motor 50b is placed on the right side in the left-right direction of the game controller 1. That is, the vibration motor 50 is provided on the side of the grip portion 8 that the hand of the user hits.

Figure 26:
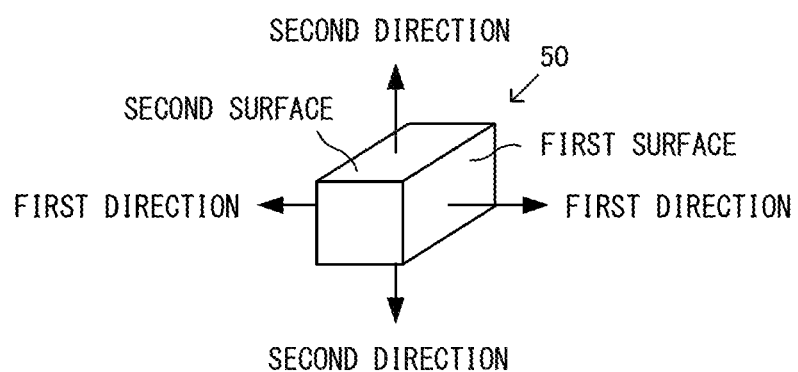
FIG. 26 is a diagram illustrating a non-limiting example of the vibration directions of a vibration motor 50.

FIG. 26 is a diagram illustrating the vibration directions of the vibration motor 50. As shown in FIG. 26, the vibration motor 50 has an approximately cuboid shape having a first surface and a second surface orthogonal to each other. The vibration motor 50 can vibrate in a first direction (the left-right direction) perpendicular to the first surface and can also vibrate in a second direction (the up-down direction) perpendicular to the first direction. That is, the vibration motor 50 is a vibration motor termed a so-called "linear vibration actuator" (or "linear vibration motor"). Specifically, the vibration motor 50 is configured to linearly vibrate in the first direction at a first resonance frequency and linearly vibrate in the second direction at a second resonance frequency different from the first resonance frequency. For example, the first resonance frequency may be 320 Hz, and the second resonance frequency may be 160 Hz. That is, the vibration motor 50 is a vibration motor termed a "linear vibration actuator" (or a "linear vibration motor").

Figure 27:
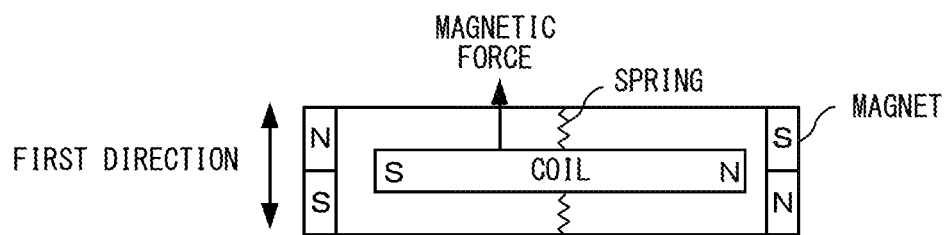
FIG. 27 is a diagram schematically showing a non-limiting example of the operating principle of the vibration motor 50.

Here, the operating principle of the vibration motor 50 is briefly described. FIG. 27 is a diagram schematically showing the operating principle of the vibration motor 50. As shown in FIG. 27, the vibration motor 50 includes a coil, magnets, and springs. A current is applied to the coil, whereby a magnetic force is generated in the up direction, and the coil moves in the up direction. Then, the coil moves in the down direction by the reaction force of the springs. This action is repeated, whereby the vibration motor 50 vibrates at a predetermined resonance frequency in the up-down direction in FIG. 27. In the vibration motor 50, the springs have two resonance frequencies. The vibration motor 50 is configured to vibrate at different resonance frequencies in the up-down direction in FIG. 27 and in a direction perpendicular to the paper in FIG. 27. It should be noted that the vibration motor 50 can also vibrate in an oblique direction by a combined wave obtained by combining a vibration in the first direction and a vibration in the second direction.

Figure 28:
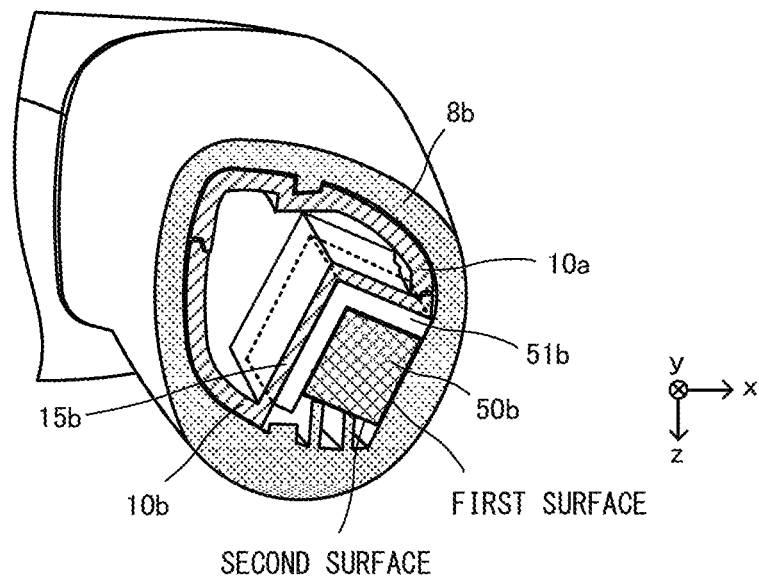
FIG. 28 is a cross-sectional view of a non-limiting example of the grip portion 8b, into which the vibration motor 50b is built, and is a diagram showing a non-limiting example of the internal structure of the grip portion 8b.
Figure 29:
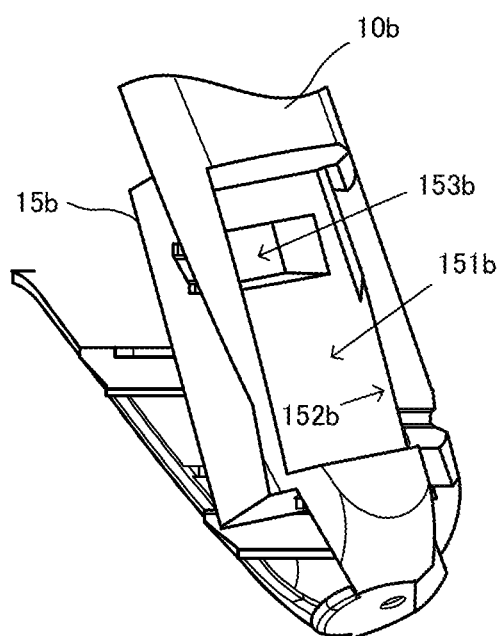
FIG. 29 is a diagram showing a non-limiting example of a second housing 10b on the back surface side of the game controller 1 and is an enlarge view of a non-limiting example of a portion of a second holding portion 18b on the right side of the second housing 10b.
Figure 30:
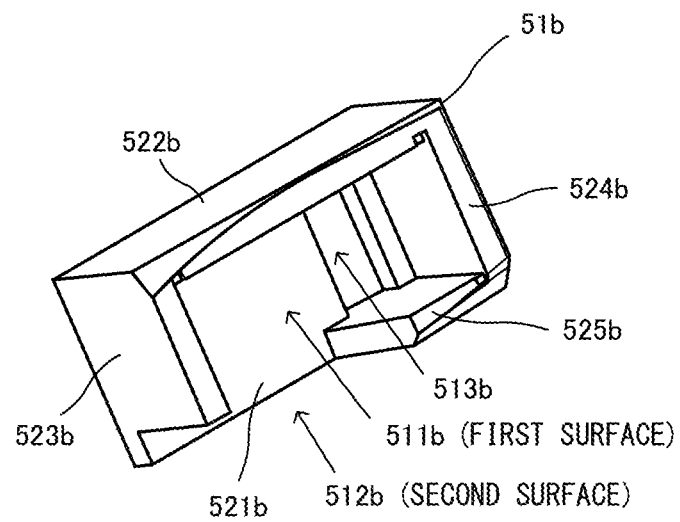
FIG. 30 is a diagram showing a non-limiting example of a holder 51b for fixing the vibration motor 50b within the housing 10.

FIG. 28 is a cross-sectional view of the grip portion 8*b*, into which the vibration motor 50*b* is built, and is a diagram showing an example of the internal structure of the grip portion 8*b*. FIG. 29 is a diagram showing an example of the second housing 10*b* on the back surface side of the game controller 1 and is an enlarged view of a portion of the second holding portion 18*b* on the right side of the second housing 10*b*. FIG. 29 is a diagram showing the second holding portion 18*b* of the second housing 10*b* as viewed from the direction of the right side surface. FIG. 30 is a diagram showing an example of a holder 51*b* for fixing the vibration motor 50*b* within the housing 10.

As shown in FIG. 28, inside the grip portion 8*b*, the vibration motor 50*b* is provided. Specifically, the vibration motor 50*b* is accommodated in the holder 51*b*. The holder 51*b* is used to fix the vibration motor 50*b* within the housing 10 and is formed of an elastic material likely to absorb the vibration of the vibration motor 50*b*. For example, the holder 51*b* is composed of a relatively soft material (a material softer than that of the housing 10) such as a silicon rubber or a synthetic rubber. For example, the material of the holder 51*b* may be ABS resin. In contrast, the housing 10 (the first housing 10*a* and the second housing 10*b*) is composed of a relatively hard material. The holder 51*b* is fitted (press-fitted) to a vibration motor fixing portion 15*b* (see FIG. 29), which is a part of the second housing 10*b*, and is fixed.

As shown in FIGS. 28 and 29, the vibration motor fixing portion 15*b* has an approximately cuboid shape and includes an opening portion 151*b* on the right side of the game controller 1, an opening portion 152*b* on the back surface side of the game controller 1, and an opening portion 153*b* on the center side of the game controller 1. The vibration motor fixing portion 15*b* is configured to be of approximately the same size as that of the holder 51*b* or slightly smaller than the holder 51*b*. The holder 51*b* is press-fitted to the vibration motor fixing portion 15*b*, thereby fixing the holder 51*b* to the second housing 10*b*.

As shown in FIG. 30, the holder 51*b* has an approximately cuboid shape and includes a surface 521*b* (a surface on the far side in FIG. 30), a surface 522*b* (a surface on the upper side in FIG. 30), a surface 523*b* (a surface on the left side in FIG. 30), a surface 524*b* (a surface on the right side in FIG. 30), and a surface 525*b* (a surface on the lower side in FIG. 30). Further, a surface on the near side opposed to the surface 521*b* on the far side of the holder 51*b* is open (an opening portion 511*b* in FIG. 30). Further, a part of a surface on the lower side opposed to the surface 522*b* on the upper side of the holder 51*b* is open (an opening portion 512*b* in FIG. 30). The opening portion 511*b* of the holder 51*b* is a portion corresponding to the first surface of the vibration motor 50*b*. The opening portion 512*b* of the holder 51*b* is a portion corresponding to the second surface of the vibration motor 50*b*. That is, if the vibration motor 50*b* is fitted to the holder 51*b*, the first surface of the vibration motor 50*b* is exposed through the opening portion 511*b*, and the second surface of the vibration motor 50*b* is exposed through the opening portion 512*b*. Further, a part of the surface 521*b* of the holder 51*b* is open (an opening portion 513*b*). The opening portion 513*b* of the holder 51*b* is configured to, if the holder 51*b* is fitted to the vibration motor fixing portion 15*b* of the second housing 10*b*, coincide with the opening portion 153*b* of the vibration motor fixing portion 15*b*. The opening portion 513*b* of the holder 51*b* and the opening portion 153*b* of the vibration motor fixing portion 15*b* are opening portions through which to pass the wiring of the vibration motor 50*b*.

Figure 31:
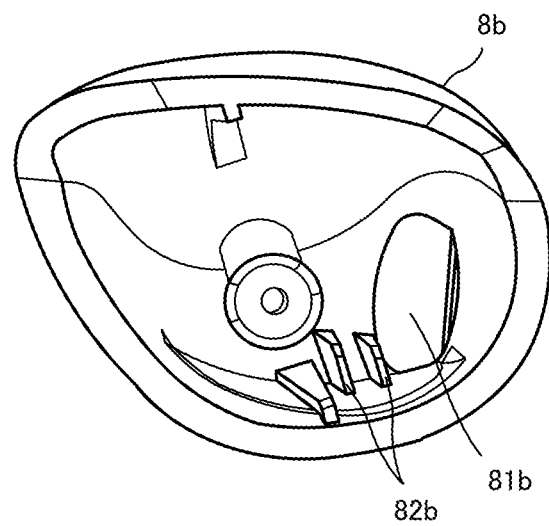
FIG. 31 is a diagram showing a non-limiting example of the internal configuration of the grip portion 8b.

FIG. 31 is a diagram showing an example of the internal configuration of the grip portion 8*b*. As shown in FIG. 31, on the right side within the grip portion 8*b*, a surface 81*b* is provided. Further, on the lower side within the grip portion 8*b*, two protruding ribs 82*b* are provided. The surface 81*b* is an approximately planar surface and is inclined at a predetermined angle when the grip portion 8*b* is viewed from the direction in FIG. 31. This is to facilitate the pulling out of the grip portion 8*b* from a mold in the process of manufacturing the grip portion 8*b*. For example, the surface 81*b* has a slope at several degrees with respect to the pull-out direction. The surface 81*b* comes into contact with the first surface of the vibration motor 50*b*. Further, the ribs 82*b* come into contact with the second surface of the vibration motor 50*b*. It should be noted that a portion of the grip portion 8*b* that comes into contact with the second surface of the vibration motor 50*b* may not be ribs, and may be an approximately planar surface as in the surface 81*b*.

With such a configuration, as shown in FIG. 28, if the vibration motor 50*b* is fixed within the housing 10, the first surface of the vibration motor 50*b* comes into direct contact with the surface 81*b* on the right side of the grip portion 8*b*. Further, the second surface of the vibration motor 50*b* comes into direct contact with the ribs 82*b* on the lower side of the grip portion 8*b*. That is, the vibration motor 50*b* comes into direct contact with the grip portion 8*b* on the first surface (a surface corresponding to the first direction in which the vibration motor 50*b* vibrates at the first resonance frequency) and the second surface (a surface corresponding to the second direction in which the vibration motor 50*b* vibrates at the second resonance frequency) of the vibration motor 50*b*. Meanwhile, since the surface of the vibration motor 50*b* opposed to the housing 10 (10*b*) is surrounded by the holder 51*b*, the vibration motor 50*b* does not come into direct contact with the housing 10, but comes into contact with the housing 10 through the holder 51*b*.

Here, a thin sheet (e.g., a sheet having a thickness of about 0.1 mm) may be sandwiched between the first surface and the second surface of the vibration motor 50*b* and the grip portion 8*b*. That is, "the first surface and the second surface of the vibration motor 50*b* come into direct contact with the grip portion 8*b*" also includes a case where a thin sheet (e.g., a sheet having a thickness of about 0.1 to 1 mm) is present between the first surface and the second surface of the vibration motor 50*b* and the grip portion 8*b*. Such a sheet is used to bring the vibration motor into firm contact with the housing 10 to prevent rattling, and is not used to make the vibration of the vibration motor 50*b* less likely to be transmitted to the grip portion 8*b*. On the other hand, the holder 51*b* is formed of a material softer and thicker than that of the sheet. Thus, the vibration of the vibration motor 50*b* is less likely to be transmitted to the grip portion 8*b*.

It should be noted that the grip portion 8*a* on the left side is also symmetrical with the grip portion 8*b* on the right side and is also similar to the grip portion 8*b* on the right side.

That is, also in the grip portion 8*a* on the left side, similarly to the right side, the vibration motor 50*a* and a holder 51*a* are provided. The vibration motor 50*a* vibrates in a first direction and a second direction, comes into direct contact with the grip portion 8*a* on a first surface corresponding to the first direction and a second surface corresponding to the second direction, and comes into contact with the housing 10 through the holder 51*a*.

As described above, the vibration motor 50 is brought into direct contact with the grip portion 8 on the first surface corresponding to the first direction and on the second surface corresponding to the second direction, whereby it is possible to make the vibration of the vibration motor 50 likely to be transmitted to the grip portion 8, and it is possible to make the vibration likely to be transmitted to the hand of the user in contact with the grip portion 8. That is, it is possible to cause the user to feel more vibration. Meanwhile, the vibration motor 50 comes into contact with the housing 10 through the holder 51. The holder 51 is formed of a relatively soft material and therefore is likely to absorb the vibration of the vibration motor 50. Thus, the vibration of the vibration motor 50 is less likely to be transmitted to the housing 10. Thus, for example, it is possible to make the vibration of the vibration motor 50*b* on the right side less likely to be transmitted to the grip portion 8*a* on the left side. Thus, it is possible to impart a vibration only to the right hand of the user, or impart vibrations in different vibration patterns to the left and right hands. Further, it is possible to prevent the vibrations of the left and right vibration motors from being mixed with each other and separate the vibration on the left and the vibration on the right from each other.

For example, in a case where the housing and the left and right grip portions of the game controller are formed in an integrated manner, and vibration motors are provided inside the left and right grip portions, for example, a vibration of the left grip portion may also be transmitted to the right grip portion through the housing. As a result, for example, even if the vibration motor provided inside the left grip portion to impart a vibration only to the left hand of the user is vibrated, the vibration may be also transmitted to the right grip portion. Thus, it may not be possible to transmit an intended vibration to the user. Further, for example, in a case where a vibration in a first pattern is imparted to the left hand of the user, and a vibration in a second pattern different from the first pattern is imparted to the right hand of the user, the vibration of the vibration motor provided inside one of the grip portions may be transmitted to the other grip portion, the two vibrations may be mixed, and it may not be possible to transmit intended vibrations to the user.

In the exemplary embodiment, the left and right grip portions 8 are connected to the housing 10, and the vibration motors 50 are provided inside the left and right grip portions 8. Then, the left and right vibration motors come into direct contact with the grip portions 8 and come into contact with the main body housing through holders. That is, in the exemplary embodiment, the game controller includes a main body housing (the housing 10), a first grip member (8*a*) connected to the main body housing and configured to be held by one hand of the user, and a second grip member (8*b*) separate from the first grip member, connected to the main body housing, and configured to be held by the other hand of the user. A first vibrator is provided inside the first grip member, and a second vibrator is provided inside the second grip member. Then, the first vibrator is configured to come into direct contact with the first grip member and come into contact with the main body housing through the first buffer member. The second vibrator is configured to come into direct contact with the second grip member and come into contact with the main body housing through the second buffer member.

As described above, in the exemplary embodiment, the first vibrator comes into direct contact with the first grip member, while coming into contact with the main body housing through the buffer member. Further, the second vibrator comes into direct contact with the second grip member, while coming into contact with the main body housing through the buffer member. Consequently, for example, the vibration of the first vibrator is likely to be transmitted to the first grip member, while the vibration is absorbed by the buffer member. Thus, the vibration of the first vibrator is less likely to be transmitted to the main body housing. The same applies to the vibration of the second vibrator. Thus, it is possible to separate the vibration of the first grip member and the vibration of the second grip member. For example, it is possible to prevent the vibrations to the two grip members from being mixed with each other and make intended vibrations likely to be transmitted to the user. Further, for example, in a case where only one of the vibrators (the grip members) is vibrated, it is possible to make the vibration of the vibrator less likely to be transmitted to the other grip member. Thus, it is possible to impart a vibration to only one hand of the user. As described above, in the exemplary embodiment, it is possible to separate the vibrations of two grip portions and transmit vibrations in various patterns to the user as intended.

Further, in the exemplary embodiment, the vibration motor 50 has two different resonance frequencies. Thus, it is possible to impart two vibrations different in feeling to the user and make representations in various vibration patterns.

Further, as shown in FIG. 28, the first surface of the vibration motor 50 comes into contact with the inside of the right side surface of the grip portion 8*b*. Further, the second surface of the vibration motor 50 comes into contact with the inside of the back surface of the grip portion 8*b* (a surface on the lower side in FIG. 28).

The first direction, which is the vibration direction of the vibration motor 50, is the substantial left-right direction of the game controller 1 (the x-axis direction). As shown in FIG. 4, if the user holds the game controller 1 with both hands, for example, the right side surface of the grip portion 8*b* hits an approximate center portion of the palm of the right hand of the user. Thus, the first direction, which is the vibration direction of the vibration motor 50*b*, is approximately perpendicular to the palm of the user. Thus, the vibration in the first direction is likely to be transmitted to the palm of the user.

Further, the second direction, which is the vibration direction of the vibration motor 50, is the substantial front-back direction of the game controller 1 (the z-axis direction: the up-down direction in FIG. 28). As shown in FIG. 4, if the user holds the game controller 1 with both hands, the back surface of the grip portion 8 hits the middle finger, the third finger, and the little finger of the user. Thus, the second direction, which is the vibration direction of the vibration motor 50, is approximately perpendicular to the middle finger, the third finger, and the little finger of the user. Thus, the vibration in the second direction is likely to be transmitted to the fingers of the user.

In the exemplary embodiment, the resonance frequency in the second direction is lower than the resonance frequency in the first direction. This makes it possible to cause the user to feel different types of vibrations. In the exemplary embodiment, the first surface of the vibration motor 50*b* comes into contact with the inside of the right side surface of the grip portion 8b, and the second surface of the vibration motor 50b comes into contact with the inside of the lower side surface of the grip portion 8b. Thus, a vibration having a high resonance frequency is likely to be transmitted to the right side surface of the grip portion 8b, and a vibration having a low resonance frequency is likely to be transmitted to the lower side surface of the grip portion 8b. The right side surface of the grip portion 8b hits the center portion of the palm of the user, and the lower side surface of the grip portion 8b hits the finger of the user. Thus, it is possible to impart a vibration having a high resonance frequency to the center portion of the palm of the user and impart a vibration having a low resonance frequency to the finger of the user. As described above, resonance frequencies are different between the first direction and the second direction, whereby it is possible to impart vibrations having different frequencies to portions of the hand of the user. It should be noted that the resonance frequency in the second direction may be higher than the resonance frequency in the first direction.

Further, in the exemplary embodiment, as shown in FIG. 28, the grip portion 8b is formed such that the thickness of the right side surface of the grip portion 8b is thinner than that of the lower surface of the grip portion 8b. That is, the grip portion 8 includes a first portion (a right side surface portion) and a second portion (a lower surface portion), which is thicker than the first portion. The first surface of the vibration motor 50 comes into contact with the first portion of the grip portion 8. The vibration motor 50 comes into contact with the thinner first portion of the grip portion 8. Thus, the vibration in the first direction is more likely to be transmitted to the hand of the user.

It should be noted that the above configuration is merely illustrative.

Alternatively, another configuration may be employed. For example, the vibration motor 50 (the holder 51) is fixed to the second housing 10b on the back surface side, but may be fixed to the first housing 10a. Alternatively, the vibration motor 50 may be fixed by being sandwiched between the first housing 10a and the second housing 10b. Further, the vibration motor 50 may be fixed not to the second housing 10b but to the grip portion 8. In a case where the vibration motor 50 is fixed to the grip portion 8, it is possible to prevent the vibration motor 50 from coming into direct or indirect contact with the housing 10.

Further, as a configuration for making the vibration of the vibration motor 50 less likely to be transmitted to the housing 10, a rib (a protruding portion) may be provided inside the holder 51 (a surface with which the vibration motor 50 comes into contact), thereby making the vibration of the vibration motor 50 likely to attenuate.

Further, when the holder 51 is fixed to the second housing 10b, a floating structure may be employed, in which the second housing 10b does not come into contact with the entirety of four surfaces of the holder 51 (four surfaces except for the opening portions), and the holder 51 comes into partial contact with the second housing 10b. For example, a plurality of ribs (protruding portions) may be provided in the second housing 10b, and the holder 51 may be fixed to the second housing 10b such that the holder 51 is spaced from the second housing 10b.

Further, in the above exemplary embodiment, the surface 81b is placed on the right side of the inner surface of the grip portion 8b, and the ribs 82b are placed on the lower side of the inner surface of the grip portion 8b. Alternatively, the ribs 82b may be placed on the right side, and the surface 81b may be placed on the lower side. Alternatively, surfaces may be provided on both the right side and the lower side. That is, both two surfaces of the grip portion 8 that come into contact with the vibration motor 50 may be planar surfaces, or may have ribs. Alternatively, one of the two surfaces may have ribs, and the other may be a planar surface.

Further, in the above exemplary embodiment, the structure is such that the vibration motor 50b comes into direct contact with the right side (the side surface side of the game controller 1) and the lower side of the grip portion 8b. Alternatively, the structure may be such that the vibration motor 50b comes into direct contact with the left side of the grip portion 8b (the center side of the game controller 1).

Further, in the game controller 1, the vibration motors 50 are provided in the left and right grip portions 8, and another vibration motor may also be provided within the main body of the housing 10 (within the housing 10 in which the substrates and the like are placed). This vibration motor provided within the main body of the housing 10 may be a vibration motor for vibrating in the first direction and the second direction similarly to the vibration motors 50 provided in the grip portions 8, or may be a vibration motor for vibrating only in a single direction, or may be an eccentric vibration motor.

Further, in the above exemplary embodiment, a single vibration motor 50 capable of vibrating in the first direction and the second direction is used. Alternatively, in another exemplary embodiment, a vibration motor for vibrating only in the first direction and a vibration motor for vibrating only in the second direction may be combined, thereby enabling vibrations in the first direction and the second direction.

Further, in the above exemplary embodiment, in a case where the vibration motor vibrates in the left-right direction (the x-axis direction) and the front-back direction (the z-axis direction), i.e., directions approximately perpendicular to the surfaces of the game controller 1 that come into contact with the hand of the user, the user is more likely to feel vibrations at their hand than in a case where the vibration motor vibrates in the up-down direction (the y-axis direction). Thus, the vibration motor vibrates substantially in the left-right direction and the front-back direction (see FIG. 28). In another exemplary embodiment, the vibration motor may vibrate in the substantial up-down direction of the game controller 1 (the y-axis direction: the longitudinal direction of the grip portion 8).

Further, the vibration motor described above may be provided not only in the two-handed game controller 1, but also in a one-handed controller. For example, the one-handed controller may include a portion to be held by the user, and a vibration motor is placed in the portion to be held. The vibration motor can vibrate at different resonance frequencies in a first direction and a second direction, and is configured to come into direct contact with a housing on a first surface corresponding to the first direction and a second surface corresponding to the second direction.

[Details of Structure of Home Button]

Next, the detailed structure of the home button 3d is described. It should be noted that the housing 10 of the game controller 1 according to the exemplary embodiment is transparent or white, for example. The home button 3d is configured such that the periphery of the button emits light. A description is given below of the structure for causing the periphery of the home button 3d to emit light.

Figure 32:
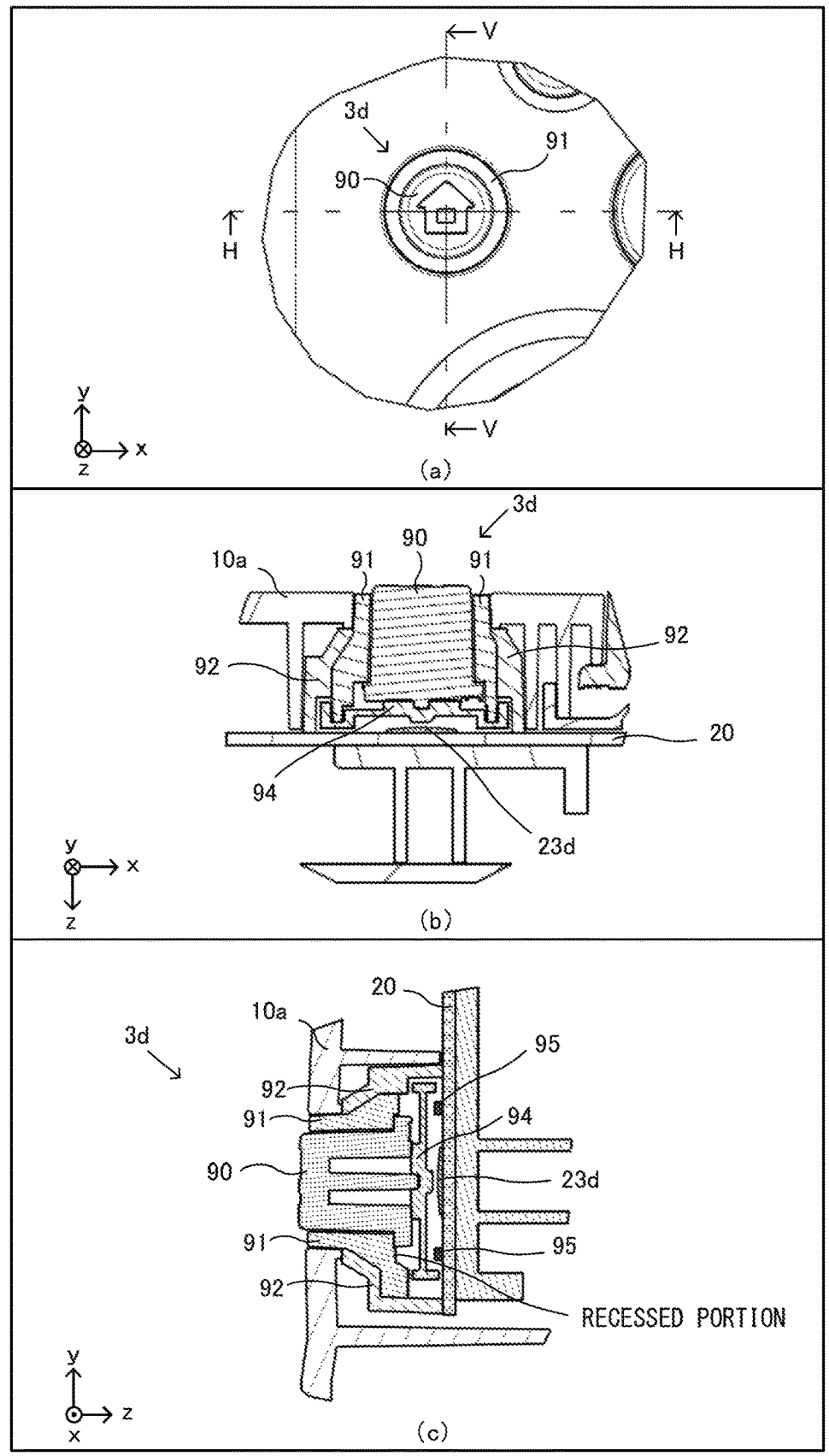
FIG. 32 is a diagram showing a non-limiting example of the structure of a home button 3d.

FIG. 32 is a diagram showing an example of the structure of the home button 3d. (a) of FIG. 32 is a partially enlarged view of the home button 3d. (b) of FIG. 32 is a cross-sectional view along a line H-H in (a) of FIG. 32. (c) of FIG. 32 is a cross-sectional view along a line V-V in (a) of FIG. 32.

As shown in FIG. 32, the home button 3*d* includes a key top 90, which is pressed by the user, and a light-guiding portion 91, which surrounds the periphery of the key top 90. The key top 90 has a columnar shape and is a member through which light cannot pass. The light-guiding portion 91 is a cylindrical member surrounding the outer periphery of the key top 90. It should be noted that the "cylindrical member" as used herein also includes a ring-shaped member. The light-guiding portion 91 is formed of a material through which light can pass, and guides light incident thereon to the surface of the housing 10 while diffusing the light.

As shown in (b) and (c) of FIG. 32, the outer periphery of the light-guiding portion 91 is surrounded by the cylindrical light-shielding portion 92. The light-shielding portion 92 is a member through which light cannot pass.

Immediately below the key top 90 of the home button 3*d*, the switch 23*d* is placed. Between the key top 90 and the switch 23*d*, an elastic member 94 is provided. The elastic member 94 is formed of a rubber-like material through which light can pass.

Further, below the elastic member 94, two LEDs 95 are provided on the first substrate 20, on which the switch 23*d* is provided. The two LEDs 95 are placed at positions below the elastic member 94 and overlapping the elastic member 94 (positions covered with the elastic member 94). Specifically, the two LEDs 95 are placed inside a region surrounded by the light-shielding portion 92 and are placed immediately below the light-guiding portion 91. The two LEDs 95 are placed symmetrically in the up-down direction (in the y-axis direction) with respect to the key top 90 ((c) of FIG. 32 or FIG. 18A).

The elastic member 94 pushes up the key top 90 in the up direction (the direction of the front surface of the game controller 1: the negative z-axis direction). If the key top 90 is pressed downward, the key top 90 pushes down the elastic member 94, the force of the pushing down deforms the elastic member 94, and the switch 23*d* is pressed through the elastic member 94. Even if the key top 90 is pressed, the light-guiding portion 91 and the light-shielding portion 92 around the key top 90 are not pushed down.

As shown in (b) and (c) of FIG. 32, an upper surface of the key top 90 and an upper surface of the light-guiding portion 91 are exposed through the surface of the housing 10. The upper surface of the key top 90 and the upper surface of the light-guiding portion 91 have substantially the same heights as that of the surface of the housing 10. Specifically, the upper surface of the key top 90, which is pressed by the user, is slightly higher than the surface of the housing 10 and is slightly higher than the upper surface of the light-guiding portion 91.

On the other hand, an upper surface of the light-shielding portion 92 is lower than the upper surface of the key top 90 and the upper surface of the light-guiding portion 91 and is not exposed through the surface of the housing 10. It should be noted that the upper surface of the light-shielding portion 92 may be exposed through the surface of the housing 10.

Light emitted from the two LEDs 95 passes through the elastic member 94, is incident on the light-guiding portion 91 immediately above the LEDs 95, passes through the inside of the light-guiding portion 91, and is guided to the surface of the first housing 10*a*. The light-guiding portion 91 is surrounded by the light-shielding portion 92, through which light cannot pass. Further, the key top 90 does not allow light to pass therethrough, either. Thus, if the two LEDs 95 emit light, the light-guiding portion 91 around the key top 90 emits light on the surface of the first housing 10*a*, and the light does not come out to the periphery of the light-guiding portion 91. Thus, even if the housing 10 is composed of a transparent member, a white member that makes light likely to pass therethrough, or the like, it is possible to cause only the periphery of the key top 90 to emit light in a ring-shaped manner.

As shown in (c) of FIG. 32, in a portion of the light-guiding portion 91 immediately above the two LEDs 95 (in the negative z-axis direction), recessed portions are formed. These recessed portions are formed so as to surround the LEDs 95 and are used to make larger the incident areas on which light from the LEDs 95 is incident.

Figure 33:
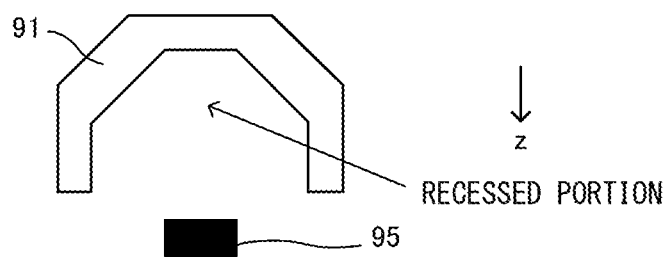
FIG. 33 is a diagram schematically showing a non-limiting example of each of recessed portions of a light-guiding portion 91 provided immediately above two LEDs 95.

FIG. 33 is a diagram schematically showing an example of each of the recessed portions of the light-guiding portion 91 provided immediately above the two LEDs 95. FIG. 33 is a diagram showing a portion including each LED 95 and the recessed portion of the light-guiding portion 91 in (c) of FIG. 32 when cut along an x-z plane in (c) of FIG. 32 and viewed from the positive y-axis direction. The down direction in FIG. 33 corresponds to the positive z-axis direction in FIG. 32. As shown in FIG. 33, the light-guiding portion 91 is formed so as to surround the LED 95. As described above, the recessed portion is formed in the light-guiding portion 91 so as to surround the LED 95, and thereby can receive light from the LED 95 in a wider surface area and make it easy to take the light into the light-guiding portion 91. It should be noted that the shapes of the recessed portions immediately above the two LEDs 95 are merely illustrative. Alternatively, the recessed portions may be formed into circular arc shapes, for example.

Figure 34:
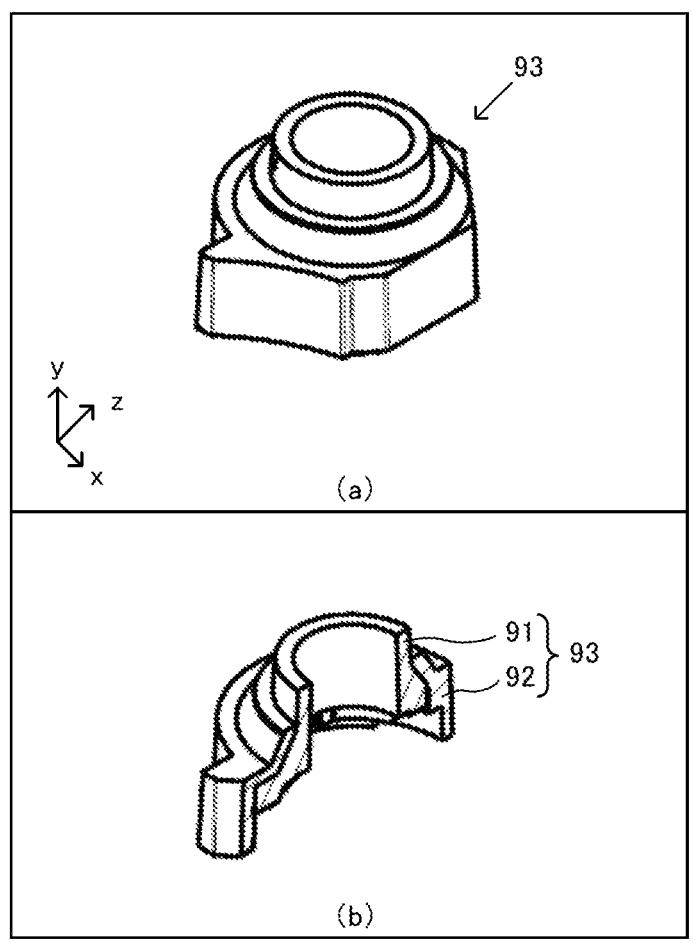
FIG. 34 is a perspective view of a non-limiting example of an integrally molded member 93, which is obtained by forming the light-guiding portion 91 and a light-shielding portion 92 in an integrated manner.

Here, the light-guiding portion 91 and the light-shielding portion 92 are formed in an integrated manner FIG. 34 is a perspective view of an integrally molded member 93, which is obtained by forming the light-guiding portion 91 and the light-shielding portion 92 in an integrated manner (a) of FIG. 34 is an external perspective view of the integrally molded member 93. (b) of FIG. 34 is a cross-sectional view of the integrally molded member 93 when cut along a plane parallel with the y-axis. As shown in FIG. 34, in the integrally molded member 93, the light-shielding portion 92 is formed so as to surround the outer periphery of the light-guiding portion 91. In the integrally molded member 93, the light-guiding portion 91 and the light-shielding portion 92 are formed in an integrated manner by two-color molding. It should be noted that the light-guiding portion 91 and the light-shielding portion 92 may be separately molded, and the two members may be assembled together.

As described above, the home button 3*d* of the game controller 1 according to the exemplary embodiment includes the cylindrical light-guiding portion 91, which surrounds the outer periphery of the key top 90, and the cylindrical light-shielding portion 92, which surrounds the periphery of the light-guiding portion 91. This makes it possible to configure the home button 3*d* such that only the periphery of the home button 3*d* (the key top 90 to be pressed by the user) emits light in a ring-shaped manner, while the other portion does not emit light.

In the exemplary embodiment, with a simple structure as described above, it is possible to cause the periphery of the key top 90 to emit light.

It should be noted that in the exemplary embodiment, the key top 90 is a member through which light cannot pass. Alternatively, the key top 90 may be composed of a member through which light can pass. If such a key top is used, it is possible to cause the key top of the home button 3*d* and the periphery of the key top to emit light.

Further, if a structure for pushing up the key top 90 in the direction opposite to the pressing direction is provided, the elastic member 94 may not need to be provided. Further, in (c) of FIG. 32, the elastic member 94 is placed at the position where the elastic member 94 overlaps the LEDs 95 (the position where the elastic member 94 covers the LEDs 95 from above). Alternatively, the elastic member 94 may be made smaller so as not to overlap the LEDs 95 (so as not to cover the LEDs 95).

Further, in the above exemplary embodiment, the light-guiding portion 91 is surrounded by the light-shielding portion 92. Alternatively, a light-shielding agent is applied to the outer periphery of the light-guiding portion 91, thereby preventing light from coming out of the light-guiding portion 91. Such an applied light-shielding agent can be used as an alternative to the light-shielding portion 92.

As described above, the game controller 1 according to the exemplary embodiment includes the above components. The above components may be used not only in a two-handed game controller, but also in another controller.

For example, the above components may be applied not only to the two-handed game controller 1, but also to a one-handed controller. For example, the R-button and the ZR-button may be provided in the one-handed controller. Further, the configurations of the grip portion, the NFC function, the vibration motor, and the home button may be applied to the one-handed controller.

Further, the components provided in the above game controller 1 may be provided in a mobile game apparatus including a display apparatus and a processing apparatus capable of executing game processing. For example, the mobile game apparatus may include the L/R button and the ZL/ZR button of the game controller 1. Further, the configurations of the grip portion, the NFC function, the vibration motor, and the home button may be applied to the mobile game apparatus.

Further, the components of the above game controller 1 may be applied to a peripheral device for any information processing apparatus such as a PC or a smartphone. For example, the configurations of the R-button and the ZR-button may be applied to a peripheral device for a smartphone. Further, the configurations of the grip portion, the NFC function, the vibration motor, and the home button may be applied to the peripheral device.

As described above, the game controller according to the exemplary embodiment may have the following configurations.

(Configuration A1)

A game controller comprising:

a holding portion configured to be held by a user; and a first button placed on an upper surface of the game controller and configured to allow the user to operate the first button with a finger of the user while holding the holding portion, wherein the first button includes a protruding portion protruding in a direction of a back surface of the game controller and a direction of a side surface of the game controller.

According to the above configuration A1, it is possible to make large a key top of a first button provided on an upper surface of a game controller and make it easy for a user to operate the first button. Thus, it is possible to improve the operability of the first button provided on the upper surface of the game controller.

(Configuration A2)

The game controller according to configuration A1, wherein the protruding portion is formed continuously from a back surface side to a side surface side of the game controller.

According to the above configuration A2, the first button includes a protruding portion formed continuously from a back surface side to a side surface side of the game controller. This makes it easy for the user to operate the first button.

(Configuration A3)

The game controller according to configuration A2, wherein a portion of the protruding portion from the back surface side to the side surface side is formed into a round shape.

According to the above configuration A3, a portion of the protruding portion from the back surface side to the side surface side is formed into a round shape. Thus, the finger of the user is likely to fit the protruding portion. This improves the operability.

(Configuration A4)

The game controller according to any one of configurations A1 to A3, wherein the protruding portion is provided such that an upper surface of the protruding portion forms an integrated surface with an upper surface of a portion of the first button other than the protruding portion.

According to the above configuration A4, an upper surface of the first button is formed as an integrated surface with a protruding portion and a portion other than the protruding portion. That is, the upper surface of the first button is formed such that there is no difference in level at the boundary between the protruding portion and the portion other than the protruding portion. Thus, there is no discomfort when the user operates the first button.

(Configuration A5)

The game controller according to any one of configurations A1 to A4, wherein the first button is provided on a side surface side of the game controller, and the direction of the side surface in which the protruding portion protrudes is a direction of a side surface on a side on which the first button is placed in the game controller.

According to the above configuration A5, for example, in a case where the first button is provided on the right side of the game controller, a protruding portion of the first button protrudes in the right direction. Consequently, for example, even a user having a short finger can operate the first button by placing their finger from the direction of the side surface of the game controller (e.g., the right direction) to the protruding portion of the first button (a portion protruding in the direction of the side surface; e.g., a portion protruding in the right direction).

(Configuration A6)

The game controller according to any one of configurations A1 to A5 wherein an end portion of the protruding portion in the direction of the back surface is formed into a round shape as viewed from a side surface side of the game controller.

According to the above configuration A6, an end portion of a protruding portion in the direction of a back surface is formed into a round shape. Thus, for example, there is less feeling of discomfort when the user presses an end portion of the first button in the direction of the back surface than in a case where the end portion of the protruding portion in the direction of the back surface is pointed.

(Configuration A7)

The game controller according to any one of configurations A1 to A6, wherein in an end portion of the first button on a center side of the game controller, a slope portion is provided.

According to the above configuration A7, in an end portion of the first button on a center side of the game controller, a slope portion is provided. This makes it possible to make it easy for, for example, a user having a long finger to operate the first button.

(Configuration A8)

The game controller according to any one of configurations A1 to A7, wherein in an end portion of the first button in the direction of the side surface, a slope portion is provided, and the slope portion includes a portion sloping at a first sloping angle and a portion sloping at a second sloping angle greater than the first sloping angle.

According to the above configuration A8, in an end portion of the first button in the direction of a side surface, a slope portion is provided. Thus, it is easy for the user to operate the first button. For example, a user having a short finger can easily operate the first button by placing the tip of the finger on the slope portion in the end portion of the first button in the direction of the side surface. Further, the slope portion slopes in two steps. Thus, it is possible to reduce discomfort when the user operates the first button as compared with a case where a single slope portion has a steep sloping shape.

(Configuration A9)

The game controller according to any one of configurations A1 to A8, wherein on the upper surface of the game controller, a second button placed closer to a front surface of the game controller than the first button is is provided, and the further in the direction of the side surface of the game controller, the further downward the second button slopes.

According to the above configuration A9, it is possible to provide a second button to a side of the first button closer to a front surface of the game controller. The further in the direction of the side surface of the game controller, the further downward the second button slopes. Thus, it is possible to prevent the user from erroneously pressing the second button when operating the first button on a back surface side.

(Configuration A10)

The game controller according to configuration A9, wherein in an end portion of the second button in the direction of the side surface, a slope portion is provided, and the slope portion includes a portion sloping at a first sloping angle and a portion sloping at a second sloping angle greater than the first sloping angle.

According to the above configuration A10, the further in the direction of the side surface of the game controller, the further downward the second button slopes. Further, in an end portion of the second button in the direction of the side surface, a slope portion including a portion sloping at a first sloping angle and a portion sloping at a second sloping angle greater than the first sloping angle (a slope portion having two steps) is provided. This makes it easy for the user to operate the first button. Thus, it is possible to prevent the user from erroneously pressing the second button when operating the first button on the back surface side.

(Configuration A11)

The game controller according to any one of configurations A1 to A10, wherein on the upper surface of the game controller, a second button placed closer to a front surface of the game controller than the first button is is provided, and the further in the direction of the side surface of the game controller, the smaller a width of an upper surface of the second button.

According to the above configuration A11, the width of a second button is small on a side surface of the game controller. Thus, when the user operates the first button provided on a back surface side, the finger of the user is less likely to touch the second button. Thus, it is possible to prevent the user from erroneously operating the second button.

(Configuration A12)

The game controller according to any one of configurations A1 to A11, wherein on the upper surface of the game controller, a second button placed closer to a front surface of the game controller than the first button is is provided, and the second button includes a slope portion in an end portion of the second button on a front surface side of the game controller.

According to the above configuration A12, an end portion, on a front surface side, of a second button provided on a front surface slopes. Thus, it is easy to access the first button and the second button from the front surface of the game controller.

(Configuration A13)

The game controller according to any one of configurations A1 to A12, wherein on the upper surface of the game controller, a second button placed closer to a front surface of the game controller than the first button is is provided, and a predetermined surface is provided between the first button and the second button.

According to the above configuration A13, a predetermined surface (e.g., a division wall) is provided between the first button and a second button, whereby the user can use the predetermined surface as a place to put their finger when the user does not operate the first button and the second button. Thus, it is possible to prevent the user from erroneously operating the first button and the second button.

(Configuration A14)

The game controller according to configuration A13, wherein a height of an end portion of the predetermined surface on the back surface side of the game controller is smaller than a height of an end portion of the first button on the front surface side of the game controller when the first button is pressed.

According to the above configuration A14, even when the user presses the first button, an end portion of the predetermined surface on a back surface side can be lower than an end portion of the first button on the front surface side. Thus, it is possible to make a finger less likely to be caught between the predetermined surface and the first button.

(Configuration A15)

The game controller according to any one of configurations A1 to A14, wherein on the upper surface of the game controller, a second button placed closer to a front surface of the game controller than the first button is is provided, and in an end portion of the second button on a center side of the game controller, a slope portion is provided.

According to the above configuration A15, in an end portion of a second button on a center side of the game controller, a slope portion is provided. Thus, for example, it is possible to make it easy for even a user having a long finger to operate the second button.

(Configuration A16)

The game controller according to configuration A15, wherein the second button is supported to be pivotable by a second shaft placed on the center side of the game controller and extends from the second shaft in the direction of the side surface of the game controller.

According to the above configuration A16, a second shaft is located on the center side. Thus, the user can press the second button by pressing a portion closer to a side surface of the game controller than the second shaft.

(Configuration A17)

The game controller according to any one of configurations A1 to A16, wherein on the upper surface of the game controller, a second button placed closer to a front surface of the game controller than the first button is is provided, on the front surface of the game controller, an operation section capable of being pressed by a finger of the user is provided, and with respect to a straight line parallel with a direction of pressing the operation section, an end portion of the first button on a front surface side is lower than an end portion of the second button on a back surface side.

According to the above configuration A17, at least at the boundary between the first button and a second button, the heights of the first button and the second button are different from each other. Thus, the user can recognize the first button and the second button only by touching the first button and the second button with their finger. Thus, it is possible to prevent erroneous pressing.

(Configuration A18)

The game controller according to configuration A17, wherein the first button is lower than the second button from the end portion of the first button on the front surface side to an end portion of the first button on the back surface side.

According to the above configuration A18, the user can recognize the first button and the second button only by touching the first button and the second button with their finger. Thus, it is possible to prevent erroneous pressing.

(Configuration A19)

The game controller according to any one of configurations A1 to A18, wherein on the upper surface of the game controller, a second button placed closer to a front surface of the game controller than the first button is is provided, and an end portion of the first button on a center side of the game controller is located closer to the side surface of the game controller than an end portion of the second button on the center side of the game controller is.

According to the above configuration A19, a second button is placed closer to the center of the game controller, and the first button is placed closer to a side surface of the game controller. Thus, for example, the user rotates their finger about the base of the finger and thereby can move the finger from the position of the second button to the position of the first button. This makes it possible to make it easy for the user to operate the first button and the second button.

(Configuration A20)

The game controller according to any one of configurations A1 to A19, wherein if the game controller is placed on a planar surface with a front surface of the game controller facing up, the game controller is supported on a back surface of a housing of the game controller.

According to the above configuration A20, in a case where the game controller is placed on a planar surface, it is possible to support the load of the game controller on a back surface of a housing. Thus, even if the game controller is placed on a planar surface, it is possible to prevent the first button from being pressed.

(Configuration A21)

The game controller according to any one of configurations A1 to A20, wherein the first button is curved in a direction of an upper surface of the first button such that the closer to a back surface side of the game controller, the greater a curvature of the curve.

According to the above configuration A21, the first button is gradually warped upward. Thus, it is possible to make it easy for the user to operate the first button.

(Configuration A22)

The game controller according to any one of configurations A1 to A21, wherein the first button is supported to be pivotable by a first shaft extending in a left-right direction of the game controller, and the first shaft can be inserted only from a center side of the game controller in the direction of the side surface of the game controller.

According to the above configuration A22, it is possible to extend the first button to an end portion of a side surface of the game controller.

(Configuration A23)

The game controller according to configuration A22, wherein the first shaft is inserted into a shaft insertion opening placed in an end portion of the game controller on a side surface side of the game controller, and a buffer material is provided within the shaft insertion opening.

According to the above configuration A23, it is possible to firmly fix the first button. Thus, it is possible to prevent rattling.

(Configuration A24)

The game controller according to any one of configurations A1 to A23, wherein on the upper surface of the game controller, a second button placed closer to a front surface of the game controller than the first button is is provided, the first button includes a first detection section configured to detect that the first button is pressed, the second button includes a second detection section configured to detect that the second button is pressed, and the first detection section is located further in the direction of the side surface of the game controller than the second detection section is.

According to the above configuration A24, a first detection section of the first button is placed on a side surface side of the game controller, and a second detection section of a second button is placed on a center side of the game controller, whereby it is possible to make it easy for the user to operate the first button and the second button.

(Configuration A25)

The game controller according to any one of configurations A1 to A24, wherein the first button includes a first detection section configured to detect that the first button is pressed, the first button is supported to be pivotable by a first shaft extending in a left-right direction of the game controller, and the first button, the first detection section, and the first shaft are formed in an integrated manner.

According to the above configuration A25, the first button, a first shaft for fixing the first button, and a first detection section are formed in an integrated manner, whereby it is possible to make an error in the manufacture of the first button small. Thus, it is possible to prevent rattling when the user operates the first button.

(Configuration A26)

A game controller comprising:

a holding portion configured to be held by a user;

a first button placed on an upper surface of the game controller and configured to allow the user to operate the first button with a finger of the user while holding the holding portion; and a second button placed on the upper surface of the game controller and closer to a front surface of the game controller than the first button is, wherein the first button includes a protruding portion protruding in a direction of a back surface of the game controller, and the first button and the second button are so formed that lengths of the first button and the second button are longer in a direction of a side surface of the game controller than lengths of the first button and the second button in the direction of the back surface of the game controller.

According to the above configuration A26, it is possible to make large a key top of a first button provided on an upper surface of a game controller and make it easy for a user to operate the first button. Further, not the lengths in the direction of a back surface of the first button and a second button but the lengths in the direction of a side surface of the first button and the second button are long. Thus, it is possible to smoothly switch an operation between the first button and the second button.

(Configuration A27)

A game controller comprising:

a holding portion configured to be held by a user;

a first button placed on an upper surface of the game controller and configured to allow the user to operate the first button with a finger of the user while holding the holding portion; and a second button placed on the upper surface of the game controller and closer to a front surface of the game controller than the first button is, wherein in an end portion of the first button closer to a center of the game controller, a first slope portion is provided, in an end portion of the second button closer to the center of the game controller, a second slope portion is provided, and in an end portion of the second button in a direction of a side surface, a third slope portion is provided and includes a portion sloping at a first sloping angle and a portion sloping at a second sloping angle greater than the first sloping angle.

According to the above configuration A27, on an upper surface of a game controller, a first button, a front surface side, and a second button are provided on a back surface side. End portions of the first button and the second button on a center side slope. An end portion of the second button in the direction of a side surface slopes in two steps. Thus, it is easy for even a user having a long finger to operate the first button and the second button. For example, in a case where a user having a long finger operates the first button, the user operates the first button by placing their finger on a first slope portion in the end portion of the first button on the center side. In this case, the finger may hit the end portion of the second button in the direction of the side surface and erroneously press the second button. However, the end portion of the second button in the direction of the side surface slopes. Thus, it is possible to prevent such an erroneous operation.

(Configuration A28)

A game controller comprising:

a holding portion configured to be held by a user;

a first button placed on an upper surface of the game controller and configured to allow the user to operate the first button with a finger of the user while holding the holding portion; and a second button placed on the upper surface of the game controller and closer to a front surface of the game controller than the first button is, wherein a predetermined surface is provided between the first button and the second button, and the first button includes a protruding portion protruding at least in a direction of a side surface of the game controller.

According to the above configuration A28, a predetermined surface is provided between a first button and a second button. Thus, a user can place their finger between the first button and the second button when the user does not operate the first button and the second button. In this case, in the case of a user having a short finger, it may be difficult for the finger to reach the first button. However, the first button includes a protruding portion protruding in the direction of a side surface. Thus, it is easy for even a user having a short finger to operate the first button.

(Configuration B1)

A game controller for performing a game operation by holding the game controller with both hands, the game controller comprising:

a main body housing including a controller main body portion in which an operation section for a game operation is placed, a first protruding portion, and a second protruding portion and formed by connecting a first housing member and a second housing member;

a first grip member configured to be held by one hand of a user, connected to the first protruding portion of the main body housing, and covering at least a part of a boundary portion between the first housing member and the second housing member; and a second grip member separate from the first grip member, configured to be held by the other hand of the user, connected to the second protruding portion of the main body housing, and covering at least a part of a boundary portion between the first housing member and the second housing member.

According to the above configuration B1, it is possible to cover a boundary portion between a first housing member and a second housing member with a grip member. When a user holds a protruding portion (a grip portion) of a game controller, it is possible to make the protruding portion likely to fit the hand well, and improve the operability.

(Configuration B2)

The game controller according to configuration B1, wherein the first grip member and the second grip member have shapes symmetrical with each other.

According to the above configuration B2, for example, it is possible to provide a game controller including symmetrical grip members.

(Configuration B3)

The game controller according to configuration B1 or B2, wherein the first grip member and the second grip member are hollow members and are so shaped as to protrude in a predetermined direction.

According to the above configuration B3, it is possible to shape the grip portion so as to protrude in a predetermined direction. It is possible to shape the grip portion so that it is easy for the user to grip the grip portion. It is possible to improve the operability.

(Configuration B4)

The game controller according to any one of configurations B1 to B3, wherein the first protruding portion and the second protruding portion are so shaped as to protrude in a predetermined direction, and if the first protruding portion and the second protruding portion are cut along a plane perpendicular to the predetermined direction, the first grip member and the second grip member cover entirety of outer peripheries of cross sections of the first protruding portion and the second protruding portion.

According to the above configuration B4, the entirety of the outer periphery of a first protruding portion is covered with a first grip member, and the entirety of the outer periphery of a second protruding portion is covered with a second grip member. Thus, when the user holds a grip portion of the game controller, it is possible to make the grip portion likely to fit the hand well, and improve the operability.

(Configuration B5)

The game controller according to any one of configurations B1 to B4, wherein if the user views the game controller from front while holding the first grip member and the second grip member, the first protruding portion and the second protruding portion protrude downward from the controller main body portion.

According to the above configuration B5, the user can hold the grip portion protruding downward from a controller main body portion. If the user holds the grip portion, the user can view the controller main body portion from front. This improves the operability of the controller.

(Configuration B6)

The game controller according to any one of configurations B1 to B5, wherein if the user views the game controller from front while holding the first grip member and the second grip member, the first protruding portion and the second protruding portion are curved in a direction of a back surface of the game controller.

According to the above configuration B6, the grip member is curved in the direction of a back surface. This makes it easy for the user to grip the grip portion. Thus, it is possible to improve the operability.

(Configuration B7)

The game controller according to any one of configurations B1 to B6, wherein if the user views the game controller from front while holding the first grip member and the second grip member, the first protruding portion is located to the left of a center of the controller main body portion, and the second protruding portion is located to the right of the center of the controller main body portion.

According to the above configuration B7, the user can hold the game controller with their left and right hands so as to sandwich the game controller.

(Configuration B8)

The game controller according to any one of configurations B1 to B7, further comprising a first fixing structure configured to fix the first grip member to the first protruding portion, and a second fixing structure configured to fix the second grip member to the second protruding portion.

According to the above configuration B8, it is possible to firmly fix first and second grip members to first and second protruding portions.

(Configuration B9)

The game controller according to any one of configurations B1 to B8, wherein the first grip member includes a first guide portion configured to guide the first grip member to a predetermined position when the first grip member is connected to the first protruding portion, the first protruding portion includes a second guide portion corresponding to the first guide portion, the second grip member includes a third guide portion configured to guide the second grip member to a predetermined position when the second grip member is connected to the second protruding portion, and the second protruding portion includes the fourth guide portion corresponding to the third guide portion.

According to the above configuration B9, it is possible to easily connect first and second grip members to first and second protruding portions.

(Configuration B10)

The game controller according to configuration B9, wherein each of the first guide portion, the second guide portion, the third guide portion, and the fourth guide portion includes a guide portion on a front surface side of the game controller and a guide portion on a back surface side of the game controller.

According to the above configuration B10, it is possible to guide the first and second grip members by two guide portions. It is possible to easily connect the first and second grip members to the first and second protruding portions.

(Configuration B11)

The game controller according to configuration B9 or B10, wherein the first grip member and the second grip member are connected to the first protruding portion and the second protruding portion, respectively, from one side to the other side of each grip member, the first guide portion of the first grip member is formed so as to extend from the one side to the other side of the first grip member, the third guide portion of the second grip member is formed so as to extend from the one side to the other side of the second grip member, a width of the first guide portion of the first grip member is greater on the other side than on the one side, and a width of the third guide portion of the second grip member is greater on the other side than on the one side.

According to the above configuration B11, it is possible to easily connect the first and second grip members to the first and second protruding portions.

(Configuration B12)

The game controller according to any one of configurations B9 to B11, wherein the first guide portion of the first grip member and the third guide portion of the second grip member are protruding guide portions, and the second guide portion of the first protruding portion and the fourth guide portion of the second protruding portion are recessed guide portions.

According to the above configuration B12, when a grip member is connected to a protruding portion by a protruding guide portion of the grip member and a recessed guide portion of the protruding portion, it is possible to guide the grip member.

(Configuration B13)

The game controller according to any one of configurations B1 to B12, wherein the first grip member includes in an extremity portion thereof a hole into which a screw for connecting to the first protruding portion is inserted, and the second grip member includes in an extremity portion thereof a hole into which a screw for connecting to the second protruding portion is inserted.

According to the above configuration B13, a hole is provided in an extremity portion of a grip member. Thus, it is possible to fix the grip portion to the protruding portion, and it is also possible to make the hand of the user less likely to touch the hole when the user operates the game controller. Thus, it is possible to eliminate discomfort when the user grips the grip portion. This can improve the operability of the controller.

(Configuration B14)

The game controller according to any one of configurations B1 to B13, wherein if the user views the game controller from front while holding the first grip member and the second grip member, the first protruding portion is located to the left of a center of the controller main body portion, and the second protruding portion is located to the right of a center of the controller main body portion, and the first grip member and the second grip member are formed such that if the game controller is viewed from front, a length in an up-down direction of each grip member on left and right end portion sides is longer than a length in an up-down direction of the grip member on a center side of the game controller.

According to the above configuration B14, left and right end portions of a grip member are longer. Thus, for example, it is possible to widen a left side surface of the grip member on the left side and widen a right side surface of the grip member on the right side. It is possible to widen a portion that an approximate center portion of the palm of the user hits. Thus, it is possible to make it easy for the user to grip the grip member, and improve the operability.

(Configuration B15)

The game controller according to any one of configurations B1 to B14, wherein a height of a surface, on a first grip member side, of a boundary portion between the first grip member and the controller main body portion when the first grip member is connected to the first protruding portion is substantially the same as a height of a surface, on a controller main body portion side, of the boundary portion, and a height of a surface, on a second grip member side, of a boundary portion between the second grip member and the controller main body portion when the second grip member is connected to the second protruding portion is substantially the same as a height of a surface, on the controller main body portion side, of the boundary portion.

According to the above configuration B15, there is no difference in level in a boundary portion between a grip member and a controller main body portion. Thus, it is possible to smooth the boundary portion. Thus, it is possible to improve the feel when the user holds the game controller, and improve the operability.

(Configuration B16)

The game controller according to any one of configurations B1 to B15, wherein the first housing member is a housing member on a front surface side of the game controller, and the second housing member is a housing member on a back surface side of the game controller.

According to the above configuration B16, it is possible to form a main body housing with a housing member on a front surface side and a housing member on a back surface side.

(Configuration B17)

The game controller according to any one of configurations B1 to B16, wherein vibrators are provided inside the first grip member and the second grip member, and the vibrators come into direct contact with the first grip member and the second grip member, and the vibrators come into contact with the first protruding portion and the second protruding portion through buffer members.

According to the above configuration B17, it is possible to make a vibration likely to be transmitted to the hand of the user.

(Configuration B18)

A pair of grip members attached to a main body housing of a game controller formed by connecting a first housing member and a second housing member, the pair of grip members comprising:

a first grip member configured to be held by one hand of a user; and a second grip member configured to be held by the other hand of the user, wherein the first grip member is connected to a first protruding portion of the main body housing and covers at least a part of a boundary portion between the first housing member and the second housing member, and the second grip member is separate from the first grip member, is connected to a second protruding portion of the main body housing, and covers at least a part of a boundary portion between the first housing member and the second housing member.

According to the above configuration B18, it is possible to cover two protruding portions of a main body housing with a pair of grip members. When a user holds a grip portion attached to a game controller, it is possible to make the grip portion likely to fit the hand well. It is possible to improve the operability of the controller.

(Configuration B19)

A pair of grip members attached to a main body housing of a game controller formed by connecting a front-surface-side housing member and a back-surface-side housing member, the pair of grip members comprising:

a first grip member configured to be held by one hand of a user; and a second grip member configured to be held by the other hand of the user, wherein the first grip member is connected to a first protruding portion of the main body housing and covers at least a part of a boundary portion between the front-surface-side housing member and the back-surface-side housing member, the second grip member is separate from the first grip member, is connected to a second protruding portion of the main body housing, and covers at least a part of a boundary portion between the front-surface-side housing member and the back-surface-side housing member, the first grip member and the second grip member are hollow members, the first grip member includes in an extremity portion thereof a hole into which a screw for connecting to the first protruding portion is inserted, and the second grip member includes in an extremity portion thereof a hole into which a screw for connecting to the second protruding portion is inserted.

According to the above configuration B19, it is possible to cover two protruding portions of a main body housing with a pair of grip members. When a user holds a grip portion attached to a game controller, it is possible to make the grip portion likely to fit the hand well. It is possible to improve the operability of the controller.

(Configuration B20)

A game controller for performing a game operation by holding the game controller with both hands, the game controller comprising:

a main body housing;

a first grip member connected to the main body housing and configured to be held by one hand of a user;

a second grip member separate from the first grip member, connected to the main body housing, and configured to be held by the other hand of the user;

a first vibrator provided inside the first grip member; and a second vibrator provided inside the second grip member, wherein the first vibrator comes into direct contact with the first grip member and comes into contact with the main body housing through a first buffer member, and the second vibrator comes into direct contact with the second grip member and comes into contact with the main body housing through a second buffer member.

In the above configuration B20, a first vibrator comes into direct contact with a first grip member, while coming into contact with a main body housing through a buffer member. Further, a second vibrator comes into direct contact with a second grip member, while coming into contact with the main body housing through a buffer member.

Consequently, it is possible to separate the vibration of the first grip member and the vibration of the second grip member and, for example, prevent vibrations to the two grip members from being mixed with each other.

(Configuration C1)

A game controller capable of reading data from an external storage device through contactless communication, the game controller comprising:

a housing;

an antenna built into the housing and used for the contactless communication;

a first operation button provided on the housing, wherein on the housing, the first operation button is placed in a region where data can be read from the external storage device using the antenna, and a height of an upper surface of the first operation button is substantially the same as or lower than a height of a surface of the housing.

According to the above configuration C1, it is possible to place a first operation button in the above region. The height of an upper surface of the first operation button is substantially the same as or lower than the height of a surface of a housing. Thus, even if an external storage device is placed in the region, it is possible to prevent the first operation button from being erroneously pressed, and improve the operability of a game controller having a contactless communication function. Further, the upper surface of the first operation button is made low, and the first operation button is placed in the region, whereby it is possible to prevent an erroneous operation on the first operation button, while saving space.

(Configuration C2)

The game controller according to configuration C1, wherein, when the game controller is held and viewed from a front of the game controller, the first operation button is placed at a position where the first operation button overlaps at least a part of a region surrounded by the antenna.

According to the above configuration C2, the first operation button can overlap a region where an antenna is placed, and it is possible to make effective use of space. It should be noted that the region surrounded by the antenna may be on a line of the antenna or within the antenna.

(Configuration C3)

The game controller according to configuration C1 or C2, wherein the housing includes a first region including a position corresponding to a center of the region, and a second region around the first region, and the first operation button is placed in the second region on the housing.

According to the above configuration C3, it is possible to place the first operation button around the center of the region, and for example, it is possible to prevent the first operation button from being touched when data is read from the external storage device through contactless communication. Further, for example, in a case where the external storage device is small, it is possible to perform contactless communication with the external storage device, while operating the first operation button.

(Configuration C4)

The game controller according to any one of configurations C1 to C3, wherein as the first operation button, a plurality of first operation buttons are provided.

According to the above configuration C4, it is possible to place a plurality of operation buttons in the region.

(Configuration C5)

The game controller according to any one of configurations C1 to C4, wherein the first operation button is a home button.

(Configuration C6)

The game controller according to any one of configurations C1 to C5, wherein the first operation button is a button used to capture a screen.

According to the above configurations C5 and C6, it is possible to place a home button and a capture button in the region. These buttons are buttons used relatively less frequently during a normal game. Thus, it is possible to perform contactless communication with the external storage device without hindering a game operation.

(Configuration C7)

The game controller according to any one of configurations C1 to C6, wherein on a certain surface of the housing on which the first operation button is provided, a second operation button different from the first operation button is placed, and a height of the first operation button from the surface of the housing is lower than a height of the second operation button from the surface of the housing.

According to the above configuration C7, it is possible to make the first operation button placed in the region lower than a second operation button and prevent an erroneous operation on the first operation button by the external storage device coming into contact with the first operation button when contactless communication is performed. Thus, it is possible to improve the operability.

(Configuration C8)

The game controller according to configuration C7, wherein the second operation button is placed at a position further away from the antenna than the first operation button is.

According to the above configuration C8, the second operation button is placed at a position away from an antenna, whereby it is possible to prevent an erroneous operation on the second operation button by the external storage device coming into contact with the second operation button when contactless communication is performed. Further, the height of the second operation button from the surface of the housing is greater than the height of the first operation button from the surface of the housing. Thus, the second operation button has higher operability.

(Configuration C9)

The game controller according to any one of configurations C1 to C8, wherein the antenna is placed in the housing and closer to a front surface of the game controller than a center of the housing in a front-back direction of the game controller is.

According to the above configuration C9, an antenna is placed at a position near the front surface of a game controller. Thus, it is possible to make it easy to perform contactless communication with the external storage device placed on the front surface of the game controller.

(Configuration C10)

The game controller according to any one of configurations C1 to C9, wherein the antenna is placed at a center in a left-right direction of the game controller.

According to the above configuration C10, the center in a left-right direction of the game controller can be the reading range.

(Configuration C11)

The game controller according to any one of configurations C1 to C10, wherein the contactless communication is communication using NFC (Near Field Communication).

(Configuration C12)

The game controller according to any one of configurations C1 to C10, wherein the contactless communication is communication using RFID.

According to the above configurations C11 and C12, it is possible to perform contactless communication using an NFC technique and an RFID technique.

(Configuration C13)

The game controller according to any one of configurations C1 to C12, wherein in the housing, a first substrate and a second substrate placed closer to a back surface of the game controller than the first substrate is are provided, and the antenna is placed on the first substrate.

According to the above configuration C13, it is possible to provide an antenna on a first substrate placed on a front surface side of a game controller and make is easy to perform contactless communication with the external storage device placed on the front surface of the game controller. Further, a substrate has a two-layer structure, whereby it is possible to make the area of a single substrate small and configure the controller to be small.

(Configuration C14)

The game controller according to configuration C13, wherein on the second substrate, a control circuit for controlling the game controller is placed.

According to the above configuration C14, it is possible to provide a control circuit on a second substrate placed on a back surface side.

(Configuration C15)

The game controller according to configuration C13 or C14, wherein the antenna is placed on a back side of the first substrate.

According to the above configuration C15, it is possible to make effective use of the limited area of a substrate and improve the degree of freedom in design.

(Configuration C16)

The game controller according to configuration C15, wherein on a front side of the first substrate, a switch for detecting an operation on the first operation button is placed.

According to the above configuration C16, it is possible to place a switch for the first operation button on a front side of the first substrate and place the antenna on a back side of the first substrate. Thus, it is possible to place the first operation button, regardless of the position of the antenna.

(Configuration C17)

A game controller capable of reading data from an external storage device through contactless communication, the game controller comprising:

a housing;

an antenna built into the housing and used for the contactless communication;

a first operation button provided on the housing, wherein on the housing, the first operation button is placed in a region where data can be read from the external storage device using the antenna, and when the game controller is held and viewed from a front of the game controller, the first operation button is placed at a position where the first operation button overlaps at least a part of a region surrounded by the antenna.

According to the above configuration C17, the first operation button can overlap a region where an antenna is placed, and it is possible to make effective use of space. It should be noted that a region surrounded by the antenna may be on a line of the antenna or within the antenna.

(Configuration C18)

The game controller according to any one of configurations C1 to C17, wherein the first operation button is lower than the surface of the housing in a state where the first operation button is pressed.

According to the above configuration C18, the first operation button is lower than the surface of the housing in a state where the first operation button is pressed. Thus, in a case where the external storage device is placed in the region, it is possible to prevent unintended pressing of the first operation button from being detected. That is, in this configuration, in a case where the external storage device is placed in the region, whereby the external storage device touches the first operation button, the position of the first operation button may go down to almost the same position as the housing surface, but the first operation button is unlikely to become lower the surface of the housing. Thus, in a case where a user does not intend to press the first operation button and merely places the external storage device in the region, it is less likely that the pressing of the first operation button is detected. Thus, it is possible to prevent an erroneous operation.

(Configuration D1)

A game controller capable of reading data from an external storage device through contactless communication, the game controller comprising:

a first substrate provided in a housing; and a second substrate provided in the housing and placed closer to a back surface of the game controller than the first substrate is, wherein an antenna used for the contactless communication is placed on the first substrate.

According to the above configuration D1, in a housing of a game controller, a first substrate and a second substrate placed closer to a back surface of the game controller than the first substrate is are provided, and an antenna for contactless communication is provided on the first substrate. Consequently, it is possible to make it easy to perform contactless communication with an external storage device placed on a front surface of the game controller. Further, a substrate has a two-layer structure, whereby it is possible to determine the placement of another circuit without influencing the position of the antenna, and improve the degree of freedom in design.

(Configuration D2)

The game controller according to configuration D1, wherein the antenna is placed on a back surface of the first substrate.

According to the above configuration D2, the antenna is placed on a back surface of the first substrate. Thus, for example, it is possible to place another circuit on a front surface of the first substrate and make effective use of the limited area of a substrate.

(Configuration D3)

The game controller according to configuration D2, wherein a switch for detecting an operation on an operation button is provided on a front surface of the first substrate.

According to the above configuration D3, a switch for an operation button is placed on the front surface of the first substrate, and the antenna is placed on the back surface of the first substrate. Thus, it is possible to place the operation button, regardless of the position of the antenna and improve the degree of freedom in design.

(Configuration D4)

The game controller according to configuration D3, wherein the switch is placed at a position corresponding to a region included in the housing and surrounded by the antenna.

According to the above configuration D4, the switch for the operation button is provided at a position corresponding to a region surrounded by the antenna. Thus, it is possible to place the operation button in a region, in the housing, where contactless communication can be performed.

(Configuration D5)

The game controller according to any one of configurations D1 to D4, wherein a control circuit for controlling the contactless communication is placed on the second substrate.

According to the above configuration D5, the antenna is placed on the first substrate, while a control circuit for contactless communication is placed on the second substrate. Thus, it is possible to place the control circuit, regardless of the position of the antenna and improve the degree of freedom in design.

(Configuration D6)

The game controller according to any one of configurations D1 to D5, wherein an analog stick is placed on a front surface of the second substrate.

According to the above configuration D6, the antenna is placed on the first substrate on a front surface side of the housing of the game controller, and an analog stick is placed on the second substrate on a back surface side. Consequently, it is possible to shorten the distance between the antenna and the front surface of the housing, while securing the length of an operation section for the analog stick. Further, the analog stick is placed on a substrate, whereby it is possible to reduce the number of components.

(Configuration D7)

The game controller according to any one of configurations D1 to D6, wherein when the first substrate and the second substrate are projected onto a plane parallel with a front of the game controller, the projected first substrate overlaps at least a part of the projected second substrate.

According to the above configuration D7, the structure is such that two substrates overlap each other. Thus, it is possible to configure a game controller to be small.

(Configuration D8)

The game controller according to any one of configurations D1 to D7, wherein when the switch and the antenna are projected onto a plane parallel with a front of the game controller, the projected switch is placed in a region surrounded by the projected antenna.

According to the above configuration D8, it is possible to place an operation button in a region where contactless communication can be performed.

(Configuration E1)

A game controller comprising:

a housing; and a vibrator placed in the housing and capable of vibrating in a first direction and a second direction different from the first direction, wherein the vibrator comes into contact with the housing at least on a first surface corresponding to the first direction.

According to the above configuration E1, vibrator is brought into contact with a housing on a first surface of the vibrator. Thus, it is possible to make a vibration in a first direction likely to be transmitted to the housing, and improve a vibration experience for a user.

(Configuration E2)

The game controller according to configuration E1, wherein the vibrator comes into contact with the housing on the first surface corresponding to the first direction and a second surface corresponding to the second direction.

According to the above configuration E2, a vibrator is brought into contact with a housing on a first surface and a second surface of the vibrator. Thus, it is possible to make vibrations in a first direction and a second direction of the vibrator likely to be transmitted to the housing, and improve a vibration experience for a user.

(Configuration E3)

The game controller according to configuration E2, wherein the first surface is a surface substantially orthogonal to the first direction, and the second surface is a surface substantially orthogonal to the second direction.

According to the above configuration E3, a surface orthogonal to a vibration direction is brought into contact with the housing. Thus, it is possible to make a vibration of the vibrator likely to be transmitted to the housing.

(Configuration E4)

The game controller according to any one of configurations E1 to E3, wherein the first direction and the second direction are substantially orthogonal to each other.

According to the above configuration E4, it is possible to vibrate a game controller using vibrators vibrating in directions orthogonal to each other. Thus, it is possible to cause the user to experience vibrations in different directions.

(Configuration E5)

The game controller according to any one of configurations E1 to E4, wherein when the game controller is viewed from front, the first direction is a substantial left-right direction of the game controller.

According to the above configuration E5, it is possible to vibrate a game controller in a left-right direction. Thus, it is possible to cause the user to experience a vibration in the left-right direction.

(Configuration E6)

The game controller according to any one of configurations E1 to E5, wherein when the game controller is viewed from front, the second direction is a substantial front-back direction of the game controller.

According to the above configuration E6, it is possible to vibrate a game controller in a front-back direction. Thus, it is possible to cause the user to experience a vibration in the front-back direction.

(Configuration E7)

The game controller according to any one of configurations E1 to E6, wherein the vibrator has a substantially cuboid shape.

According to the above configuration E7, it is possible to bring the vibrator into contact with a surface of the housing in a wider area. Thus, it is possible to make a vibration likely to be transmitted to the user.

(Configuration E8)

The game controller according to any one of configurations E1 to E7, wherein the vibrator comes into contact with a planar surface portion of an inner surface of the housing.

According to the above configuration E8, the vibrator is brought into contact with a planar surface portion of the housing. Thus, it is possible to make a contact area large. It is possible to make a vibration of the vibrator likely to be transmitted to the housing. It is possible to make a vibration likely to be transmitted to the user.

(Configuration E9)

The game controller according to any one of configurations E1 to E8, wherein the housing includes a first portion and a second portion thicker than the first portion, and the vibrator comes into contact with the first portion of the housing.

According to the above configuration E9, the vibrator comes into contact with a thinner portion of the housing. Thus, it is possible to make a vibration of the vibrator likely to be transmitted to the housing. It is possible to make a vibration likely to be transmitted to the user.

(Configuration E10)

The game controller according to any one of configurations E1 to E9, wherein the vibrator comes into contact with a rib portion of an inner surface of the housing.

According to the above configuration E10, it is possible to bring the vibrator into contact with a rib portion (a protruding portion) within the housing.

(Configuration E11)

The game controller according to any one of configurations E1 to E10, wherein the vibrator is accommodated in a holder, and the holder is fixed to the housing.

According to the above configuration E11, the vibrator is accommodated in a holder, and the holder is fixed to the housing, whereby it is possible to fix the vibrator within the housing.

(Configuration E12)

The game controller according to configuration E11, wherein the holder is so shaped as to cover at least a part of the vibrator, and at least a surface of the holder corresponding to the first surface of the vibrator is open.

According to the above configuration E12, it is possible to expose the first surface of the vibrator through an opening portion of the holder and cover the other surfaces of the vibrator with the holder. The first surface of the vibrator is exposed through the opening portion of the holder and come into contact with the housing. Thus, a vibration in the first direction is likely to be transmitted to the housing. It is possible to make a vibration likely to be transmitted to the user. On the other hand, the other surfaces of the vibrator are covered with the holder. Thus, the holder absorbs a vibration of the vibrator and can make the vibration less likely to be transmitted to the housing.

(Configuration E13)

The game controller according to configuration E11 or E12, wherein the holder is formed of an elastic material.

According to the above configuration E13, it is possible to cover the vibrator with a relatively soft material and make the holder likely to absorb a vibration of the vibrator.

(Configuration E14)

The game controller according to any one of configurations E1 to E13, wherein the game controller includes as the vibrator a first vibrator and a second vibrator, the first vibrator can vibrate in a first direction and a second direction different from the first direction, the second vibrator can vibrate in a first direction and a second direction different from the first direction, the housing includes a left grip portion configured to be held by a left hand of a user, and a right grip portion configured to be held by a right hand of the user, the first vibrator is placed in the left grip portion, and the second vibrator is placed in the right grip portion, the first vibrator comes into contact with the left grip portion on a first surface corresponding to the first direction and a second surface corresponding to the second direction, and the second vibrator comes into contact with the right grip portion on a first surface corresponding to the first direction and a second surface corresponding to the second direction.

According to the above configuration E14, it is possible to place vibrators in left and right grip portions to be held by the user, and impart a vibration to each of the left and right hands of the user. Further, the first surface and the second surface of the vibrator come into contact with the left and right grip portions, respectively. Thus, vibrations are likely to be transmitted to the left and right grip portions. Further, it is possible to vibrate each of the left and right grip portions. Thus, it is possible to separate left and right vibrations and cause the user to experience various types of vibrations. It should be noted that "the first vibrator can vibrate in a first direction and a second direction different from the first direction" means that the first vibrator itself can vibrate in two directions. Similarly, "the second vibrator can vibrate in a first direction and a second direction different from the first direction" means that the second vibrator itself can vibrate in two directions. With respect to the game controller, the two vibration directions of the first vibrator may or may not coincide with the two vibration directions of the second vibrator, depending on the orientations of the first vibrator and the second vibrator.

(Configuration E15)

The game controller according to any one of configurations E1 to E14, wherein the housing includes a grip portion configured to be held by a hand of a user, and the first surface of the vibrator comes into contact with a first portion which is included in the grip portion and with which a palm of the user comes into contact.

According to the above configuration E15, the first surface of the vibrator and a first portion of a grip portion are brought into contact with each other, whereby it is possible to make a vibration in the first direction of the vibrator likely to be transmitted to a palm of the user.

(Configuration E16)

The game controller according to configuration E15, wherein the grip portion includes a second portion different from the first portion, the first portion hits an approximate center portion of the palm of the user, and the second portion hits a portion of a finger of the user, a second surface corresponding to the second direction of the vibrator comes into contact with the second portion of the grip portion, a resonance frequency of a vibration in the first direction is different from a resonance frequency of a vibration in the second direction.

According to the above configuration E16, it is possible to impart vibrations at different frequencies to a center portion of the palm of the user and a finger portion of the user, and cause the user to feel different types of vibrations depending on the portion of the hand.

(Configuration E17)

The game controller according to any one of configurations E1 to E16, wherein when the game controller is viewed from front, the first direction is a substantial left-right direction of the game controller, and the second direction is a substantial front-back direction of the game controller, and a resonance frequency of a vibration in the first direction is different from a resonance frequency of a vibration in the second direction.

According to the above configuration E17, it is possible to vibrate the vibrator at different resonance frequencies in a left-right direction and a front-back direction of a game controller. Thus, it is possible to cause the user to feel different types of vibrations in the left-right direction and the front-back direction.

(Configuration E18)

The game controller according to any one of configurations E1 to E17, wherein the housing includes a main body housing and a grip portion configured to be held by a hand of a user, and at least the first surface of the vibrator comes into direct contact with the grip portion.

According to the above configuration E18, it is possible to bring the vibrator into direct contact with a grip portion of the housing, and make a vibration of the vibrator likely to be transmitted to the grip portion.

(Configuration E19)

The game controller according to configuration E18, wherein the vibrator comes into contact with the main body housing through a buffer member.

According to the above configuration E19, the vibrator comes into direct contact with the grip portion, while the vibrator comes into contact with a main body housing through a buffer member. Thus, it is possible to make a vibration of the vibrator likely to be transmitted to the grip portion, while it is possible to make a vibration less likely to be transmitted to the main body housing.

(Configuration E20)

The game controller according to any one of configurations E1 to E19, wherein a resonance frequency of a vibration in the first direction is different from a resonance frequency of a vibration in the second direction.

According to the above configuration E20, it is possible to vibrate a game controller at different resonance frequencies, and cause the user to feel vibrations at different resonance frequencies.

(Configuration E21)

A game controller including a vibrator, wherein the vibrator has as resonance frequencies a first resonance frequency and a second resonance frequency different from the first resonance frequency.

According to the above configuration E21, it is possible to vibrate a game controller at different resonance frequencies, and cause a user to feel vibrations at different resonance frequencies.

(Configuration E22)

The game controller according to configuration E21, wherein the vibrator is a linear vibration actuator.

According to the above configuration E22, it is possible to use a linear vibration actuator as a vibrator vibrating at different resonance frequencies and vibrate a vibrator in a linear direction.

(Configuration F1)

A game controller comprising:

a housing including an aperture portion;

a key top of an operation button exposed through the aperture portion and configured to be pressed with a finger of a user;

a light-emitting section;

a tubular light-guiding portion configured to guide light from the light-emitting section and surrounding an outer periphery of the key top;

a light-shielding portion surrounding an outer periphery of the light-guiding portion; and a switch placed below the key top, wherein an upper surface of the key top and an upper surface of the light-guiding portion are exposed through the aperture portion.

According to the above configuration F1, a light-guiding portion is exposed through an aperture portion of a housing, and the light-guiding portion is surrounded by a light-shielding portion. Consequently, it is possible to guide light to a surface of the housing such that light does not come out of the light-guiding portion, and it is possible to cause an operation button to emit light, for example, in a ring-shaped manner.

It should be noted that the light-shielding portion includes a member formed of a light-shielding material, and a member obtained by applying a light-shielding agent to the outer periphery of the light-guiding portion.

(Configuration F2)

The game controller according to configuration F1, wherein the switch is placed below a center of the key top.

According to the above configuration F2, a switch is provided below a key top. Thus, it is possible to simplify the structure of a button.

(Configuration F3)

The game controller according to configuration F1 or F2, further comprising an elastic portion placed below the key top and configured to bias the key top in a direction opposite to a pressing direction, wherein when the key top is pressed, the key top comes into contact with the switch through the elastic portion.

According to the above configuration F3, it is possible to push up a key top with a simple structure.

(Configuration F4)

The game controller according to configuration F3, wherein the elastic portion is formed of a light-guiding material, and the light-emitting section is placed below the elastic portion and at a position where the light-emitting section overlaps the elastic portion.

According to the above configuration F4, even if an elastic portion is placed at a position where the elastic portion overlaps a light-emitting section, it is possible to transmit light from the light-emitting section and cause the light to be incident on the light-guiding portion.

(Configuration F5)

The game controller according to any one of configurations F1 to F4, wherein the light-shielding portion is tubular.

According to the above configuration F5, it is possible to cover a tubular light-guiding portion with a tubular light-shielding portion.

(Configuration F6)

The game controller according to any one of configurations F1 to F5, wherein the light-emitting section is placed inside a region surrounded by the light-shielding portion.

According to the above configuration F6, it is possible to prevent light from the light-emitting section from coming out of the light-shielding portion.

(Configuration F7)

The game controller according to any one of configurations F1 to F6, wherein as the light-emitting section, a plurality of light-emitting sections are provided.

According to the above configuration F7, it is possible to cause the light-guiding portion to emit light by eliminating the unevenness of light.

(Configuration F8)

The game controller according to any one of configurations F1 to F7, wherein as the light-emitting section, a plurality of light-emitting sections are placed at positions symmetrical with respect to a center of the key top.

According to the above configuration F8, light-emitting sections are placed at positions symmetrical with respect to a key top. Thus, it is possible to cause the light-guiding portion to uniformly emit light by eliminating the evenness of light.

(Configuration F9)

The game controller according to any one of configurations F1 to F8, wherein the light-shielding portion is not exposed through a surface of the housing.

According to the above configuration F9, it is possible to make the light-shielding portion inconspicuous.

(Configuration F10)

The game controller according to any one of configurations F1 to F9, wherein even when the key top is pressed, the light-guiding portion is not pressed in a direction of pressing the key top.

According to the above configuration F10, it is possible to provide an operation button in which only a key top is pressed, and a light-guiding portion that is around the operation button and emits light is not pressed.

(Configuration F11)

The game controller according to any one of configurations F1 to F10, wherein the switch and the light-emitting section are placed on a substrate provided in the housing.

According to the above configuration F11, it is possible to reduce the number of components.

(Configuration F12)

The game controller according to any one of configurations F1 to F11, wherein an upper surface of the light-guiding portion has substantially the same height as a surface of the housing.

(Configuration F13)

The game controller according to any one of configurations F1 to F12, wherein an upper surface of the key top has substantially the same height as a surface of the housing.

According to the above configurations F12 and F13, it is possible to make the operation button and the surface of the housing approximately flat.

(Configuration F14)

The game controller according to any one of configurations F1 to F13, wherein the operation button is a home button.

According to the above configuration F14, it is possible to cause a home button to emit light. For example, the home button is used to perform an operation different from a normal game operation (e.g., display a menu screen), and it is possible to cause a portion around such a home button to emit light.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game controller comprising:
   a main body comprising a first protruding portion and a second protruding portion;
   a first grip covering at least a portion of the first protruding portion;
   a second grip covering at least a portion of the second protruding portion;
   a first vibrator disposed in a first space between the first grip and the first protruding portion; and a second vibrator disposed in a second space between the second grip and the second protruding portion, wherein the first vibrator is disposed in the first space so that vibration of the first vibrator is transferable to the first grip by direct contact between the first vibrator and the first grip and is transferable to the first protruding portion of the main body via a first buffer between the first vibrator and the first protruding portion of the main body, and wherein the second vibrator is disposed in the second space so that vibration of the second vibrator is transferable to the second grip by direct contact between the second vibrator and the second grip and is transferable to the second protruding portion of the main body via a second buffer between the second vibrator and the second protruding portion of the main body.

2. The game controller of claim 1, wherein
the first vibrator includes a first surface for directly contacting a first portion of the first grip and a second surface for directly contacting a second portion of the first grip, and
the second vibrator includes a first surface for directly contacting a first portion of the second grip and a second surface for directly contacting a second portion of the second grip.

3. The game controller of claim 2, wherein
the first portion of the first grip is thinner than the second portion of the first grip, and
the first portion of the second grip is thinner than the second portion of the second grip.

4. The game controller of claim 3, wherein
the first portion of the first grip comprises a lateral side surface of the first grip and the second portion of the first grip comprises a bottom surface of the first grip, and
the first portion of the second grip comprises a lateral side surface of the second grip and the second portion of the second grip comprises a bottom surface of the second grip.

5. A game system comprising the game controller of claim 1.

6. A method of providing vibration to a game controller comprising a main body comprising a first protruding portion and a second protruding portion; a first grip covering at least a portion of the first protruding portion; a second grip covering at least a portion of the second protruding portion; a first vibrator disposed in a first space between the first grip and the first protruding portion; and a second vibrator disposed in a second space between the second grip and the second protruding portion, wherein the first vibrator is controllable to vibrate in one direction so that vibration of the first vibrator is transferable to the first grip by direct contact between the first vibrator and the first grip and in another different direction so that vibration is transferable to the first protruding portion of the main body via a first buffer between the first vibrator and the first protruding portion of the main body, and wherein the second vibrator is controllable to vibrate in one direction so that vibration of the second vibrator is transferable to the second grip by direct contact between the second vibrator and the second grip and in another different direction so that vibration is transferable to the second protruding portion of the main body via a second buffer between the second vibrator and the second protruding portion of the main body, the method comprising:
selectively controlling, based on execution of a game program, the first vibrator to vibrate in the one direction to transfer vibration to the first grip by the direct contact and in the other direction to transfer vibration to the first protruding portion via the first buffer; and
selectively controlling, based on execution of the game program, the second vibrator to vibrate in the one direction to transfer vibration to the second grip by the direct contact and in the other direction to transfer vibration to the second protruding portion via the second buffer.

7. A game system comprising:
a game controller comprising:
a main body comprising a first protruding portion and a second protruding portion;
a first grip covering at least a portion of the first protruding portion;
a second grip covering at least a portion of the second protruding portion;
a first vibrator disposed in a first space between the first grip and the first protruding portion; and
a second vibrator disposed in a second space between the second grip and the second protruding portion,
wherein the first vibrator is disposed in the first space so that vibration of the first vibrator is transferable to the first grip by direct contact between the first vibrator and the first grip and is transferable to the first protruding portion of the main body via a first buffer between the first vibrator and the first protruding portion of the main body, and
wherein the second vibrator is disposed in the second space so that vibration of the second vibrator is transferable to the second grip by direct contact between the second vibrator and the second grip and is transferable to the second protruding portion of the main body via a second buffer between the second vibrator and the second protruding portion of the main body; and
a game apparatus comprising a processor configured to control vibration of the first vibrator and vibration of the second vibrator.

8. The game system of claim 7, wherein
the first vibrator includes a first surface for directly contacting a first portion of the first grip and a second surface for directly contacting a second portion of the first grip, and
the second vibrator includes a first surface for directly contacting a first portion of the second grip and a second surface for directly contacting a second portion of the second grip.

9. The game system of claim 8, wherein
the first portion of the first grip is thinner than the second portion of the first grip, and
the first portion of the second grip is thinner than the second portion of the second grip.

10. The game system of claim 9, wherein
the first portion of the first grip comprises a lateral side surface of the first grip and the second portion of the first grip comprises a bottom surface of the first grip, and
the first portion of the second grip comprises a lateral side surface of the second grip and the second portion of the second grip comprises a bottom surface of the second grip.

11. A non-transitory computer-readable storage medium storing instructions which, when executed by a processor, control vibration of a game controller comprising a main body comprising a first protruding portion and a second protruding portion; a first grip covering at least a portion of the first protruding portion; a second grip covering at least a portion of the second protruding portion; a first vibrator disposed in a first space between the first grip and the first protruding portion; and a second vibrator disposed in a second space between the second grip and the second protruding portion, wherein the first vibrator is controllable to vibrate in one direction so that vibration of the first vibrator is transferable to the first grip by direct contact between the first vibrator and the first grip and in another different direction so that vibration is transferable to the first protruding portion of the main body via a first buffer between the first vibrator and the first protruding portion of the main body, and wherein the second vibrator is controllable to vibrate in one direction so that vibration of the second vibrator is transferable to the second grip by direct contact between the second vibrator and the second grip and in another different direction so that vibration is transferable to the second protruding portion of the main body via a second buffer between the second vibrator and the second protruding portion of the main body, the instructions, when executed, configuring the processor to control the vibration of the game controller by at least:

selectively controlling the first vibrator to vibrate in the one direction to transfer vibration to the first grip by the direct contact and in the other direction to transfer vibration to the first protruding portion via the first buffer; and selectively controlling the second vibrator to vibrate in the one direction to transfer vibration to the second grip by the direct contact and in the other direction to transfer vibration to the second protruding portion via the second buffer.

12. A game apparatus comprising the non-transitory computer-readable storage medium of claim 11.

* * * * *